US005172328A

United States Patent [19]

Cahlander et al.

[11] Patent Number: 5,172,328

[45] Date of Patent: Dec. 15, 1992

[54] FOOD PREPARATION SYSTEM AND METHOD

[75] Inventors: Robert L. Cahlander, Red Wing; David W. Carroll, Cannon Falls; Robert A. Hanson, Inver Grove Heights, all of Minn.; Alfred C. Hollingsworth, Naperville, Ill.; Richard O. Koehler, Cannon Falls, Minn.; John O. Reinertsen, Glen Ellyn, Ill.

[73] Assignee: Restaurant Technology, Inc., Oak Brook, Ill.

[21] Appl. No.: 819,575

[22] Filed: Jan. 8, 1992

Related U.S. Application Data

[63] Continuation of Ser. No. 519,387, May 4, 1990, abandoned, which is a continuation-in-part of Ser. No. 516,888, Apr. 30, 1990, which is a continuation of Ser. No. 176,568, Apr. 1, 1988, Pat. No. 4,922,435.

[51] Int. Cl.[5] .................... G05B 19/00

[52] U.S. Cl. .................... 364/478; 395/82; 364/400; 364/477; 99/407; 99/325

[58] Field of Search .................... 364/478, 479, 400, 477, 364/557; 99/403, 407, 325; 395/82

[56] References Cited

U.S. PATENT DOCUMENTS

| | | | |
|---|---|---|---|
| 1,630,676 | 5/1927 | Smith . | |
| 1,755,699 | 4/1930 | Loehr . | |
| 1,927,318 | 9/1933 | McEntee et al. . | |
| 1,961,990 | 6/1934 | Sleeman . | |
| 2,253,027 | 8/1941 | Hall . | |
| 2,466,386 | 4/1949 | Curioni . | |
| 2,475,523 | 7/1949 | Schroeder . | |
| 2,575,643 | 11/1951 | Tamsen . | |
| 2,777,212 | 1/1957 | McOmber . | |
| 2,807,203 | 9/1957 | Buechele et al. . | |
| 2,841,074 | 7/1958 | Schechter . | |
| 3,033,059 | 5/1962 | Melton et al. . | |
| 3,080,999 | 3/1963 | Clarke et al. . | |
| 3,183,856 | 5/1965 | Jolly . | |
| 3,262,593 | 7/1966 | Hainer . | |
| 3,266,442 | 8/1966 | Udall et al. . | |
| 3,273,488 | 9/1966 | Anetsberger | 364/200 |
| 3,279,635 | 10/1966 | Avery . | |
| 3,340,790 | 9/1967 | Simjian . | |
| 3,347,152 | 10/1967 | Congelli et al. | 99/334 |

(List continued on next page.)

FOREIGN PATENT DOCUMENTS

| | | |
|---|---|---|
| 1574245 | 7/1971 | Fed. Rep. of Germany . |
| 226185 | 8/1985 | Fed. Rep. of Germany . |
| 2483206 | 12/1981 | France . |
| 8020908 | 2/1982 | France . |
| 2597239 | 10/1987 | France . |
| 50-78345 | 3/1975 | Japan . |
| 2161294 | 6/1986 | United Kingdom . |
| 2200039 | 7/1988 | United Kingdom . |

*Primary Examiner*—Allen R. MacDonald
*Attorney, Agent, or Firm*—Jenner & Block

[57] ABSTRACT

A fully automated robotized system and method is provided for cooking food products. The system and method is especially useful for use in a quick service or fast food restaurant and, in one embodiment, is capable of cooking, on a fully automated basis, french fries, chicken nuggets, fish filets and chicken patties. In one embodiment, the system includes a robot, a bulk uncooked food dispensing station, a cooking station and a cooked food storage station. The system can be controlled by a computer operating and control station that controls and directs the robot to obtain bulk food from the dispensing station, place it in cooking position at the cooking station and when cooked, remove the food and deliver it to the storage station, at a rate required to fill anticipated customer orders. In one embodiment, the cooking station is a clamshell grill and the robot deposits on and retrieves from the grill hamburger patties in a predetermined horizontal array with a novel end of arm tool.

91 Claims, 62 Drawing Sheets

4,339,220 7/1982 Pulda .

U.S PATENT DOCUMENTS

| | | | |
|---|---|---|---|
| 3,377,963 | 4/1968 | Anderson et al. . | |
| 3,391,633 | 7/1968 | Boosalis . | |
| 3,408,920 | 11/1968 | Smith, Jr. . | |
| 3,412,478 | 11/1968 | Satake . | |
| 3,413,911 | 12/1968 | Phelan et al. . | |
| 3,442,200 | 5/1969 | Babel . | |
| 3,442,423 | 5/1969 | Cozad . | |
| 3,448,677 | 6/1969 | Dexters . | |
| 3,474,891 | 10/1969 | Kamila . | |
| 3,505,072 | 4/1970 | Rullman . | |
| 3,557,682 | 1/1971 | Goosman . | |
| 3,587,446 | 6/1971 | Gardner . | |
| 3,641,263 | 2/1972 | Rhoads et al. | 364/200 |
| 3,645,196 | 2/1972 | Johnston et al. . | |
| 3,653,541 | 4/1972 | Crum . | |
| 3,665,842 | 5/1972 | Visitacion . | |
| 3,685,432 | 8/1972 | Hoeberigs . | |
| 3,690,247 | 9/1972 | Van Cleven et al. | 364/200 |
| 3,716,383 | 2/1973 | Yamamura . | |
| 3,747,785 | 7/1973 | Dahlin . | |
| 3,750,810 | 8/1973 | Stanfill . | |
| 3,866,795 | 2/1975 | Urano . | |
| 3,908,531 | 9/1975 | Morley | 364/200 |
| 3,910,535 | 10/1975 | Ohnaka . | |
| 3,942,426 | 3/1976 | Binks et al. . | |
| 3,954,052 | 5/1976 | Vegh et al. . | |
| 3,965,807 | 6/1976 | Baker . | |
| 3,984,009 | 10/1976 | Holroyd . | |
| 3,987,718 | 10/1976 | Lang-Ree . | |
| 4,044,660 | 8/1977 | Montague . | |
| 4,071,149 | 1/1978 | Deguchi . | |
| 4,074,793 | 2/1978 | Yuter . | |
| 4,163,489 | 8/1979 | Wahl . | |
| 4,179,985 | 12/1979 | Baker et al. . | |
| 4,213,380 | 7/1980 | Kahn . | |
| 4,226,176 | 10/1980 | Macchi . | |
| 4,228,730 | 10/1980 | Schindler . | |
| 4,233,495 | 11/1980 | Scoville et al. . | |
| 4,270,669 | 6/1981 | Luke . | |
| 4,281,594 | 8/1981 | Baker et al. . | |
| 4,289,064 | 9/1981 | Rosenblatt | 364/200 |
| 4,295,771 | 10/1981 | Mehesan, Jr. . | |
| 4,345,514 | 8/1982 | Morley . | |
| 4,396,336 | 8/1983 | Malamood . | |
| 4,437,396 | 3/1984 | Plattner et al. . | |
| 4,457,665 | 7/1984 | Fluck . | |
| 4,489,647 | 12/1984 | Stamps et al. . | |
| 4,503,507 | 3/1985 | Takeda et al. | 364/513 |
| 4,543,702 | 10/1985 | Wada | 364/200 |
| 4,553,222 | 11/1985 | Kurland et al. | 364/900 |
| 4,567,819 | 2/1986 | Adamson . | |
| 4,595,333 | 6/1986 | Ono et al. | 414/729 |
| 4,611,749 | 9/1986 | Kawano | 228/176 |
| 4,616,971 | 10/1986 | Matrone | 414/730 |
| 4,627,785 | 12/1986 | Monforte | 414/730 |
| 4,628,974 | 12/1986 | Meyer | 141/129 |
| 4,657,466 | 4/1987 | Leeper et al. . | |
| 4,664,590 | 5/1987 | Maekawa | 414/744 |
| 4,685,386 | 8/1987 | Bezon | 99/404 |
| 4,688,549 | 8/1987 | Blankemeyer et al. | 126/373 |
| 4,700,617 | 10/1987 | Lee et al. | 99/327 |
| 4,719,849 | 1/1988 | Cope et al. . | |
| 4,719,850 | 1/1988 | Sowell . | |
| 4,742,455 | 5/1988 | Schreyer | 364/400 |
| 4,748,902 | 6/1988 | Maurantonio | 99/326 |
| 4,836,111 | 6/1989 | Kaufman . | |

FIG. 24
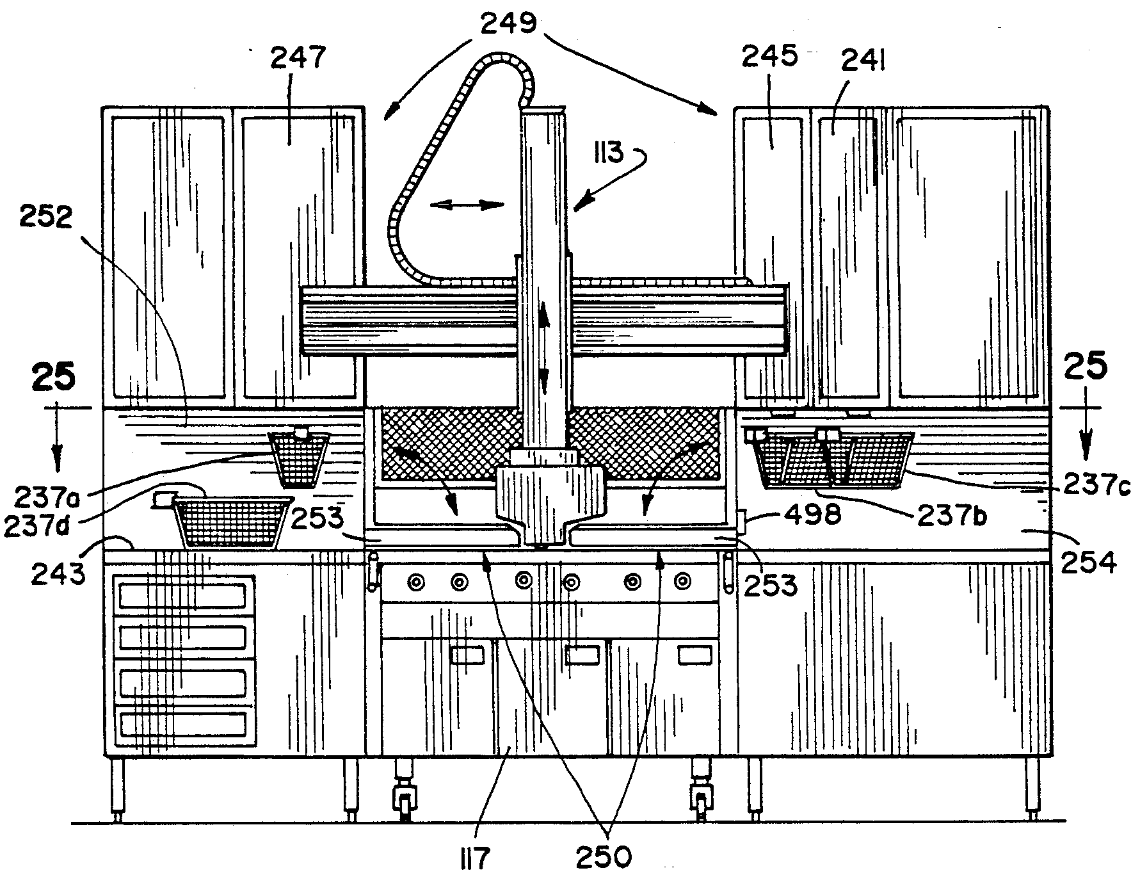
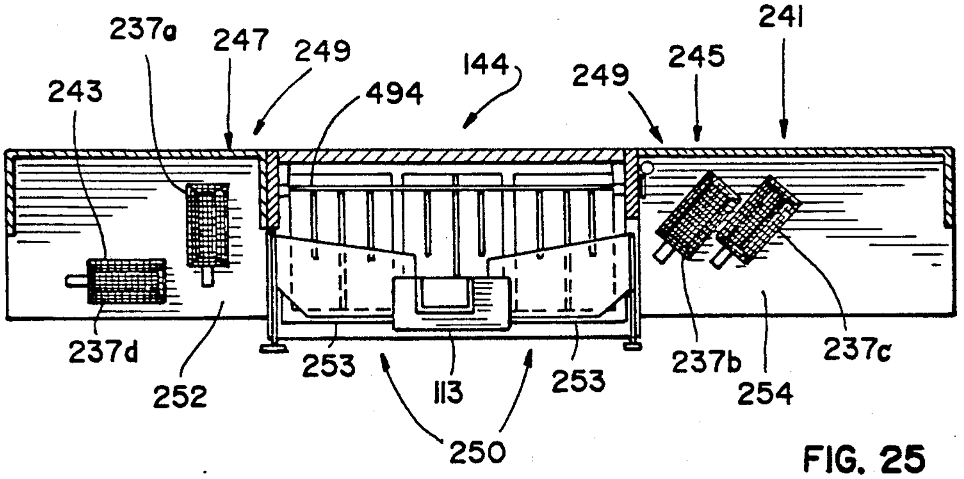
FIG. 25

FIG. 33A
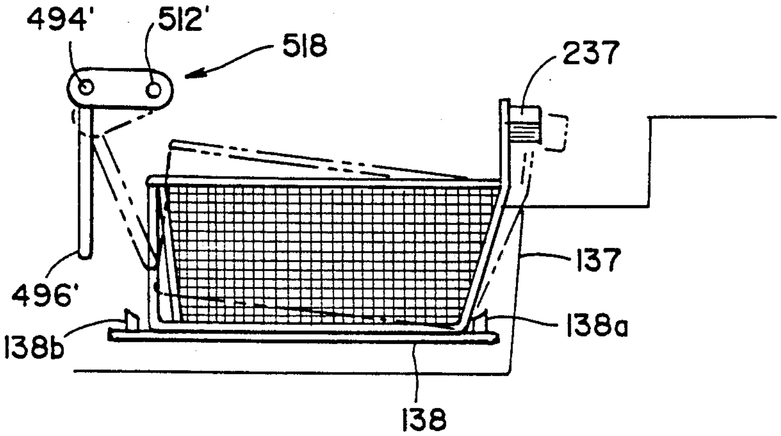
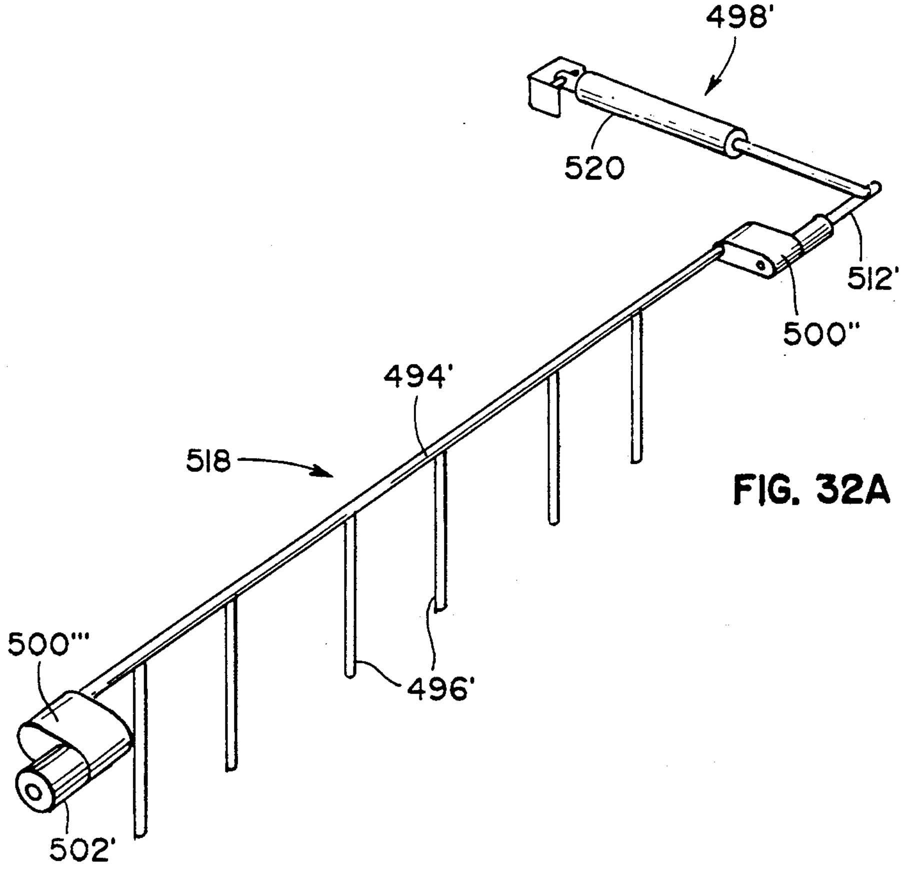
FIG. 32A

FIG. 32
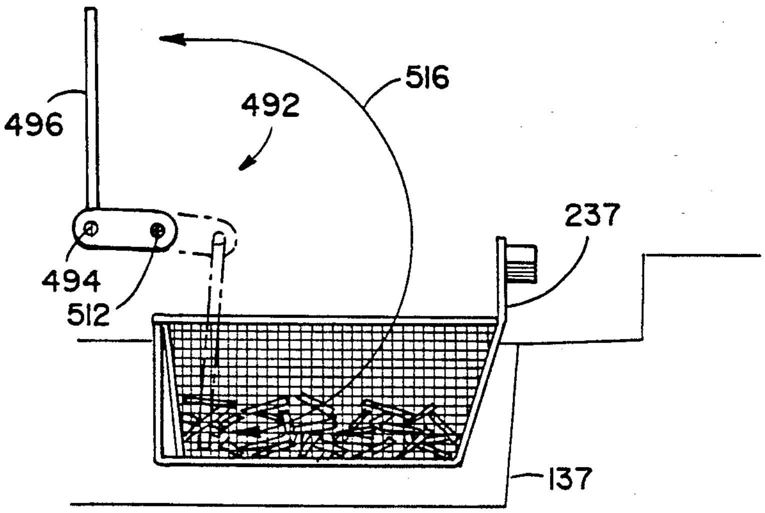
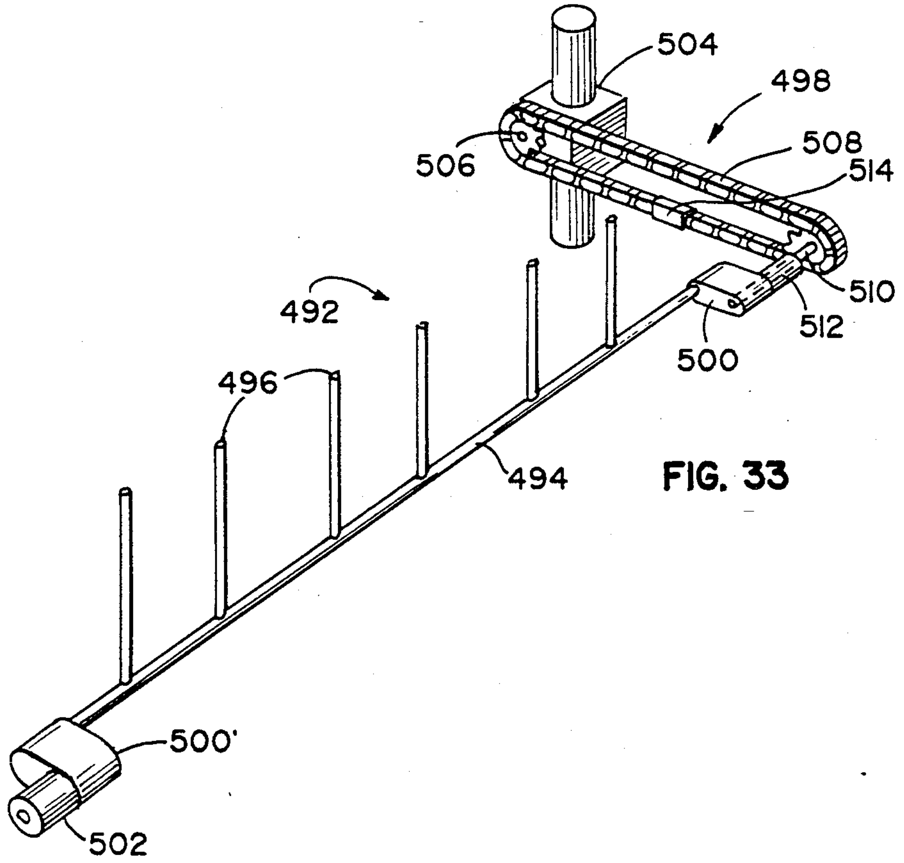
FIG. 33

FIG. 43
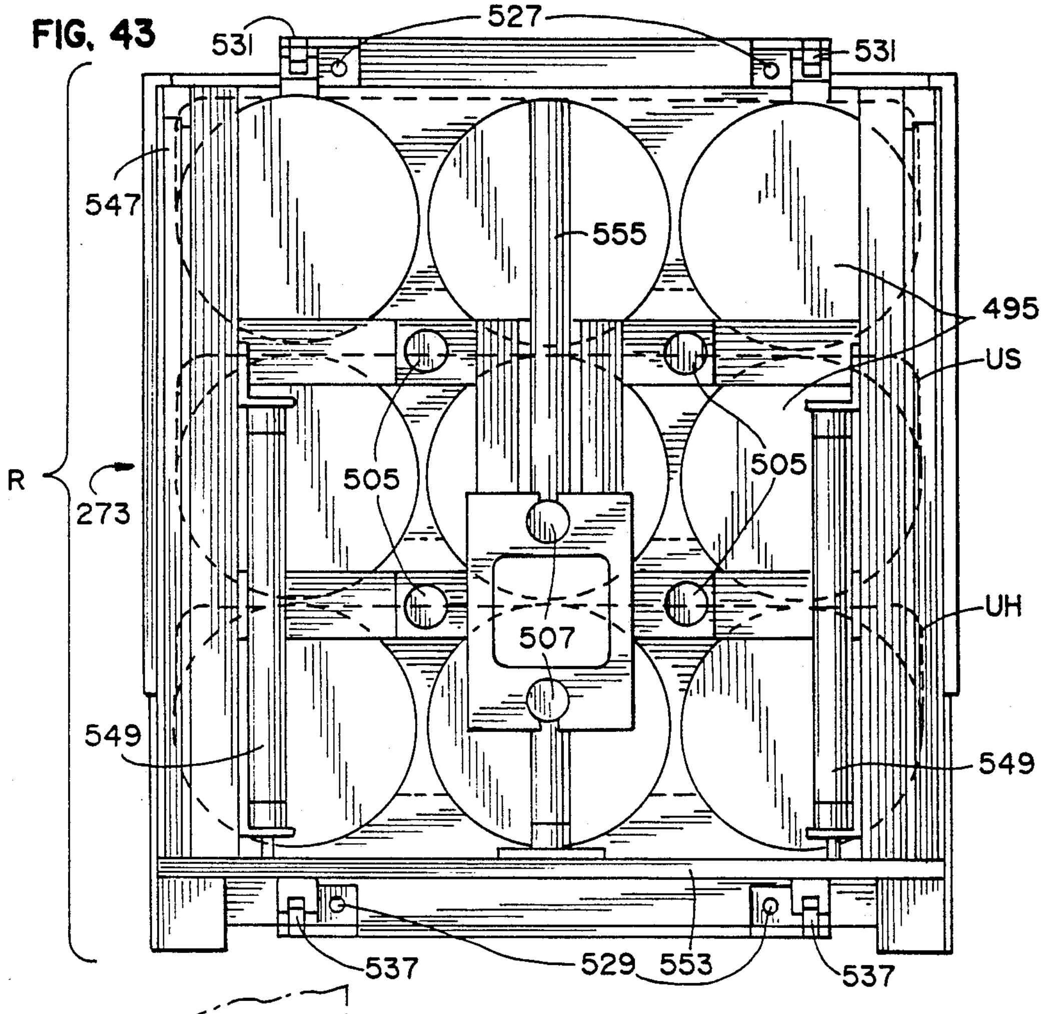
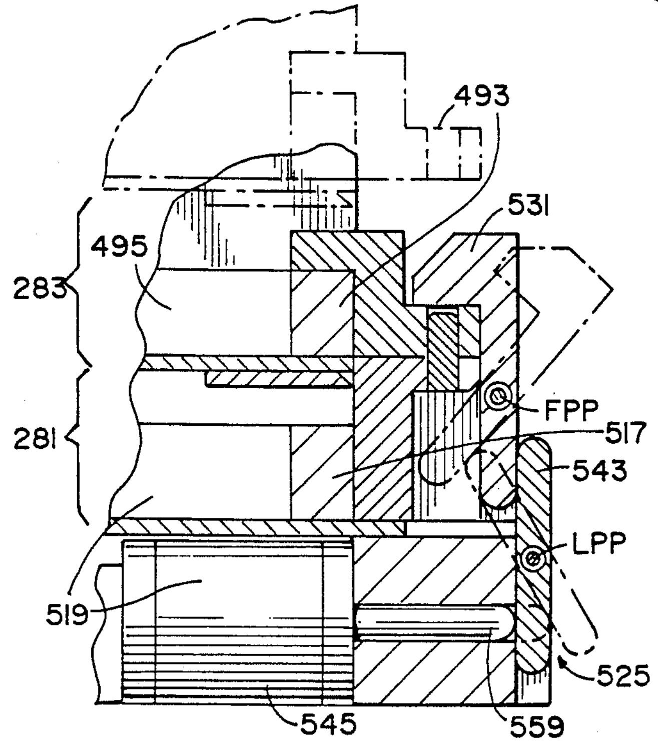
FIG. 44
FIG. 45
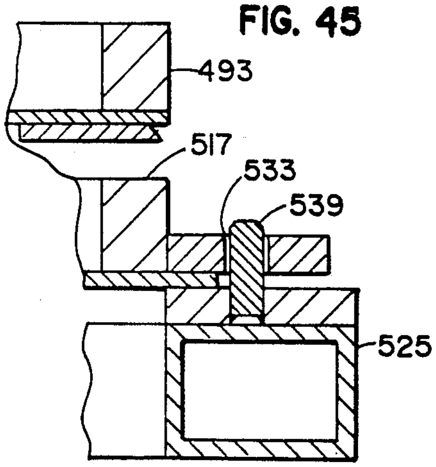

FIG. 66
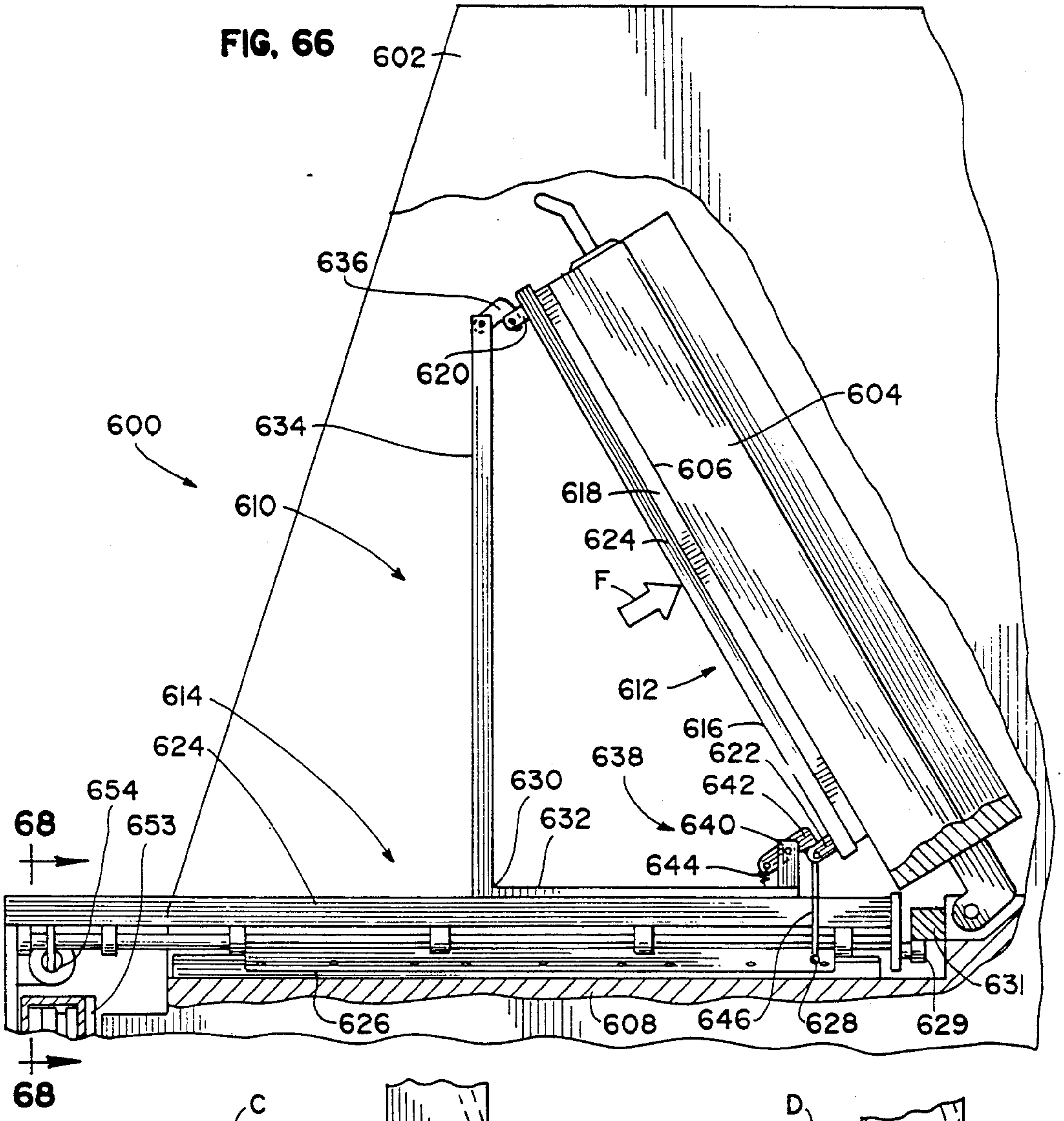
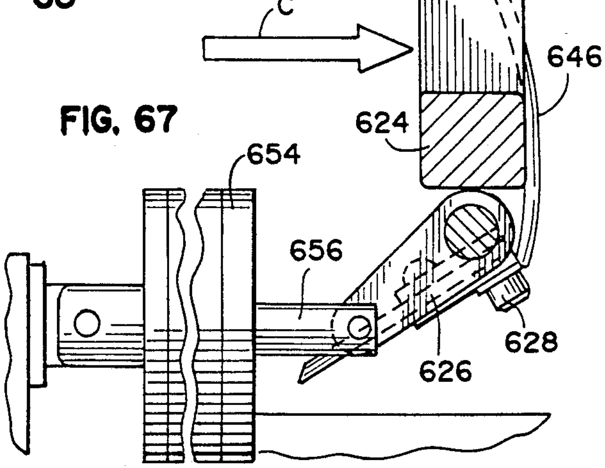
FIG. 67
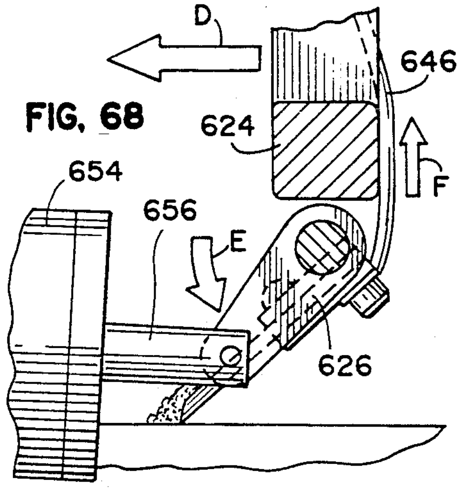
FIG. 68

SOFTWARE FLOW

COMPUTER CONTROL SYSTEM FOR FRY CELL

FOOD PREPARATION SYSTEM AND METHOD

RELATED APPLICATION

This application is a continuation of U.S. patent application Ser. No. 519,387 filed May 4, 1990, now abandoned which is a continuation-in-part application of U.S. Ser. No. 07/516,888, filed Apr. 30, 1990 entitled "Food Preparation System and Method" still pending which is a continuation of U.S. Ser. No. 07/176,568, filed Apr. 1, 1988 entitled "Food Preparation System and Method," now U.S. Pat. No. 4,922,435 the disclosures of which are hereby incorporated by reference.

FIELD OF THE INVENTION

This invention relates to systems and methods for the preparation of food, especially for quick service restaurants. More particularly, the invention relates to fully automated devices, systems and methods for food preparation that can incorporate computer controlled robotics. The devices, systems and methods are especially suited for on-site use at quick service restaurants and are especially suitable for being retrofitted on existing equipment.

BACKGROUND OF THE INVENTION

In restaurants, especially quick service (fast food) restaurants, fast, consistent, efficient and safe food preparation is essential for a successful operation. The quality of the prepared food depends in large part on the consistency of food preparation. The food must be cooked under correct conditions for the proper time.

Consistency in food preparation can vary as a result of many factors. For example, people engaged in food preparation often must perform multiple tasks at frequencies that vary with time because of constantly varying customer demand through the day. For example, lunch and dinner time may be extremely busy while other periods may be relatively slow. The product mix can vary from hour to hour and day to day. As a result, the consistency and quality of food may vary. Difficulties in proper scheduling of food production during peak and non-peak periods can cause customer delays and/or stale, wasted or unusable food.

Food preparation is labor intensive, and the labor cost is a large portion of the total cost of the prepared food. An additional problem is that in sparsely populated and other areas where quick service restaurants are located, such as along interstate highways, for example, recruiting sufficient numbers of suitable employees is difficult.

Quick service restaurants must be able to effectively meet a variable customer demand that is time dependent and not subject to precise prediction. As a result, stores relying totally on human operators will at times be overstaffed and at other times be under-staffed.

Also, problems and potential problems can exist in restaurants where people directly prepare food. Health and safety concerns can also be present where food is prepared directly by people. By reducing or minimizing human contact with food and food cooking equipment, health and safety concerns can also be reduced or minimized. For example, in the frying of foods, some type of hot fluid, such as cooking oil, must be utilized. The cooking temperatures required can present a concern for health and safety.

Although quick service restaurants have existed for many years and now number in the tens of thousands, such establishments utilize people to prepare and process food. While there have been various improvements in commercial equipment used for cooking food in quick service restaurants, all are manually operated and are relatively labor intensive.

Accordingly, a need exists for a commercially suitable food preparation device, system and method that can be operated by a robot and that provides improvements in food preparation, especially in any or all of the previously mentioned areas. It would also be beneficial if such a system could make use of existing commercial equipment.

SUMMARY OF THE INVENTION

In accordance with the present invention a food processing system and method is provided that is especially adapted for a quick service restaurant and may be computer controlled and/or fully automated and robotized. In one embodiment, the system is a cooking cell, which can be a fry cell or a grill cell, for example, that is capable of processing various types of food items that are ready to be cooked. As used herein, the terms "fry cell" and "fry basket" refer to a cell for frying a food product or products, not necessarily french fries, and to a basket for frying such products, respectively.

In another embodiment, the system is a grill cell that is capable of processing various types of food items that are ready to be cooked. As used herein, the term "grill cell" refers to a cell for grilling a food product or products, which may be hamburgers, sausage and the like as well as other food products that can be cooked or heated by grilling.

The raw food products to be fried or grilled or otherwise cooked can be frozen or fresh, cooked or uncooked. The term "uncooked" means uncooked and/or unheated and "cooked" means cooked and/or heated.

The fry cell and grill cell can each operate by automatically dispensing uncooked bulk food in desired quantities to the robot which transports in a container the quantity of food to be prepared. The food is then cooked by the system and then the robot delivers the cooked food to a storing, dispensing and display station or a work area for further preparation, assembly or other handling.

More specifically, in one embodiment, the fry cell can process, on a fully automated basis, french fries, chicken nuggets, fish filets and chicken patties or various combinations of those or similar foods.

The cooking cell is composed of a robot, and various stations including an uncooked bulk food dispensing station, a cooking station, a cooked food storage, dispensing and display station, a computer operating and control station and optionally other various stations and components. The cooking station may comprise, for example, a fry vat or a grill. All of the elements of the cooking cell can be computer controlled and operated. Human operator interfacing with the cooking cell during normal operation can occur at three areas: (1) filling the uncooked bulk food dispensing station; (2) obtaining cooked product from the cooked food storage, dispensing and display station for delivery to individual customer; and (3) control of the cooking cell through its computer operating and control system.

The operation and control of the cooking cell including its robot and other operating systems can be accomplished by the cooking cell computer operating and control system. This system monitors and controls the operation and cooking parameters of the cooking cell. This system also can provide a schedule of activities for the entire day of operation as well as a more detailed plan for the short-term period, such as an hour or less, for example. The computer system coordinates the operation of the cooking cell, which may have at least several operations occurring simultaneously. Real time point of sale information can be monitored and compared to the planned activities by the system. If the real time information varies significantly from the plan, the daily and/or short-term plans can be modified on the fly, automatically or by a human operator. For example, if a change is initiated by a human operator, the cooking cell computer can still develop the new daily or short-term plans automatically based on the operator's input regarding batch size, priority and/or demand change. Thus, the cooking cell can compensate for variations in product volume and mix that usually occur through the day. The cooking cell food processing system, which can be a fry cell or a grill cell, can produce a rate and mix of food products that is related to data contained by or transmitted to the computer system. The data can be historical sales data and/or real time data based on point of sale data as to sales rate and mix of the food products produced by the fry or grill cell or system. As a result, customer delays can be minimized, the food served to the customer is of optimum freshness and food waste is minimized.

The computer operating and control system is capable of determining whether a given instruction to cook additional food will conflict with any cooking cell operations in progress, taking into account all future processing steps that will be required for the operations in progress to be completed. Scheduling of new operations is performed in a manner by the computer operating and control system so that the robot is not required to perform multiple functions at the same time and so that food is removed from the cooking station at the desired time. As a result, the quality of the cooked food is consistently uniform.

In accordance with one aspect of the present invention, a robotized system for cooking food products is provided. The robotized system includes a robot capable of working in an area that determines a work area. In one embodiment, the robot is capable of horizontal linear movement in the work area. More specifically, the robot can move along or traverse a linear at least substantially horizontal track. A bulk, uncooked food dispensing station that includes at least one food dispenser is provided for dispensing uncooked food pieces into a moveable container, for example, a fry basket, located in the work area. The system further includes at least one cooking station for cooking the food products. An appropriate end-of-arm robot tool is provided as part of the robot to handle the desired type of food. For example, for a fry cell, the robot is capable of, in conjunction with the fry cell end-of-arm tool, selectively engaging, disengaging and moving a container, such as a fry basket, for example, to desired locations in the work area and for placing a plurality of food pieces in cooking position with respect to the cooking station while the food pieces are contained in the container. The desired locations include an uncooked food dispensing position for receiving food into the container from the food dispensing station, a cooking position for cooking the food pieces and an unloading location where cooked food is unloaded from the container. The robot travels to the various locations by moving horizontally along the linear track.

For a grill cell, the end-of-arm tool is preferably configured to allow the robot to obtain and transport food patties or other food to be grilled in a predetermined horizontal planar array, place the food items on a grill in that array, remove the cooked products from the grill, deliver and dispense the food products at a dispensing location in the array. Thus, for example, the grilled cooked food products may be dispensed on hamburger buns placed in a corresponding array at the grilled cooked food dispensing location.

In one embodiment, the uncooked food dispensing station, the cooking station and unloading station are arrayed linearly to permit the robot to move to and from and interface with those stations along a linear path. The linear array may be parallel or substantially parallel to the horizontal linear movement the robot may be capable of and to the linear horizontal track if one is present. In one embodiment, the food is unloaded from the container, placed in cooking position, reloaded into the container and transported to a cooked food unloading location where the cooked food is unloaded from the container. Storage is provided adjacent the work area for receiving and storing the cooked food. A suitable work area may be provided for further preparation after cooking and may include assembly, condiment application or other food preparation. Where desired, a dump apparatus can be provided for dumping the cooked food delivered to the dump apparatus by the robot via the container.

In accordance with another embodiment of the invention, an automatic robotized system for cooking food products is provided that includes a robot capable of engaging, transporting and releasing a food container or the food contained therein in a work area. The system further includes an uncooked food dispensing station that comprises at least one food dispenser for dispensing uncooked food to the food container in the work area and at least one cooking apparatus in the work area. A control system is provided that controls and directs the robot to engage and transport the food container in sequence to and from the food dispenser and to and from the cooking station in a frequency determined by the controlling apparatus based on the actual and/or anticipated frequency and quantity of food products ordered by customers.

In accordance with still another aspect of the present invention, and automated system for cooking food products is provided. The system includes a work area that contains dispensing, cooking and storage stations and defines an area in which an operator can interface with the stations. The dispensing station is suitable for dispensing bulk, uncooked food and comprises at least one food dispenser for dispensing uncooked food pieces into a movable fixture for transporting, dispensing and retrieving food pieces in a horizontal array. The fixture is moveable by the operator to and from the dispensing, cooking and storage stations. The operator is an automated device for automatically transferring the fixture from the dispensing station to the cooking station where food pieces can be dispensed by the fixture in the array and subsequently retrieved by the fixture manipulated by the operator after cooking by the cooking station in the array. The cooking station includes at least one grill surface for grilling food and the storage station is provided for receiving and storing the cooked food products. In accordance with this embodiment, the system may further include a computer operating and control system for controlling and directing the operator to engage and transport the food container in sequence to and from the food dispensing station and to and from the cooking station at a frequency based on historical data contained by the computer and/or on real time point of sale data transmitted to the computer on the anticipated and/or actual volume of customer order. The historical data may be for the particular store in which the system operates.

The fixture used in connection with the system for grilling food can comprise a first subfixture for receiving uncooked food from the food dispenser and delivering and depositing with the robot or operator the uncooked food on the grill surface. A second subfixture can be provided for retrieving the cooked food from the grill surface and for delivering the cooked food by the operator or robot to a storage or other area for further preparation or dispensing of the cooked food. In one embodiment, the first subfixture includes a first hoop member and a first selectively moveable spatula member that is locatable beneath the hoop member for containing and depositing food pieces in a spaced apart horizontal array. The second subfixture can include a second hoop member and a second selectively moveable spatula member locatable beneath the second hoop member for retrieving from the grill surface and depositing at the storage or other location for further preparation the cooked food in the horizontal array.

In accordance with still another embodiment of the present invention, an automatic robotized system for cooking food products is provided that includes a computer controlled robot capable of engaging, transporting and releasing a food container in a work area and various computer controlled stations. A computer controlled food dispensing station is provided that includes at least one food dispenser for dispensing uncooked food to the food container in the work area and at least one computer controlled cooking device in the work area. A computer controlled system is provided for controlling and directing the robot to engage and transport the food container in sequence to and from the food dispenser and to and from the cooking device at a frequency determined by the computer system based on the anticipated or actual frequency of customer orders. The computer controlled system also monitors, controls and operates the food dispensing station and the cooking station.

In accordance with another aspect of the invention, an automated grill system for grilling food products is provided that includes a robot capable of transporting a fixture capable of carrying a desired type of food in a work area. The fixture may be suitable for carrying hamburger or sausage patties or other types of food, depositing the food on a grill, retrieving the cooked food from the grill and depositing the cooked food at a cooked food dispensing location, while maintaining the cooked food in a predetermined horizontal planar array. The array can be as desired and may be, for example, an array composed of linear rows and columns of the food products, such as, for example, 2×2, 2×3, 3×3, 2×4, 3×4, 4×4 arrays or larger. The system further includes at least one food dispenser for dispensing uncooked food pieces, such as hamburger patties, for example, onto the fixture in the work area. The system further includes a grill station composed of a grill in the work area. Preferably, the grill is a clamshell grill that has upper and lower cooking platens for simultaneously cooking both sides of a food item, such as a hamburger or sausage patty, for example, and preferably cooks the food in the predetermined horizontal planar array. The system may further include a bun toaster for toasting the bun heel and crown such as for a hamburger, for example. A control system can be provided that controls and directs the robot to transport the fixture or a portion of the fixture, which may be accomplished in part by a mechanism external to the robot, to the food dispenser so that the food items to be cooked, hamburger patties, for example, are deposited on the fixture from the dispenser. Thereafter the robot is directed to transport the food items carried by the fixture to the grill station where the items are placed on the grill for cooking. After the food items have been cooked, the robot retrieves the cooked food items utilizing an appropriate fixture and deposits them in a predetermined location in the work area, such as on a tray, for example, preferably in the horizontal planar array, for further processing or assembly into a sandwich. Alternatively, the cooked food items may each be deposited by the robot, for example, on top of a bun heel or crown or a tray. A suitable automated scraper mechanism may be provided for scraping the grill surfaces from time to time between cooking cycles to help provide a uniform cooking surface for good heat transfer to the food items.

BRIEF DESCRIPTION OF THE DRAWINGS

FIG. 10 is a front elevation view of a portion of the robot tool of FIG. 9 illustrating various movement the robot is capable of;

FIG. 24 is a front elevation view of an alternate embodiment of a fry cell in accordance with the invention;

FIG. 25 is a plan view of the fry cell of FIG. 24;

FIG. 32 is a perspective view of a stir mechanism useful for the fry vats of the fry cell of FIG. 1;

FIG. 32A is a perspective view of a basket rocking mechanism useful for the fry vats of the fry cell of FIG. 1;

FIG. 33 is a fragmentary side elevation view of the fry cell of FIG. 1 with the addition of the stir mechanism of FIG. 32;

FIG. 33A is a fragmentary side elevation view of the fry cell of FIG. 1 with the addition of the rocking mechanism of FIG. 32A;

FIG. 43 is a top plan view of the frame of FIG. 3 in the retracted position;

FIG. 44 is a fragmentary elevational view illustrating the operation of an uncooked hoop spring finger;

FIG. 45 is a fragmentary elevational view of a transfer shuttle hoop guide pin and hoop guide aperture;

FIG. 66 is a side elevation view of the grill and grill scraper of FIG. 65 illustrating the scraper engaged on the upper and lower grill surfaces;

FIG. 67 is an enlarged fragmentary view along lines 67—67 of FIG. 65;

FIG. 68 is an enlarged fragmentary view along lines 68—68 of FIG. 66;

FIG. 81 is a block diagram illustrating one embodiment of the control and operation system for the fry cell;

DETAILED DESCRIPTION OF THE INVENTION

Figure 1:
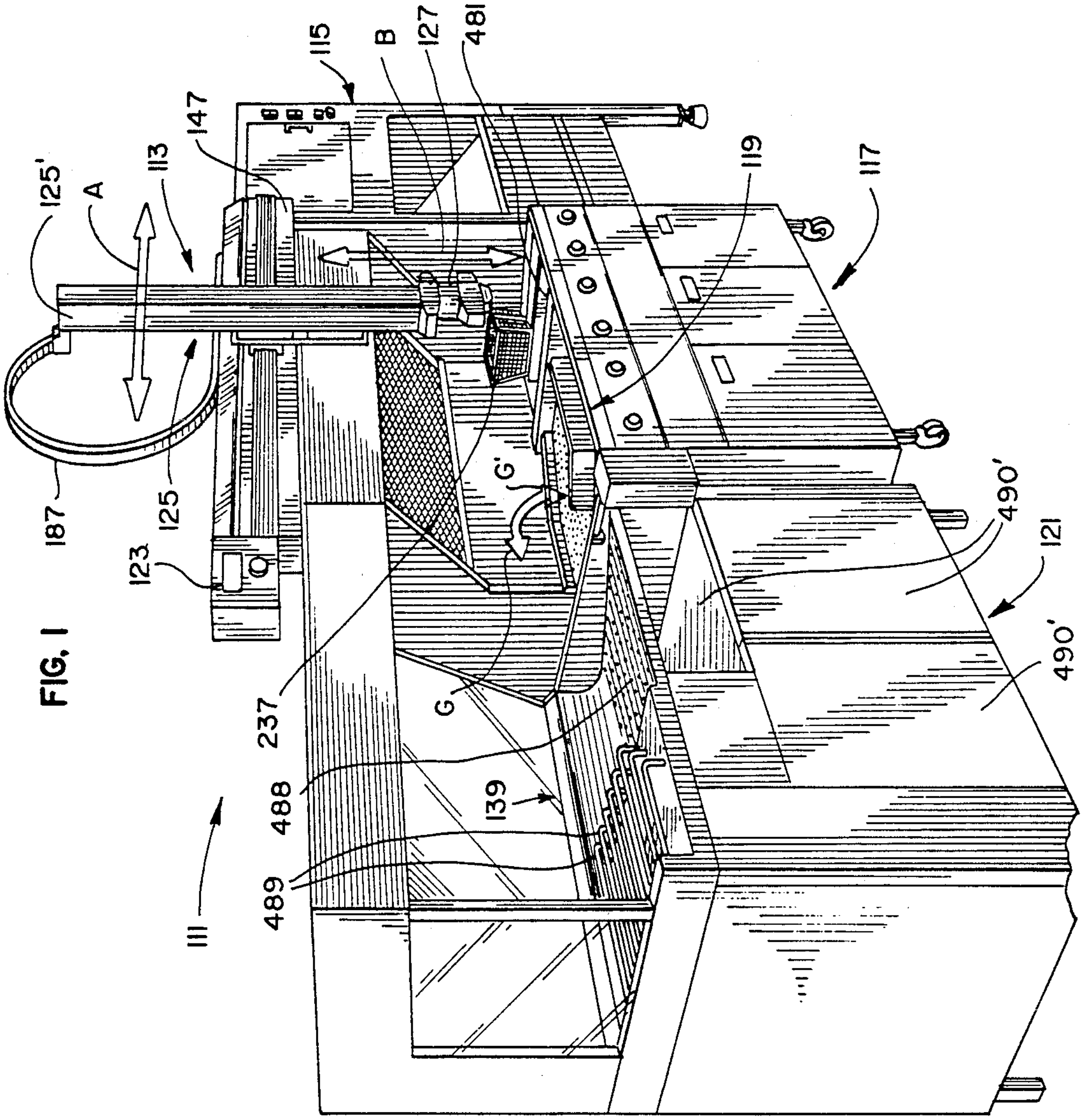
FIG. 1 is a perspective view of a robotized fry cell in accordance with the invention.

General Fry Cell and Grill Cell Description

Referring to the Figures generally, where like reference numerals refer to like parts, and in particular to FIGS. 1-5, there is illustrated a perspective view of a robotized fry cell 111 in accordance with the present invention. Fry cell 111 is composed of a robot 113 and various stations and components. The stations of fry cell 111 include an uncooked bulk food dispensing station 115, cooking station 117, a dump station 119, a cooked food storage display and dispensing station 121, and a computer operating and control station 123.

Fry cell 111 is especially useful in quick service restaurants and kitchens where a large volume of food must be cooked in relatively small batches to insure freshness and quality and where the food product mix and volume demand varies as a function of customer demand, which is usually time dependent and can vary rapidly from hour to hour and even more frequently. For example, at quick service restaurants, product demand and mix varies substantially and rapidly from pre-lunch through post-dinner times, as well as varying from day to day, week to week and seasonally, and as a result of specific events, such as the arrival of a tour bus or other large group of people at a restaurant. Fry cell 111 is capable of adjusting to such events and varying the rate, and with the addition of additional uncooked food dispensers, varying the product mix and rate accordingly.

Fry cell 111 is capable of dispensing, cooking and depositing the cooked food in its own cooked food storage, display and dispensing station 121 where a human operator obtains the cooked food to fill customer orders.

As configured in FIG. 1, fry cell 111 can handle and process french fries in sufficient quantities to handle the demands of most quick service restaurants, even during their highest peak hours. Uncooked food dispenser 115 is a box french fry dispenser, hereinafter described in detail. Fry cell 111 can be easily reconfigured for handling other types of food, such as chicken nuggets, fish filets, chicken patties, individually sized pies merely by incorporating an appropriate uncooked food dispenser. Suitable dispensers are known in the art and are disclosed in U.S. patent application Ser. No. 07/176,568 filed Apr. 1, 1988, now U.S. Pat. No. 4,922,435. More than one type of dispenser can be utilized in fry cell 111 as illustrated in FIGS. 24 and 25 and hereinafter described. Because of the linear track configuration, it is anticipated that typically no more than four food dispensers will be utilized in fry cell 111. Suitable cooked food storage stations can be added to handle different food types if desired. For handling a single food type, the typical maximum capacity for the various types of foods (weight is on an uncooked basis) for fry cell 111 is shown in Table I.

TABLE I

| Food Item | FRY CELL CAPACITY Quantity/Hr. | Baskets/Hr. |
|---|---|---|
| french fries | 180 lbs. | 90 |
| chicken nuggets | 60 lbs. | 24 |
| fish filets | 225 filets | 28 |
| chicken patties | 196 patties | 32 |
| individually sized pies | 144 pies | 9 |
| or hash browns | 420 hash browns | 35 |

Figure 2:
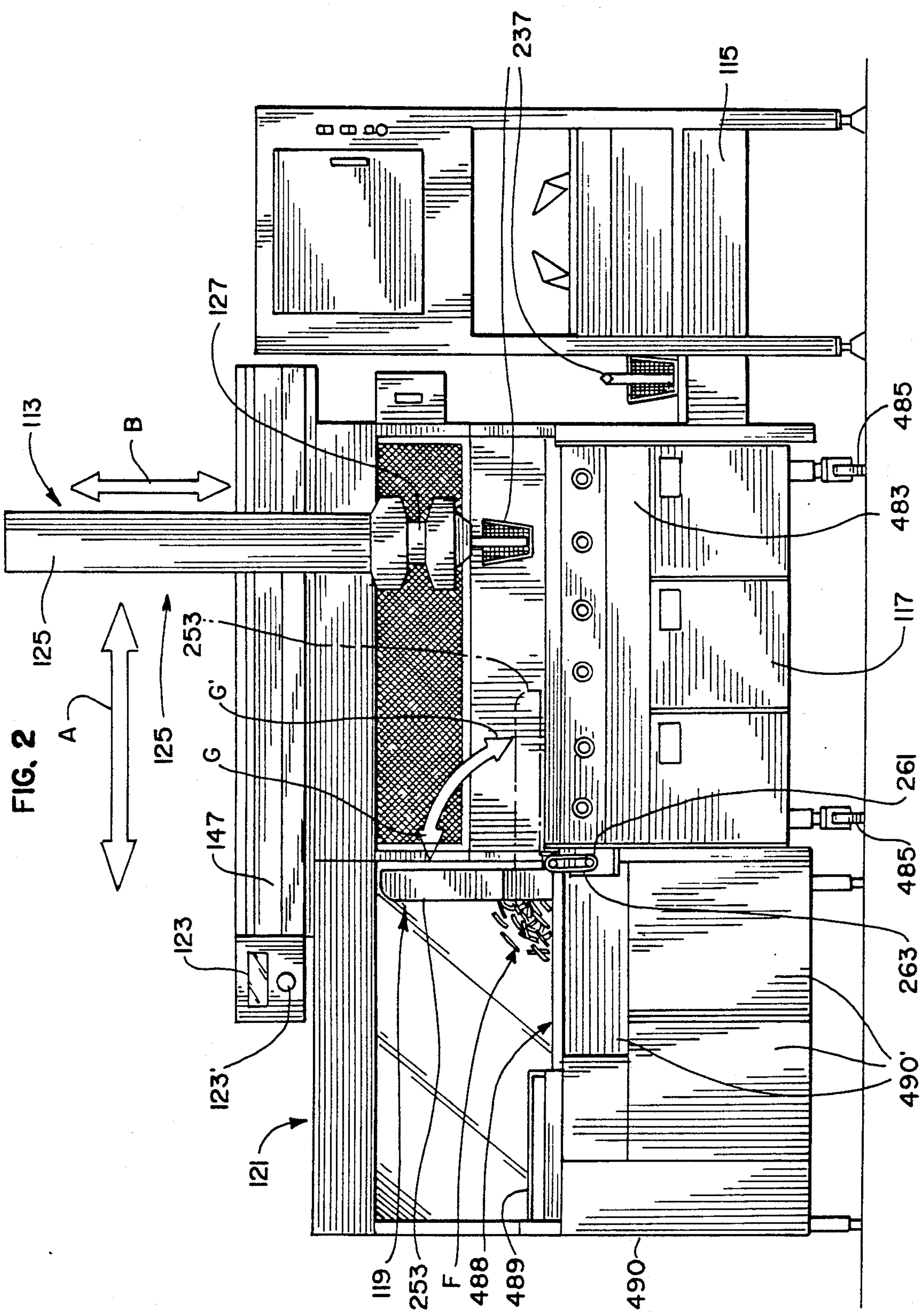
FIG. 2 is a front elevation view of the fry cell of FIG. 1.
Figure 3:
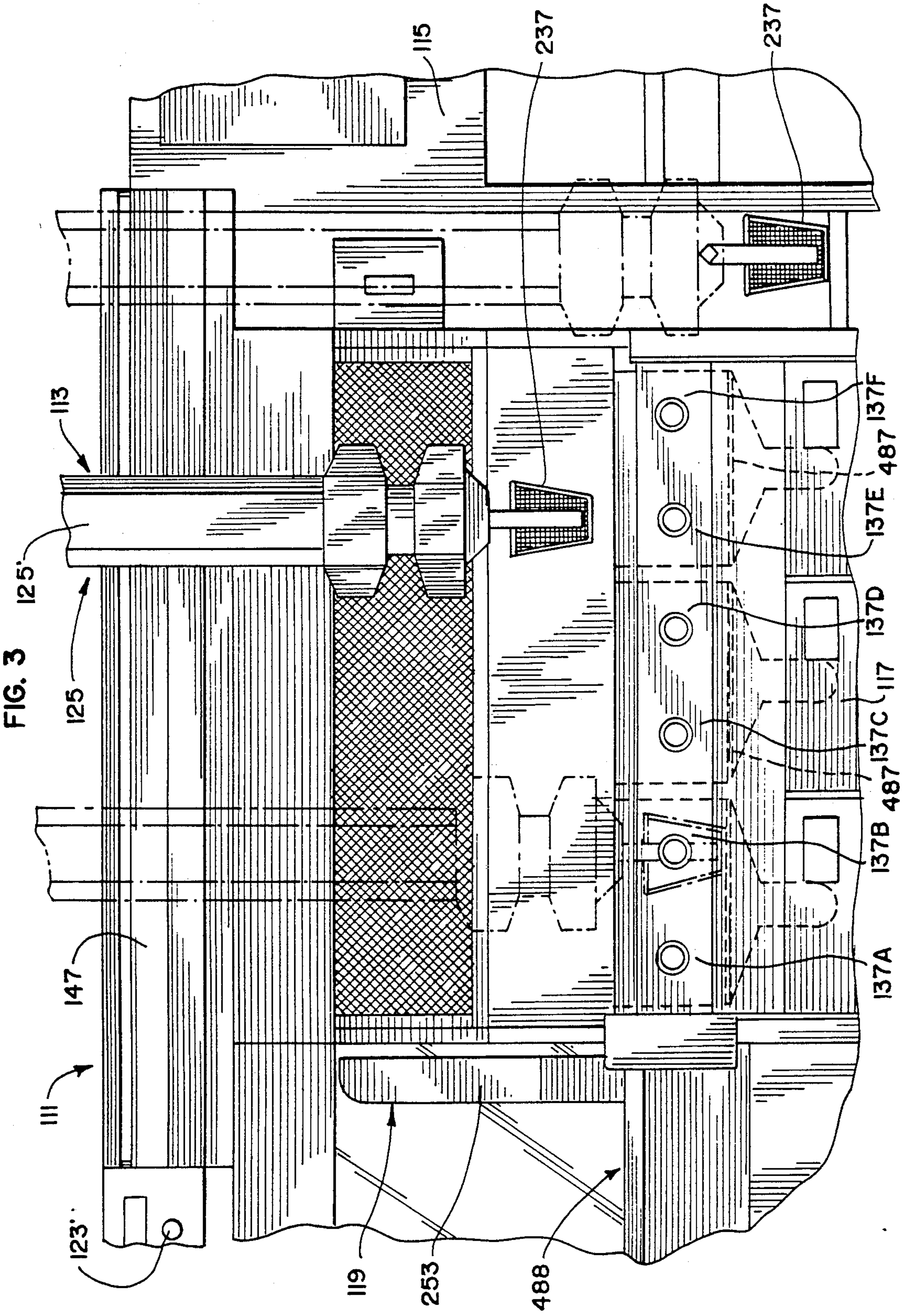
FIG. 3 is a front elevation view of a portion of the fry cell of FIG. 1 illustrating different robot positions.
Figure 4:
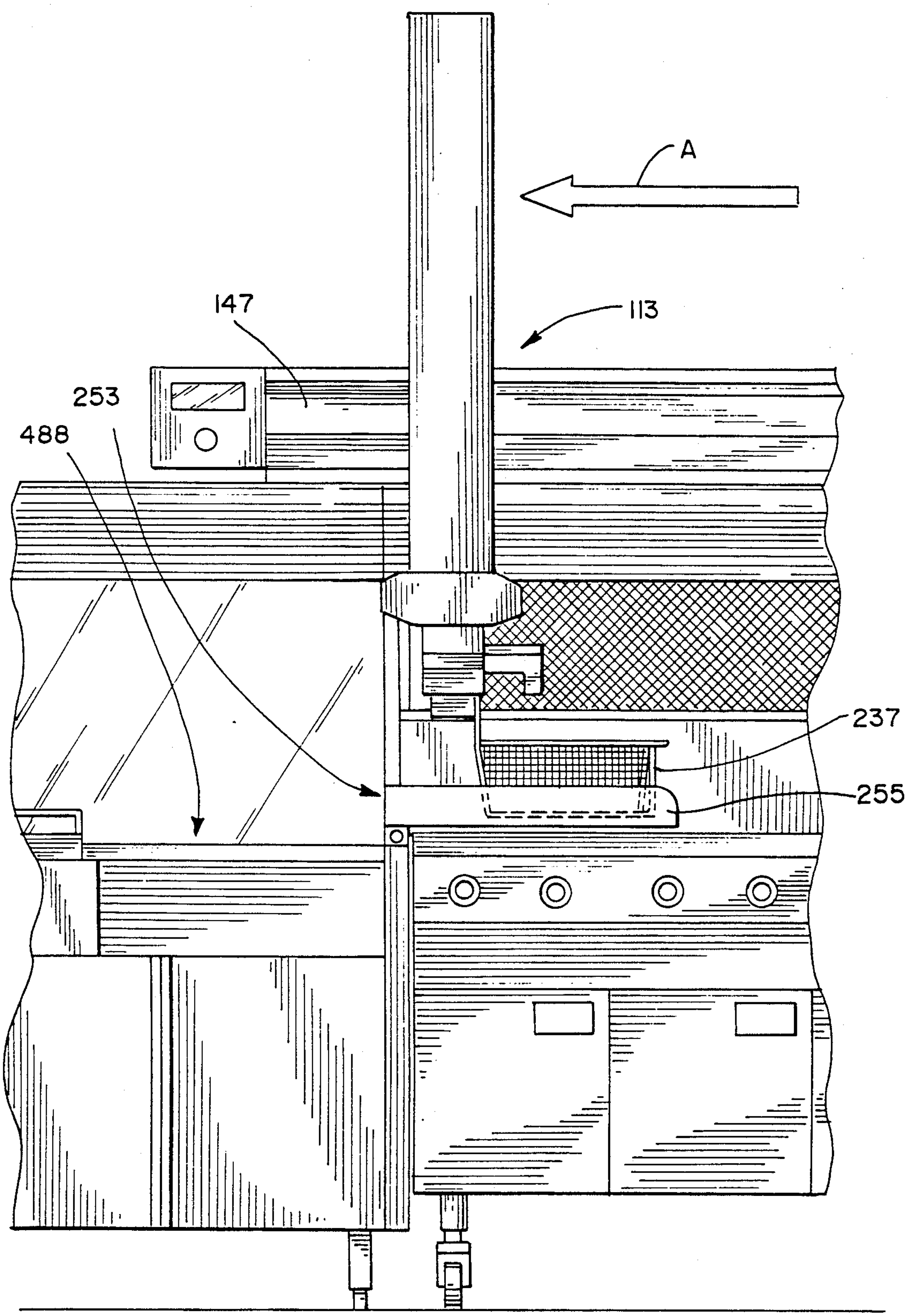
FIG. 4 is a front elevation view of a portion of the fry cell of FIG. 1 illustrating the robot in position to dump the basket contents.

FIGS. 1 and 2 illustrate the direction of movement of several elements of fry cell 111, specifically the vertical and horizontal movement of robot 113 and dump station 119. As illustrated in FIG. 3, a robot 113 is mounted on the top of cooking station 117 and the top end of cooked food storage display and dispensing station 121. Robot 113 is relatively simple in design and can be easily retrofitted on existing equipment in use at quick service restaurants.

Referring to FIGS. 1-2 and 9-10, robot 113 is composed of structure 125 for providing horizontal movement (axis 1, indicated by arrow A) which includes a shroud cover 125', a vertical axis arm 127 for vertical movement (axis 2, indicated by arrow B) attached to structure 125, a horizontal axis arm 129 for rotation in a horizontal plane (axis 3, indicated by arrow C) and a wrist or vertical axis arm 131 (axis 4, indicated by arrow D).

Figure 9:
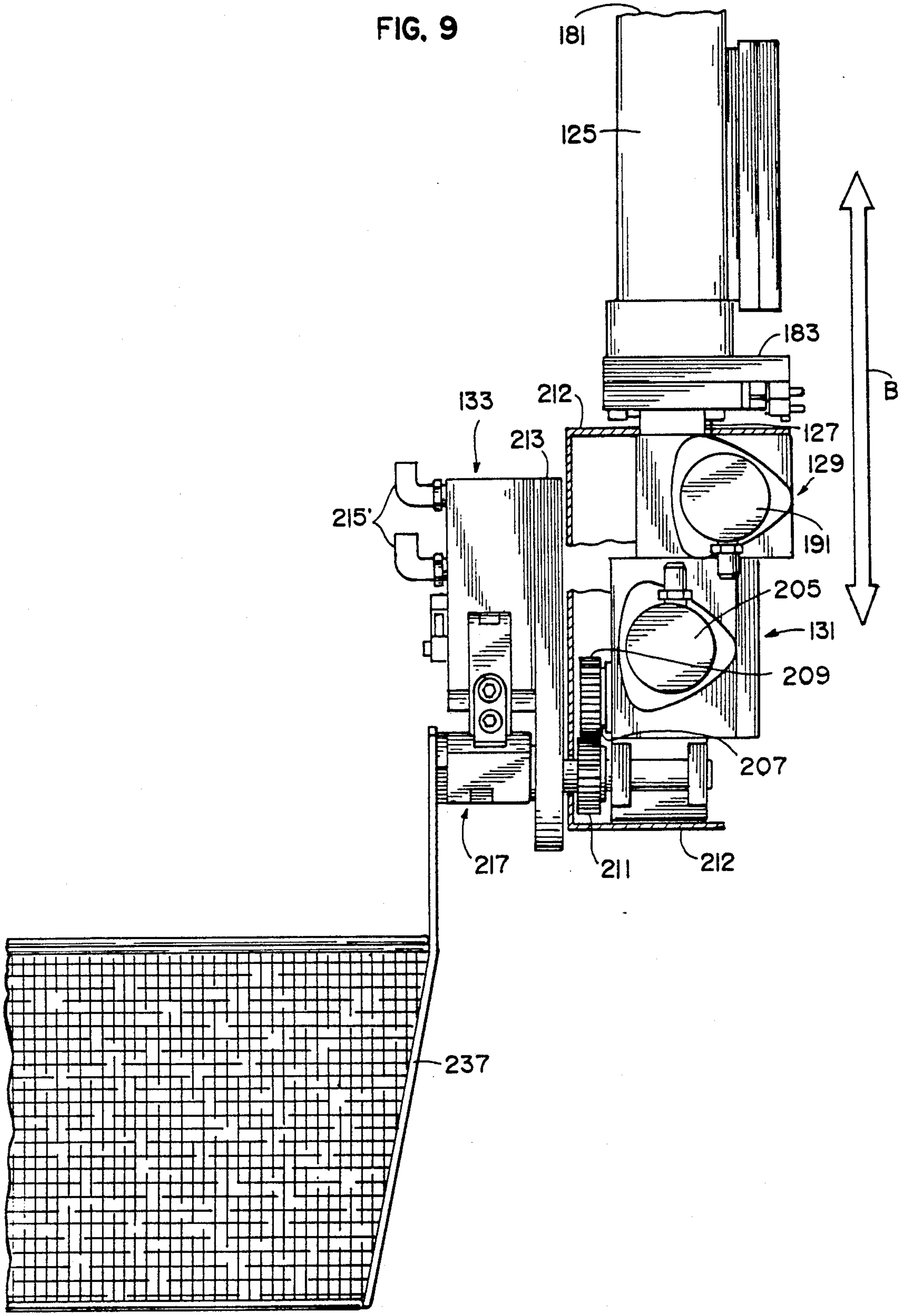
FIG. 9 is a side elevation view of a portion of the robot gripping a fry basket.
Figure 10:
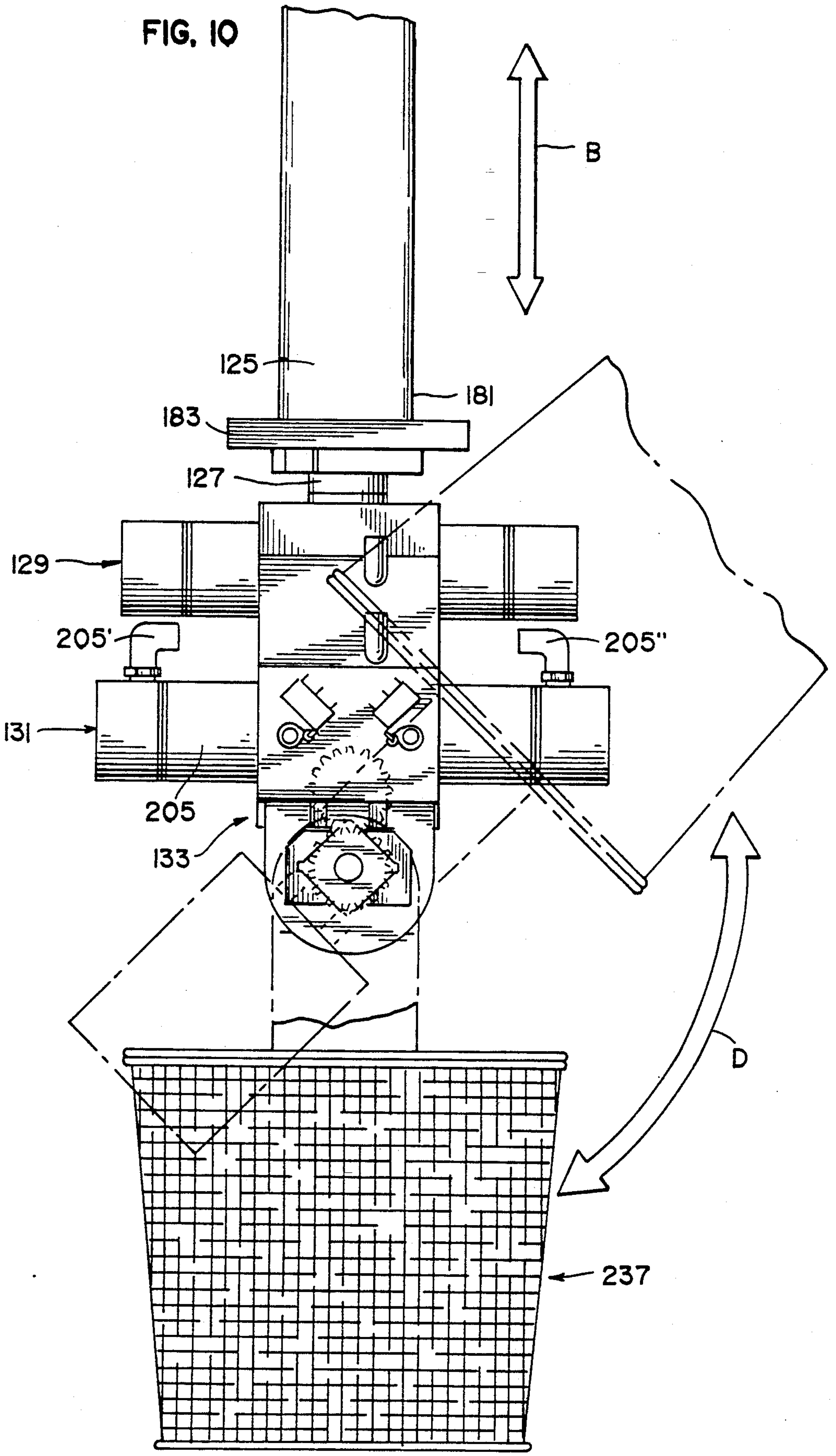
Figure 11:
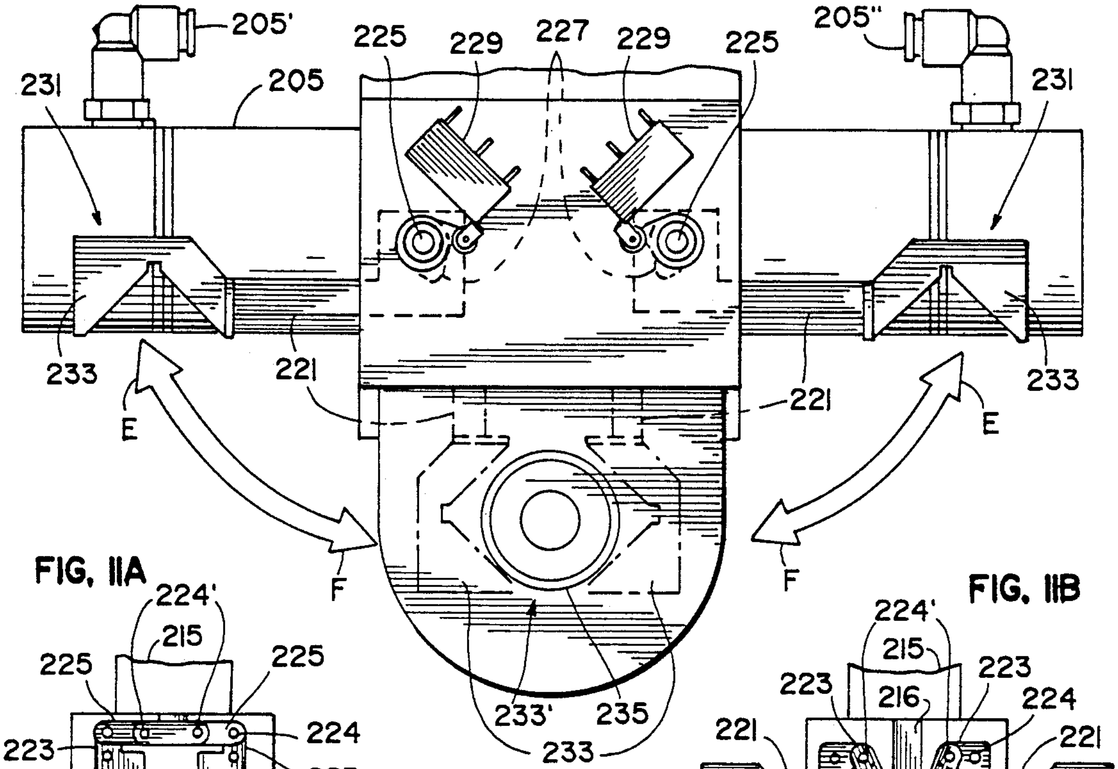
FIG. 11 is a front elevation view of a portion of the robot of FIG. 9 illustrating the end of arm robot tool in gripping and open positions.

The robot also includes a novel end of arm tool 133, illustrated in FIGS. 9-11, that allows efficient and reliable engagement to fry baskets that are used to contain and transport the various food products during the various fry cell operations.

Figure 13:
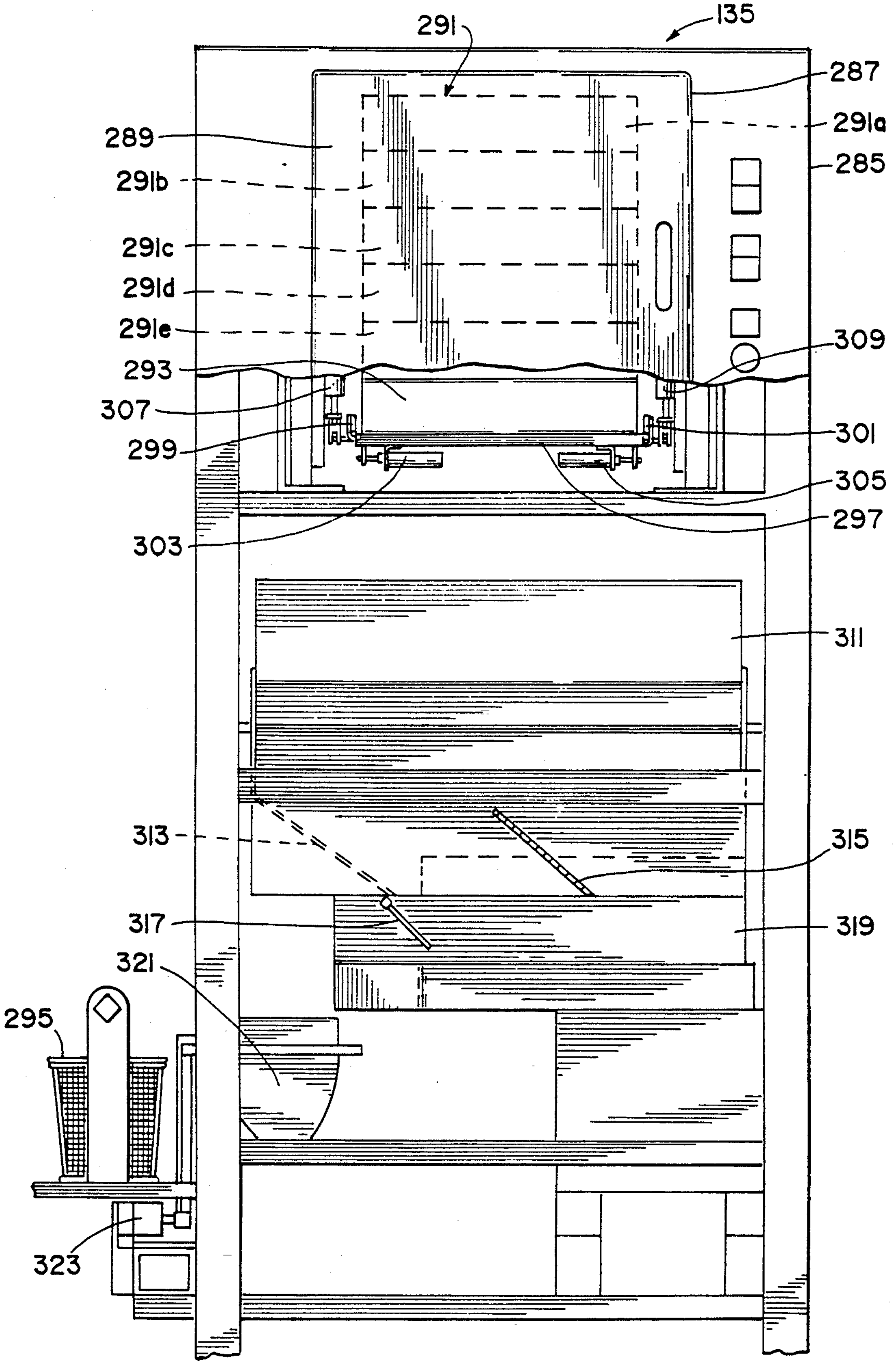
FIG. 13 is a front elevation view, partly in section, of a box french fry dispenser forming part of the fry cell of FIG. 1.

Uncooked bulk food dispensing station 115 as illustrated in FIGS. 1-2 consists of a box french fry dispenser 135 as shown in FIG. 13. Other types of food dispensers could be utilized. For example, dispensing station 115 could comprise a chick patty dispenser, an optional pie basket pick-up platform, a fish filet dispenser or a chicken nugget dispenser. Such devices are disclosed in U.S. patent application Ser. No. 07/176,568, filed Apr. 1, 1988, now U.S. Pat. No. 4,922,435. Uncooked food dispensing station 115 operates to dispense the desired type of food into a separate fry basket that is delivered to dispensing station 115 by robot 113. After a fry basket is filled with a desired amount of food, robot 113 transfers the fry basket to cooking station 117.

Cooking station 117 consists of one or more fry vats 137 and associated equipment as hereinafter discussed. Preferably, at least one separate fry vat is provided for each type of food that is cooked by fry cell 111 to avoid any taste contamination of the cooking oil utilized in fry vats 137. Fry vats 137 include structure for locating and holding the fry baskets in proper position within one of the fry vats 137 for cooking food contained therein.

After robot 113 places a fry basket in position with respect to the locating structure, robot 113 disengages from the fry basket and the basket is held in place by the locating structure, leaving robot 113 free to perform other tasks during cooking of food contained in that particular fry basket.

After the food has been cooked within fry vat 137, robot 113 is directed by computer operating and control station 123 to remove the fry basket from fry vat 137 and transport it to cooked food storage display and dispensing station 121 via dump station 119.

Cooked food storage, display and dispensing station 121 preferably consists of a french fry bagging station 139 for storing french fries delivered by robot 113 and dump station 119. Additional storage facilities may be included if a different or more than one type of food is to be processed by fry cell 111. In operation, robot 113 delivers and dumps a basket of cooked french fries into dump station 119, depending on the type of food. Robot 113 positions the fry basket in a position using structure similar to that used in connection with fry vats 137. Robot 113 then disengages from the fry basket and is free to perform other tasks. Dump station 119 is thereafter activated by computer operating and control station 123 to raise fry chute 141 and dump the food from fry chute 141 into french fry storage area 143 of cooked food storage display and dispensing station 121. The cooked food products, in this example, french fries are stored at dispensing station 121 and are ready for packaging and delivery to customers.

An alternate fry cell embodiment is illustrated in FIGS. 24 and 25, which illustrate a fry cell 144 capable of processing chicken nuggets, fish filets and chick patties, hereinafter described in further detail.

Figure 34:
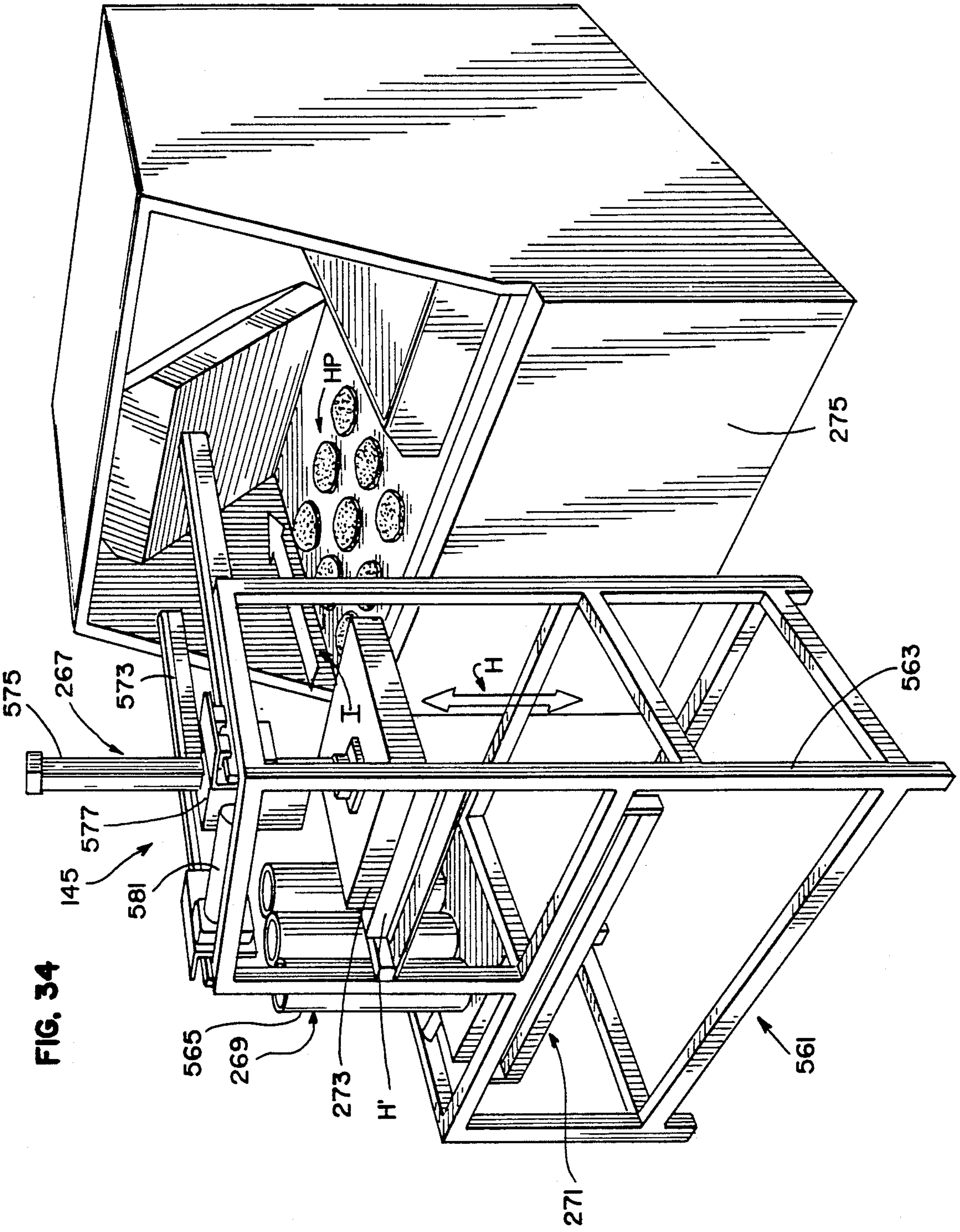
FIG. 34 is a perspective view of a portion of a grill cell in accordance with the invention.
Figure 35:
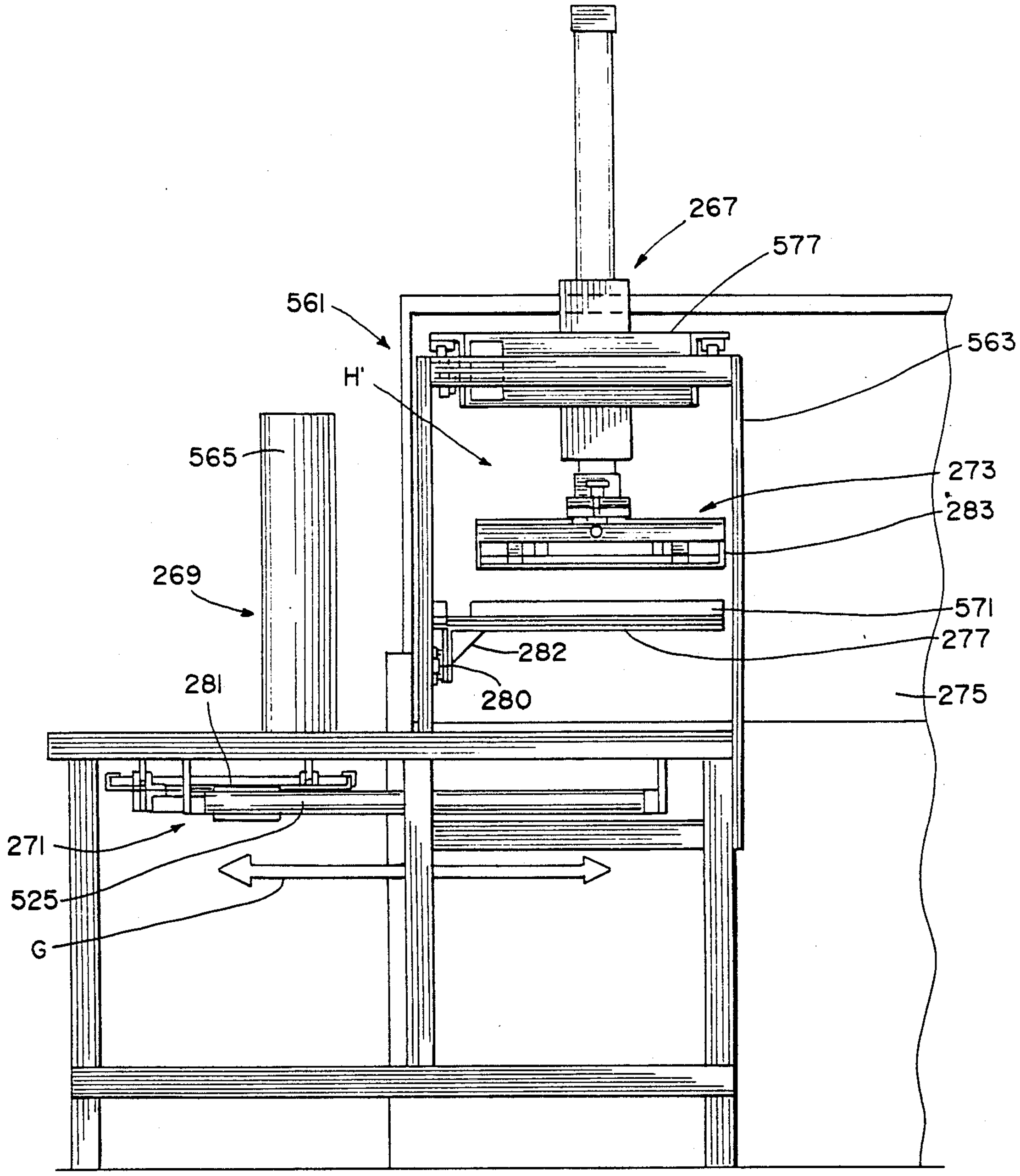
FIG. 35 is a fragmentary front elevation view of the grill cell of FIG. 34.
Figure 36:
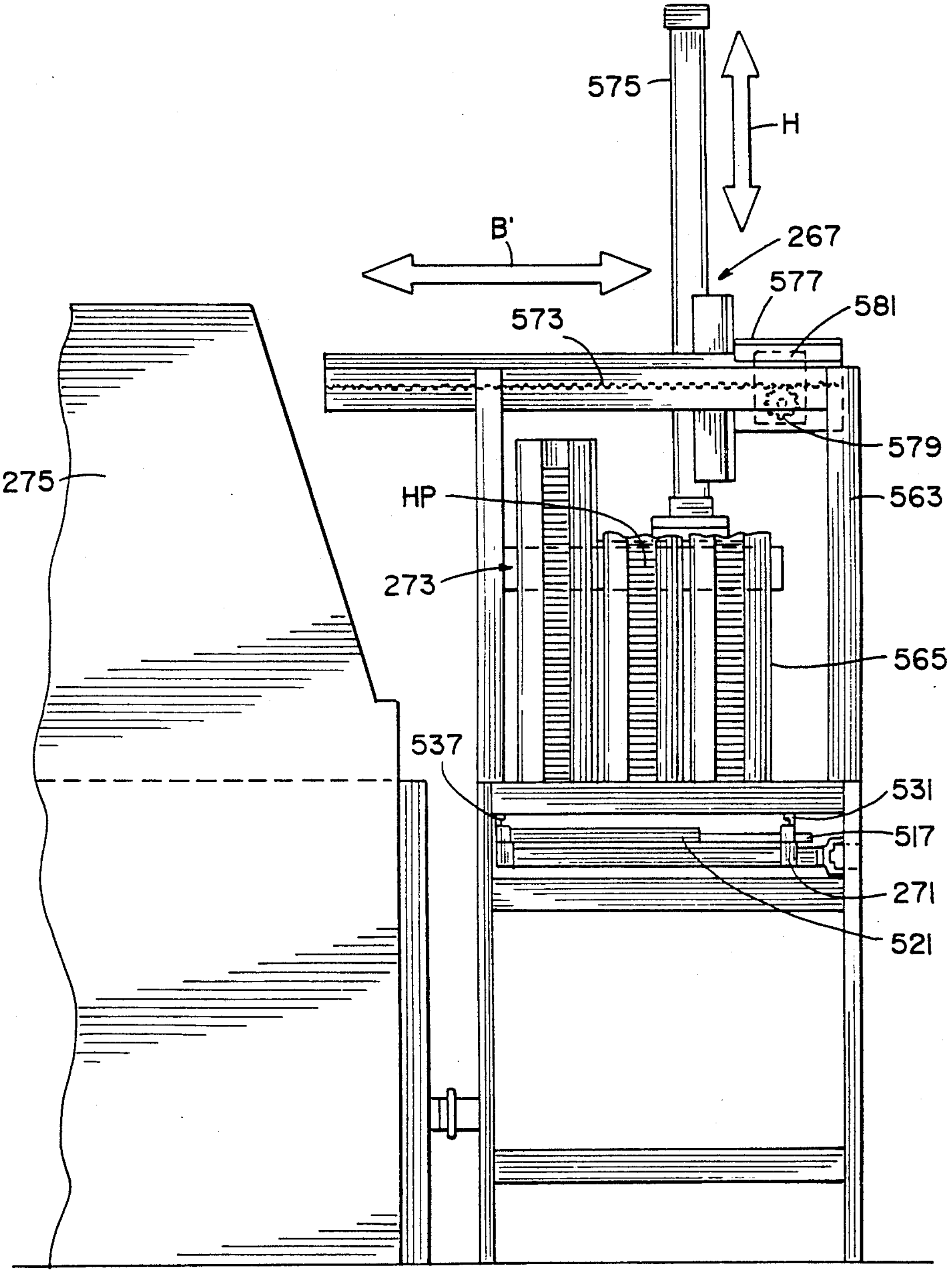
FIG. 36 is a fragmentary side elevation view of the grill cell of FIG. 34.

Referring to the Figures generally, and in particular to FIGS. 34–36, there is illustrated an automated robotized grill cell 145 in accordance with the present invention. Grill cell 145 is composed of a robot 267 and various stations and components. The stations of grill cell 145 include an uncooked bulk food dispensing station 269, a transfer shuttle 271, a grill cell end-of-arm tool or fixture 273, a cooking station 275, a cooked food deposit station 277 (shown in FIGS. 35 and 50) and a bun toaster station 279 (shown in FIG. 70).

Grill cell 145 is especially useful in quick service restaurants and kitchens where a larger volume of food must be cooked in relatively small batches to ensure freshness and quality and where the food product mix and volume demand varies as a function of customer demand, which is usually time dependent and can vary rapidly from hour to hour and even more frequently, as previously described. Grill cell 145 is capable of adjusting to such events and varying the rate, and with the addition of additional uncooked food dispensers, varying the product mix and rate accordingly.

Grill cell 145 is capable of dispensing, cooking and depositing the cooked food in its own cooked food deposit station where a human operator obtains the cooked food to fill customer orders and/or for further processing, such as assembly into a hamburger sandwich.

As configured in FIG. 34, grill cell 145 can handle and process hamburger patties in sufficient quantities (up to about 540 patties per hour) to handle the demands of most quick service restaurants, even during their highest peak hours. Grill cell 145 can be easily reconfigured for handling other types of food, such as chicken breasts, fish, as well as other types of food that can be cooked by grilling, by incorporating an appropriate uncooked food dispenser and suitable modifying, if necessary, grill cell fixture 273. More than one type of food dispenser can be utilized in grill cell 145.

Various aspects of grill cell 145 are illustrated in FIGS. 34–36. Specifically, the horizontal movement of transfer shuttle 271, indicated by arrow G in FIG. 35 where transfer shuttle 271 moves between food dispensing station 269 and robot 2267 for delivering the uncooked food products from dispenser 269 to robot 267 on frozen food fixture 281. Robot 267 is then lowered vertically as indicated by arrow H in FIGS. 34 and 36 and robot 267 picks up uncooked or frozen food fixture 281 by attaching it to the bottom of cooked food fixture 283 which is attached to robot 267. Thereafter, uncooked food fixture 281 is vertically raised and delivered to cooking station 275 by horizontal movement towards cooking station 275 indicated by arrow I in FIGS. 34 and 42. The hamburger patties or other food carried by uncooked food fixture 281 are then deposited onto the grill of cooking station 275 by robot 267 and cooking of the food items begins. Thereafter, robot 267 withdraws from cooking station 275 and lowers uncooked food fixture 281 onto shuttle 271 located beneath robot 267 for transfer of uncooked food fixture 281 to uncooked food dispensing station 269.

When the cooking of the food items is completed by cooking station 275, robot 267 removes the food items from cooking station 275 with cooked food fixture 283 and transports and deposits the cooked food items at cooked food deposit station 277 where the food items, such as hamburger patties, may be deposited directly onto hamburger buns by robot 267 for further processing by a human operator or machine.

In accordance with one embodiment, a computer operating and control station plans and controls the timing and operation of fry cell 11 and/or grill cell 145 and can obtain data from electronic point of sale devices to modify food production based on customer demand. Initial planning is based upon files maintained by the computer. Computer operating and control station communicates with the robot controller and other devices of fry cell 111 and grill cell 145 and can receive data from point of sale devices on a real time basis.

Starting with the files in memory, the computer generates a schedule of planned activities for the overall day in general terms and a more detailed plan for the short-term period such as an hours, for example, which period can be divided into shorter periods, such as fifteen minutes, for example. The daily plan is projected for the day from opening to closing, while the short-term plan is more detailed, covering specific activities. As the day progresses, the computer compares the planned activities to what is actually happening as orders as processed from the point of sale devices. If the real time information differs significantly from planned activities, then either one or both the daily and short-term plans can be modified, either automatically or by an operator, on the fly. If there is a demand for an item greater than what is available, it is possible for the point of sale signal data or store manager, for example, to interrupt the short-term plan and the computer will modify its plan to handle the unusual demand or change, while maintaining the activities already in process.

The computer can be responsible for the following activities:

(1) daily plan for varying production rates (and mix of products if more than one product is processed by the fry cell);

(2) short-term plan of fry cell functions including robot and other equipment and giving commands to the robot and other equipment at specified times;

(3) monitoring and maintaining, in conjunction with the robot, the shortening levels in all fry vats;

(4) monitoring the temperatures of all cooking apparatus;

(5) tracking point of sale data on a real time basis and comparing to a projected trend;

(6) responding to interruptions by a point of sale signal or management for changes in immediate customer requirements, (and/or product mix if more than one product is processed by the fry cell);

(7) maintaining the prices, product mix (if applicable), and sales rate for different periods of the day; and (8) adjusting the product mix (if applicable) and product rate on a daily basis with the capability to take into account changes in product mix and volume due to promotions, advertising and seasonal impacts upon business.

The short-term schedule generated by the computer is important for coordinating the robot activities and for timely producing the different food items. This is important for producing quality items in a timely manner. The computer automatically generates and keeps track of all sequences of events to be performed by the fry cell and/or grill cell. For example, a typical sequence to be performed at designated times for fry cell 111 may be: (1) load a first batch of french fries in a fry basket; (2) deliver to fry vat A; (3) start fries in fry vat A; (4) load a second batch of french fries in another fry basket; (5) deliver and start the second batch in fry vat B; (6) remove the first batch from fry vat A; (7) deliver the first batch to dump station 119; (8) dump the first batch into station 121; (9) remove the second batch from fry vat B; (10) deliver to dump station 119; and (11) dump the second batch into station 121. The computer controls these steps by signaling the robot or other device with the appropriate command and appropriately operating the equipment of the fry cell.

A typical sequence for grill cell 145 may be: (1) load a desired number of hamburger patties into the uncooked food fixture from the food dispensing station; (2) transport the uncooked food fixture by the transfer shuttle to the robot; (3) couple the uncooked food fixture to the cooked food fixture; (4) deliver and deposit the hamburger patties in cooking position; return the uncooked food fixture to the food dispensing station to load additional patties; (5) remove the cooked patties from the cooking station; (6) deposit the cooked patties at the cooked food deposit station. The computer controls these steps by signaling the robot or other device with the appropriate command and appropriately operating the equipment of the grill cell.

On a real time basis, the information from the point of sale units or by command from the store manager or operator can interrupt the schedule in order to change the product priority and/or production rate of the robotic production fry cell. The interrupt is done in such a manner that all activities in process in the fry cell are still scheduled, and the schedule of the priority item is worked into the short-term plan as soon as possible. Any product that has already been dispensed will be processed in accordance with the scheduled plan. The plan can be automatically modified so that production is maintained satisfying the daily plan.

Fry Cell Robot and End of Arm Tool

FIGS. 1-5 and 9-11 illustrate robot 113 mounted on the top of cooking station 117 and station 121. While robot 113 could be floor mounted or suspended from a ceiling, mounting robot 113 as shown provides several benefits. For example, robot 113 can be easily installed by bolting it to existing equipment, takes up no floor spaced and does not require installation of ceiling supports. The illustrated installation also permits manual operation if desired or if a need for service of any components arises. Such access also facilitates cleaning which is an important part of any efficient fast food operation.

Figure 6:
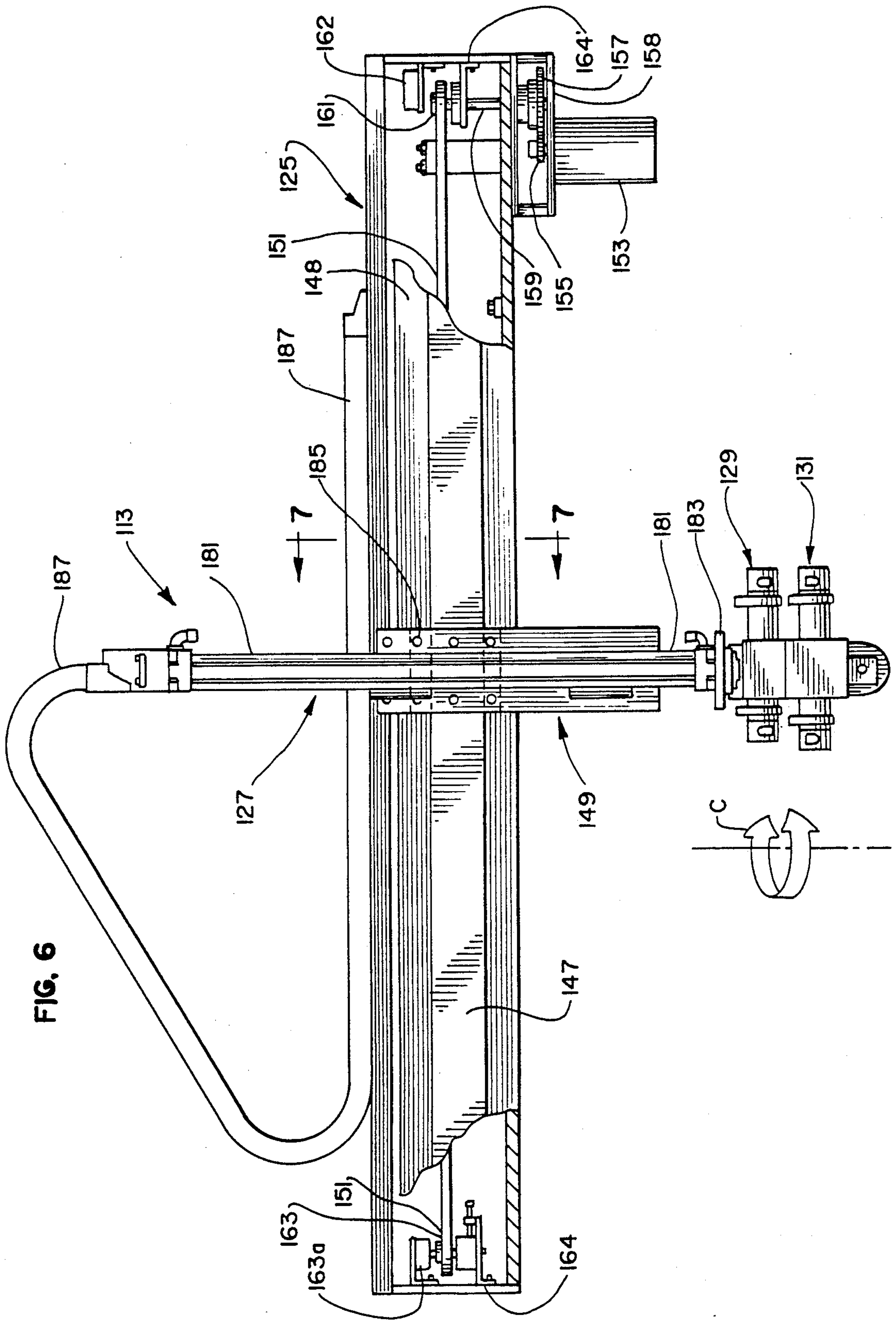
FIG. 6 is a front elevation view partly in section of the linear track assembly and drive mechanism for horizontal movement of the robot.

Referring to FIG. 6, the basic elements of robot 113 are illustrated. Robot 113 is composed of a linear horizontal structure 125 for providing horizontal movement (axis 1, indicated by arrow A in FIGS. 1 and 2), vertical axis arm 127 (axis 2, indicated by arrow B in FIGS. 1 and 2), horizontal axis arm 129 (axis 3, indicated by arrow C and wrist or vertical axis arm 131 (axis 4, indicated by arrow D in FIG. 10) and end of arm tool 133. Thus, robot 113 is a four axis articulated robot having five degrees of freedom.

Structure 125 is composed of a linear horizontal track 147 secured to a track frame 148, a carriage assembly 149 that rides on track 147 and is driven by an endless belt 151 that is secured to carriage assembly 149. Belt 151 is drive by a drive motor 153, which is this case is a stepper motor, that transmits its power through a drive mechanism composed of gears 155 and 157, enclosed in an appropriate housing 158, a shaft 159 connected to gear 157 and a drive pulley 161. A limit switch 162 is mounted over pulley 161 which defines a zero position reference point for robot 113 travel. Switch 162 can be an Omron Z-15G022-B7-K limit switch or other similar device. Belt 161 extends parallel to track 147 and returns to drive pulley 161 via drive pulley 163. A pulse line encoder **163*a* is coupled to pulley shaft 159 for sensing the position of robot 113. One suitable encoder 163*a* can be a Hewlett Packard Heds-5500E06 200 pulse line encoder. Pulleys 161 and 163 are held in place and supported by support mounts 164 and 164', respectively, secured to the ends 148" of track frame 148. A belt tension adjustment device 164" can be provided, shown on mount 164', for adjusting the tension of belt 151**.

Figure 7:
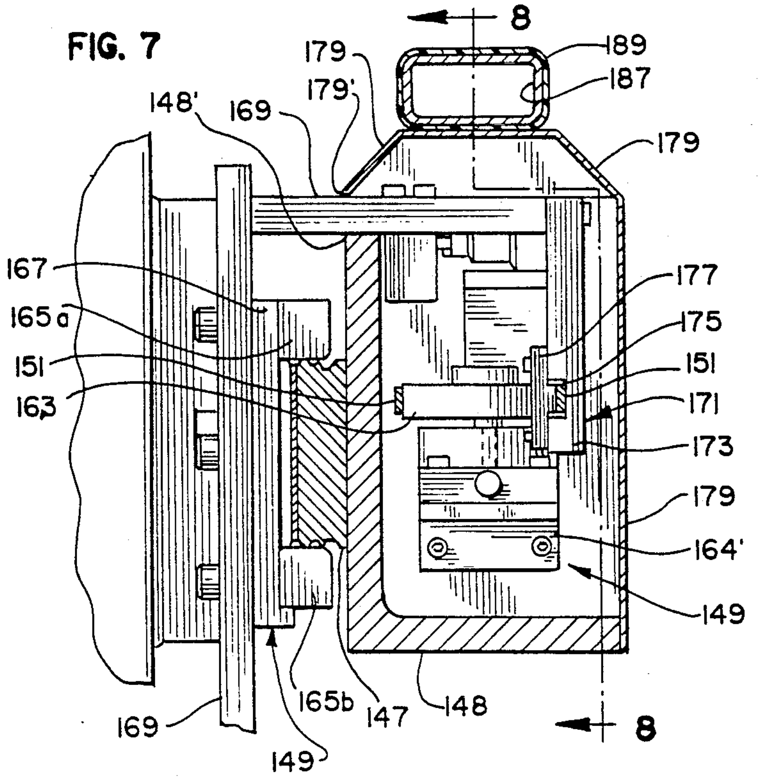
FIG. 7 is a sectional side view along lines 7—7 of FIG. 6.
Figure 8:
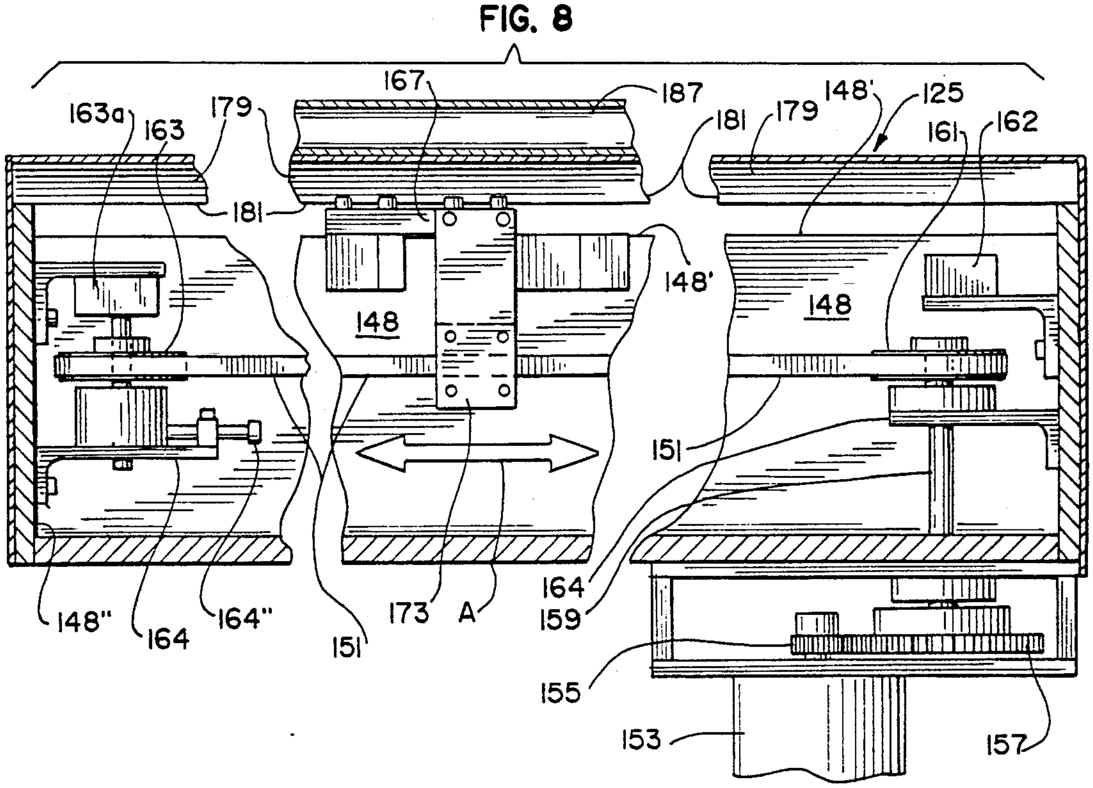
FIG. 8 is a sectional plan view along lines 8—8 of FIG. 7.

As shown in FIGS. 7 and 8, carriage assembly 149 is composed of spaced apart guides **165*a–b* that traverse the top and bottom of track 147, respectively. Guides 165*a* and 165*b* each have a ball bearing surface 165' that contacts track 147 to facilitate movement thereover. Guides 165*a* and 165*b* are mounted to a guide support 167 which is in turn secured to mounting plate 169. Carriage 149 is secured to belt 151 by means of a clamp 171 that forms part of carriage 149. Clamp 171 includes a clamping bracket 173 having a channel 175 therein to receive belt 151. A clamping plate 177 complementary to clamping bracket 173 is secured to clamping bracket 173 with belt 151 being securely clamped therebetween so that when belt 151 is driven by drive pulley 161, carriage assembly 149 and the portion of robot 113 attached thereto, including the structure for providing movement in axes 2–4 and end of arm tool 133, move with belt 151**.

Structure 125 includes a suitable cover 179 to enclose the mechanism of structure 125. A rubber lip (not shown) may be provided along lower front edge 179' of cover 179 to extend downwardly towards the top of track frame 148 and another rubber lip (not shown) can extend upwardly from the upper front edge 148' of track frame 148 and overlap with the other rubber lip to prevent foreign objects or matter from entering or leaving the volume enclosed by cover 179 and track frame 148. The rubber lips could be spread apart by the portion of carriage assembly 149 that extends between lower front edge 179' of cover 179 and upper front edge 148' of track frame 148 as it traverses track 147.

Figure 5:
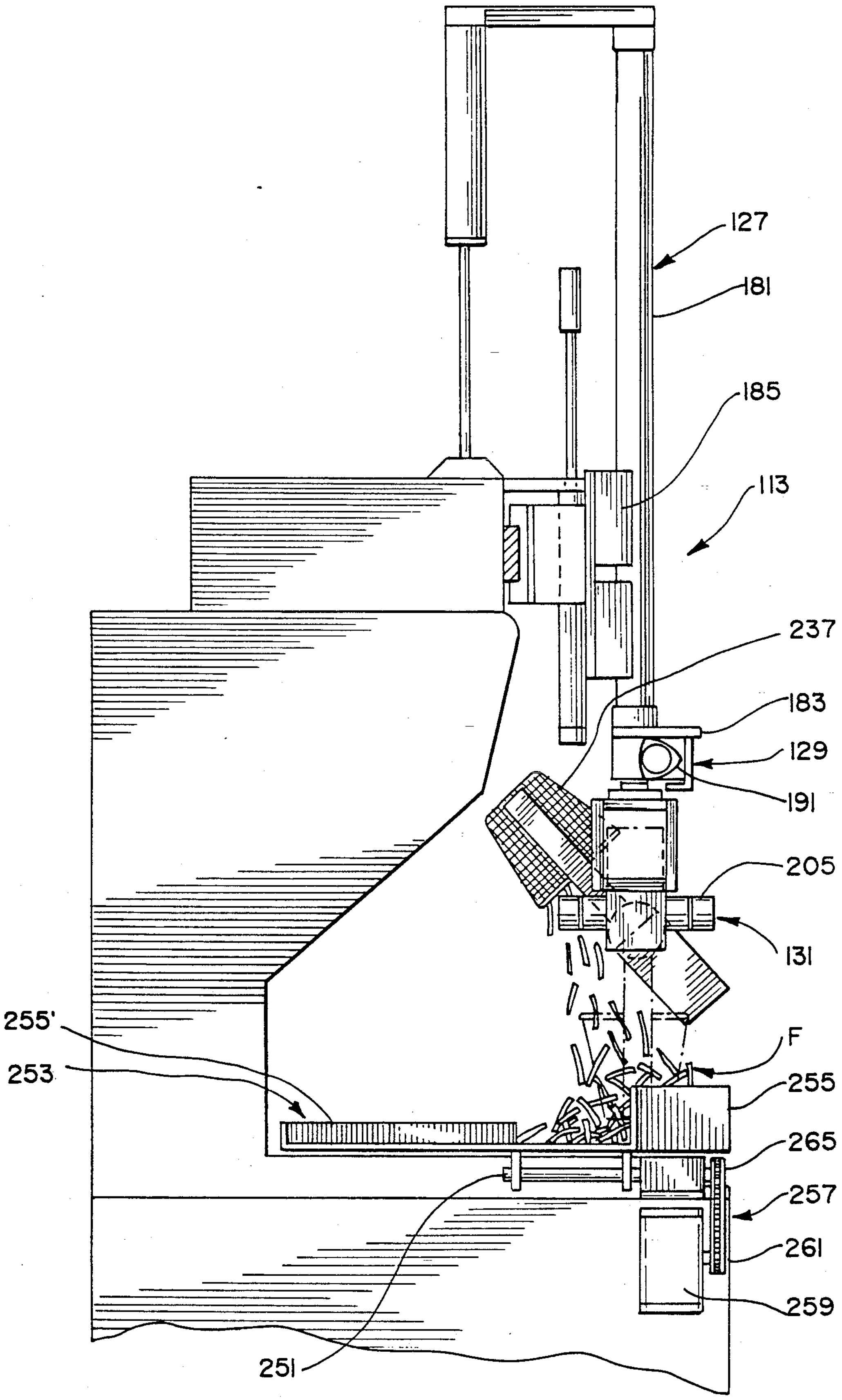
FIG. 5 is a side elevation view of the fry cell of FIG. 1 illustrating the dumping of the contents of the basket by the robot.

Referring to FIGS. 5 and 6, vertical axis arm 127 of robot 113 includes a vertically disposed cylinder 181 which in the illustrated embodiment is a rodless air cylinder for providing the desired vertical movement (axis 2) of arm 127 and a mounting plate 183 to which horizontal axis arm 129 is secured. A carrier bracket 185 is mounted to carriage assembly 149 for allowing vertical axis arm 127 to be moved horizontally. Bracket 183 is attached to the piston (not shown) of cylinder 181. Suitable rodless cylinders for use in accordance with the invention are well known in the art and are commercially available from Origa Corporation of Elmhurst, Ill. and from Tol-O-Matic Corporation. Compressed air and connection for sensors and controllers can be supplied to cylinder 181 and other parts of robot 113 via a flexible conduit 187 (not shown in FIGS. 2-4). Flexible conduit 187 can be metal and encased in plastic sheathing 189.

Figure 12:
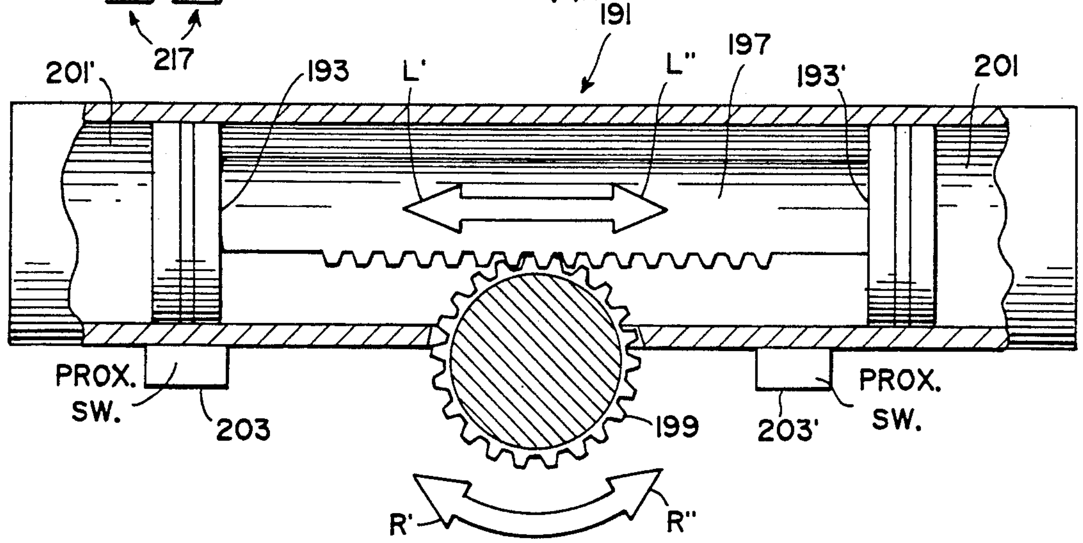
FIG. 12 is a sectional view of a rotary air cylinder useful in accordance with the invention.

Horizontal axis arm 129 is secured to mounting plate 183 of arm 127. Horizontal axis arm 129 is composed of a rotary air cylinder 191, having air inlet and outlet ports (not shown) for providing rotation in a horizontal plane (axis 3) for robot wrist 131 and end of arm tool 133 which depend from horizontal axis arm 129. A portion of rotary air cylinder 191 is illustrated in partial sectional view in FIG. 12 and is also well known in the art. Two pistons 193 and 193' are separated in cylinder 191 by a gear 197 which can move in the directions indicated by arrows L' and L" which in turn rotates gear 199 in the direction of arrow R' or R", respectively, thereby imparting the desired rotation when pressure is increased or decreased on either end 201, 201' of cylinder 191. Proximity switches 203, 203' sense the position of gear 197 thereby sensing the position of gear 199. Gear 199 drives a gear (not shown) on wrist 131 thereby causing a horizontal rotation of wrist 131 controlled by the amount of rotation of gear 199.

Referring to FIG. 9, wrist or vertical axis arm 131 is secured via a shaft (not shown) to gear 199 and horizontal axis arm 129. Wrist 131 is composed of a rotary air cylinder 205 similar in construction to rotary air cylinder 191 previously described and having inlet and outlet air ports 205' and 205" respectively. The output of cylinder 205 is a horizontal drive shaft 207 to which is coupled a drive gear 209 that drives gear 211 of end of arm tool 133, thereby causing rotation of end of arm tool 133 as indicated by arrow D in FIG. 10. As shown in FIG. 9, a shroud 212 covers gears 209 and 211 and horizontal axis arm 129 and wrist 131.

Referring to FIG. 11, end of arm tool 133 is composed of a frame 213, an air cylinder 215, having an air inlet and outlet 215' and 215" respectively, that opens and closes jaws 217 via mechanism 219 of end of arm tool 133 and jaws 217. Air cylinder 215 is a linear air cylinder that drives mechanism 219 to which jaws 217 are connected.

Figure 11A:
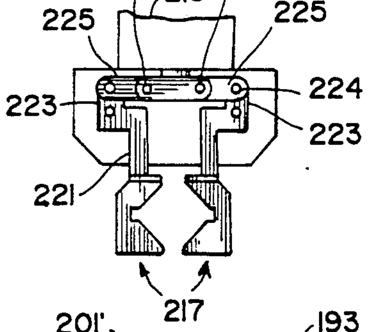
FIG. 11A is a front elevation view of a portion of the robot of FIG. 9 illustrating the end of arm robot tool in a closed or gripping position.
Figure 11B:
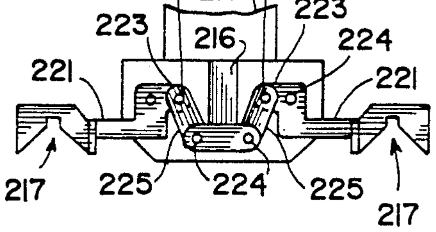
FIG. 11B is a front elevation view of a portion of the robot of FIG. 9 illustrating the end of arm robot tool in an open position.

Referring to FIGS. 11, 11A and 11B, each of jaws 217 is composed of an arm portion 221 having one end 223 joined to a linkage arm 225 which is connected to arm 225 by linkage pin 224'. The other end of arm 225 is connected by a linkage pin 224 to a cylinder rod end piece 224" which is driven by cylinder rod 216 of air cylinder 215 to provide the desired open position (indicated by arrow E in FIG. 11 and shown in FIG. 11B) and the desired closed or gripping position (indicated by arrow F in FIG. 11 and shown in FIG. 11A) of jaws 217. As shown in FIG. 11, a cam 227 is connected to arm 221 for actuating position switches 229 thereby sensing whether end of arm tool 133 is in the open or closed position.

Figure 20:
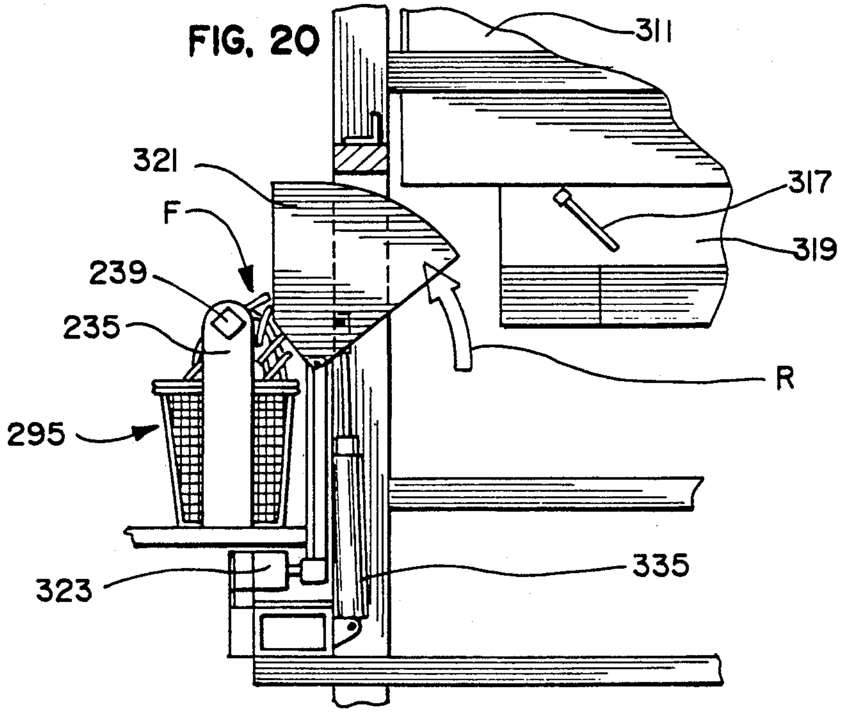
FIG. 20 is a front elevation view of a portion of the french fry dispenser of FIG. 13 illustrating french fries being dispensed from the holding bin into a fry basket.

The other end 231 of each of jaws 217 is composed of a gripping portion 233. Gripping portions 233 together define a substantially square gripping cross-sectional area 233' for gripping when end of arm tool 133 is in a closed position, as illustrated in FIG. 11, where jaws 217 are gripping handle 235 of a fry basket. Handle 235 preferably includes a portion to be gripped that is complementary to gripping area 233', as shown in FIG. 20 where fry basket 237 includes a square portion 239 of fry handle 235. Fry basket 237 is engaged by robot 113 by positioning jaws 217 while open in position to grip square portion 239 when jaws 217 are in a closed position. Jaws 217 are then closed thereby engaging square portion 239. Other articles can be engaged in a similar manner. Sufficient force is applied by air cylinder 215 to maintain jaws 217 in a closed gripping position so that the fry basket or other article engaged by jaws 217 can be lifted, moved or otherwise be repositioned.

Robot 113 can transport a container, such as a fry basket for example, within robot 113 work envelope or work area between various locations within fry cell 111, such as to and from box french fry dispenser 135, to and from fry vats 137 and to and from fry chute 141. The actual work area includes those locations to which robot 113 can deliver a fry basket, which can be larger than the maximum area to which end of arm tool 133 can reach.

Uncooked Bulk Food Dispensing Station

While uncooked bulk food dispensing station 115 is described with respect to specific dispensing devices, it is to be understood that any dispensing device capable of dispensing the type of food desired into a container held by robot 113 cold be utilized in accordance with the invention. The dispensing station could be configured as dispensing station 249 in FIGS. 24 and 25.

As illustrated in FIG. 2, uncooked bulk food dispensing station 115 includes a box french fry dispenser 135. Station 115 which includes a chicken patty dispenser 241, an optional pie basket pick-up platform 243 (having one of fry baskets 237 thereon), a fish filet dispenser 245 and a chicken nugget dispenser 247, as illustrated in FIGS. 24 and 25 with respect to uncooked bulk food dispensing station 249. Chicken patty dispenser 241, fish filet dispenser 245 and chicken nugget dispenser 247 can be constructed and operated as disclosed in U.S. patent application Ser. No. 07/176,568, filed Apr. 1, 1988. Any suitable dispensing apparatus can be used in accordance with the invention. FIG. 2 illustrates a front elevation view of uncooked bulk food dispensing station 115 which forms part of fry cell 111.

The following discussion and description of the drawings explains box french fry dispenser 135 that can be used to quickly, accurately and safely portion food items which have been supplied to the dispenser in bulk containers. In FIGS. 13-22, in which like reference numerals refer to like parts, the illustrated embodiment of the invention stores a plurality of unopened bulk french fry boxes, opens and moves the boxes as required to maintain a supply of french fries in a vibratory feeder, feeds a portion of the feeder contents to a transfer tray, and dispenses the transfer tray contents to a fry basket. While the illustrated containers are cardboard boxes and the box contents are french fries, the containers may be of other styles and constructed from other materials. Additionally, the box contents may be any fresh or frozen, cooked or uncooked, meat, fish or poultry item such as patties or nuggets, or a vegetable food item other than french fries, any of which might require portioning or dispensing before cooking, heating or other processing.

The general arrangement of dispenser components is best described in conjunction with FIG. 13. FIG. 13 is a front view of a box french fry dispenser or portioning dispenser 135 for containerized bulk food items, especially french fries, in accordance with the present invention. Dispenser 135 is especially useful in quick service restaurants or kitchens where containers of bulk food items must be opened and quickly and accurately portioned.

The components of dispenser 135 are generally contained within a cabinet 285 having a cabinet door 287 which provides access to a container hopper 289. Hopper 289 is designed to store a plurality of unopened french fry boxes 291*a–e* and 293 which will eventually be opened, emptied and discarded by dispenser 135. The french fries emptied from boxes 291*a–e* and 293 will eventually be portioned and dispensed into a fry basket 295. Boxes 291*a–e* and 293 are of a desired size and are constructed of paperboard. One convenient size box contains 6 pounds of frozen uncooked french fries.

Dispenser 135 generally requires limited operator attention beyond replenishing the supply of boxes 291 in hopper 289 and removing fry basket 295 from dispenser 135 after dispenser 135 has dispensed the desired portion of french fries into basket 295, which can be accomplished by an automated system. Dispenser 135 is especially useful in such a system. The multiple box capacity of hopper 289 allows dispenser 135 to consecutively empty several boxes without requiring an operator to add a new box each time a box is emptied.

French fries are emptied from boxes 291 by opening and tilting a lowermost box 293. As shown in FIG. 13, boxes 291*a–e* and 293 are stored in hopper 289 in a vertical stack 291. Lowermost box 293 sits on a pivotable platform 297 and can be held in place on platform 297 by box clamps 299 and 301. Clamps 299 and 301 prevent box 293 from falling from platform 297 when platform 297 is in a non-horizontal position. Clamps 299 and 301 are forced against opposing sides of box 293 to hold box 293 in place on platform 297 by activating a pair of box clamp cylinders 303 and 305, respectively. After box 293 has been clamped to platform 297 and opened, platform 297 can be pivoted to a non-horizontal position (about a 45° angle from horizontal) by actuating a pair of box dump cylinders 307 and 309, as will be discussed in detail in conjunction with FIGS. 14 and 16. As illustrated, cylinders 303, 305, 307 and 309 are two-position pneumatic cylinders, but could be any type of multiple position cylinders known in the art.

Figure 14:
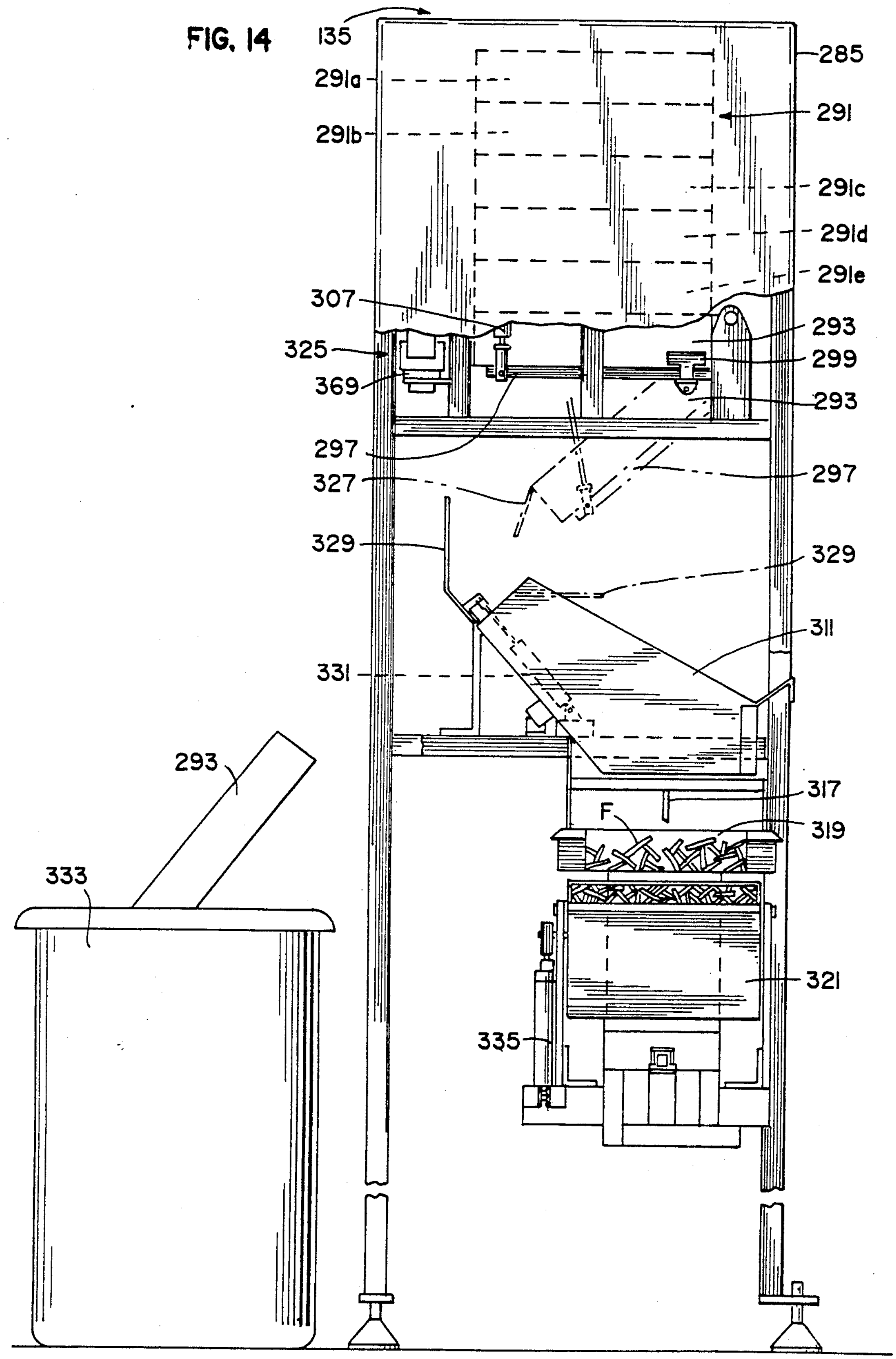
FIG. 14 is a side elevation view, partly in section, of the box dispenser of FIG. 13.

Referring now to FIGS. 13 and 14, pivoting platform 297 allows french fries F to fall from box 293 onto a chute 311 which includes diverters 313 and 315 (visible only in FIG. 13) and finger 317, which help direct and evenly distribute french fries F into a vibratory feeder 319.

A counter (not shown) keeps track of the weight or the number of batches emptied from tray 321. After a predetermined amount of french fries have been dispensed from tray 321, dispenser 135 is signaled to open the next box 291*e* of french fries F in stack 291 and subsequent boxes as they are needed.

Figure 19:
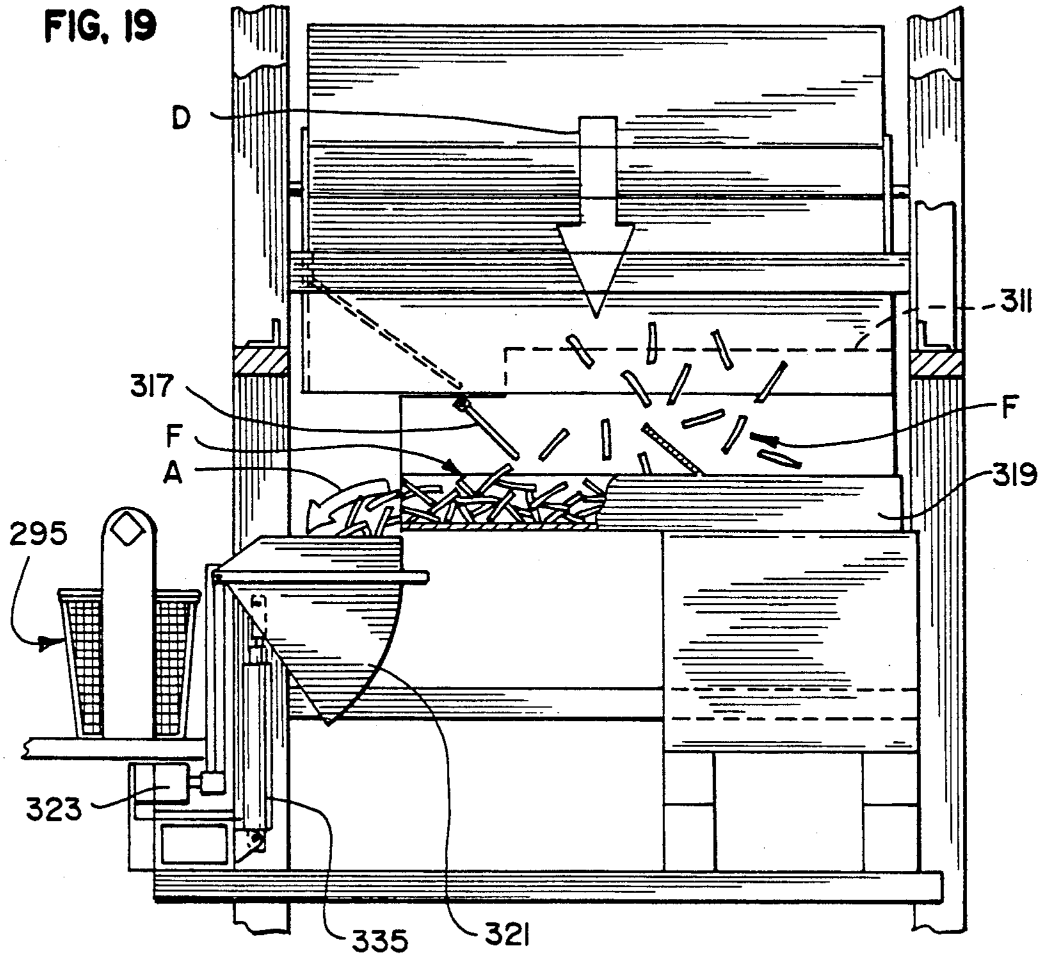
FIG. 19 is a front elevation view of the lower portion of the french fry dispenser of FIG. 13 illustrating the loading of french fries into the storage bin and holding bin.

The vibration of feeder 319 causes fries F to move horizontally in the direction of arrow A in FIG. 19 and then fall from feeder 319 into a pivotable transfer tray 321. The weight of items in tray 321 can be measured by a load cell 323 to determine when a desired portion of french fries has accumulated in tray 321. Tray 321 is then emptied into fry basket 295 for further processing. Such vibration feeders and load cells are well known in the art and a detailed description is therefore not provided here. A suitable vibration feeder is available from Eriez, Model No. 30A and a suitable load cell is available from Interlaken Technology Corp., Model No. FS500-C10.

Additional details of dispenser 135 are further illustrated in the side elevation view of FIG. 14. FIG. 14 illustrates how platform 297 is pivoted when platform 297 is moved by actuating dump cylinders 307 and 309 (more completely illustrated in FIG. 16). At the beginning of a box emptying cycle, platform 297 is in a horizontal position. While platform 297 is in this horizontal position, a box slitter 325 can traverse the lower rear panel 327 of box 293. This allows rear panel 327 to swing away from the rest of box 293 when platform 297 is tilted from its initial horizontal position. The french fries in box 293 can then fall onto chute 311 as previously described in conjunction with FIG. 13. In the preferred embodiment, dump cylinders 307 and 309 may be actuated several times to ensure that the french fries are dislodged from box 293.

Once box 293 has been emptied, it can be disposed of. To dispose of box 293, a chute dump door 329 is first lowered by actuating a pair of dump door cylinders 331, one located on each side of door 329 (shown in phantom in FIG. 14). Next, box clamps 299 and 301 are retracted from box 293 by actuating a pair of box clamp cylinders 303 and 305 (see FIG. 13). This allows box 293 to slide from platform 297 and over the top of lowered dump door 329. Dump door 329 then directs box 293 through an opening in the rear of cabinet 285 into a waste container 333.

FIG. 14 also illustrates the structure for discharging the measured french fry portions from dispenser 135. Once load cell 323 (see FIG. 13) indicates that a desired quantity of french fries has accumulated in transfer tray 321, transfer tray dump cylinder 335 can be actuated. This causes transfer tray 321 to pivot approximately 90 degrees, thereby dumping the contents of tray 321 into fry basket 295, as will be discussed in detail in conjunction with FIG. 20.

Dispenser 135 operation is controlled by a controller (not shown) which can be any type of automated controller well known in the art. The controller sequentially initiates the actions which will now be discussed in conjunction with FIGS. 15-22. While the following automated sequence of operation is representative of the illustrated embodiment, other sequences of operation are possible.

Figure 15:
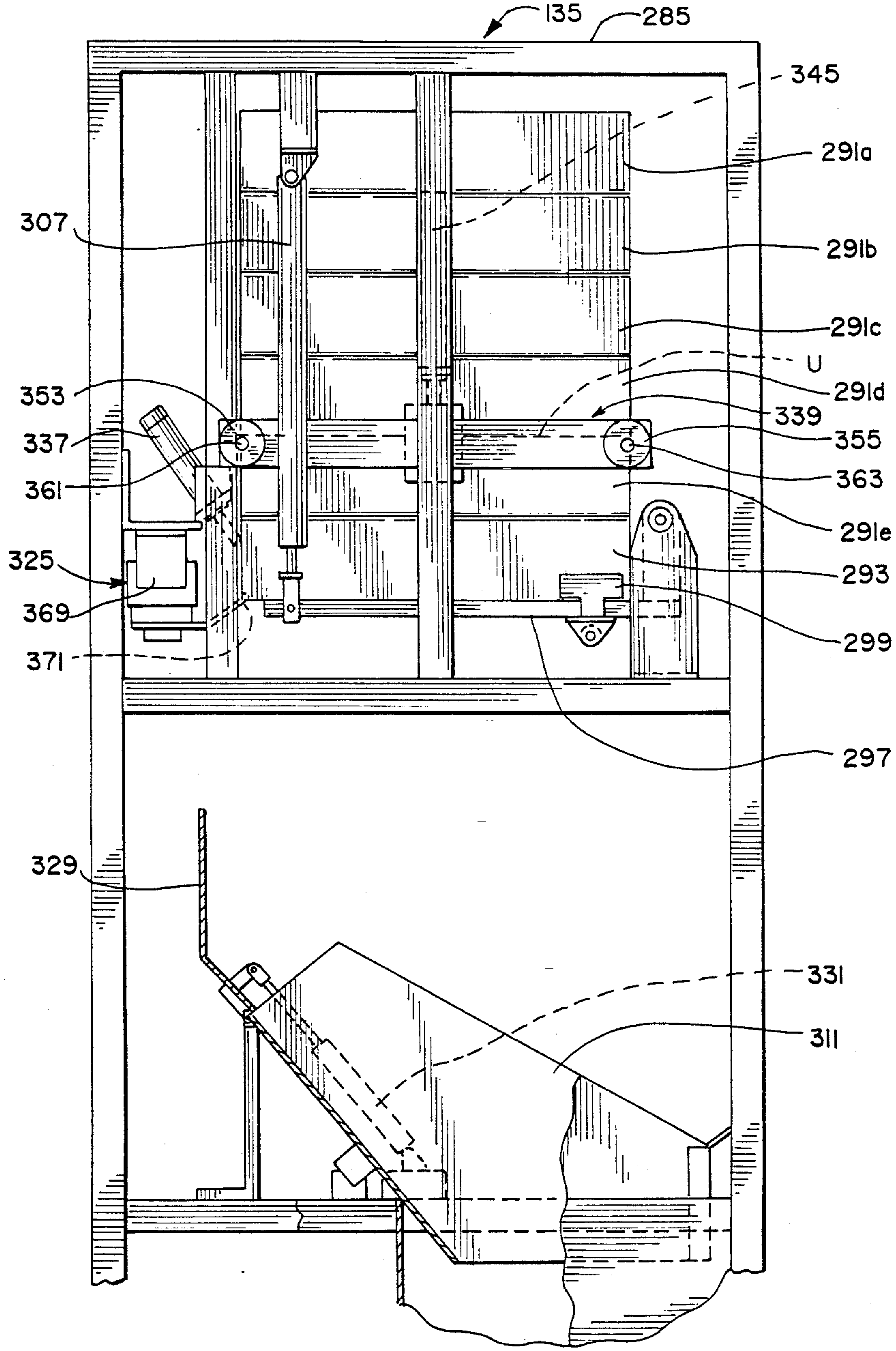
FIG. 15 is a side sectional view illustrating a portion of the box dispenser of FIG. 13.
Figure 16:
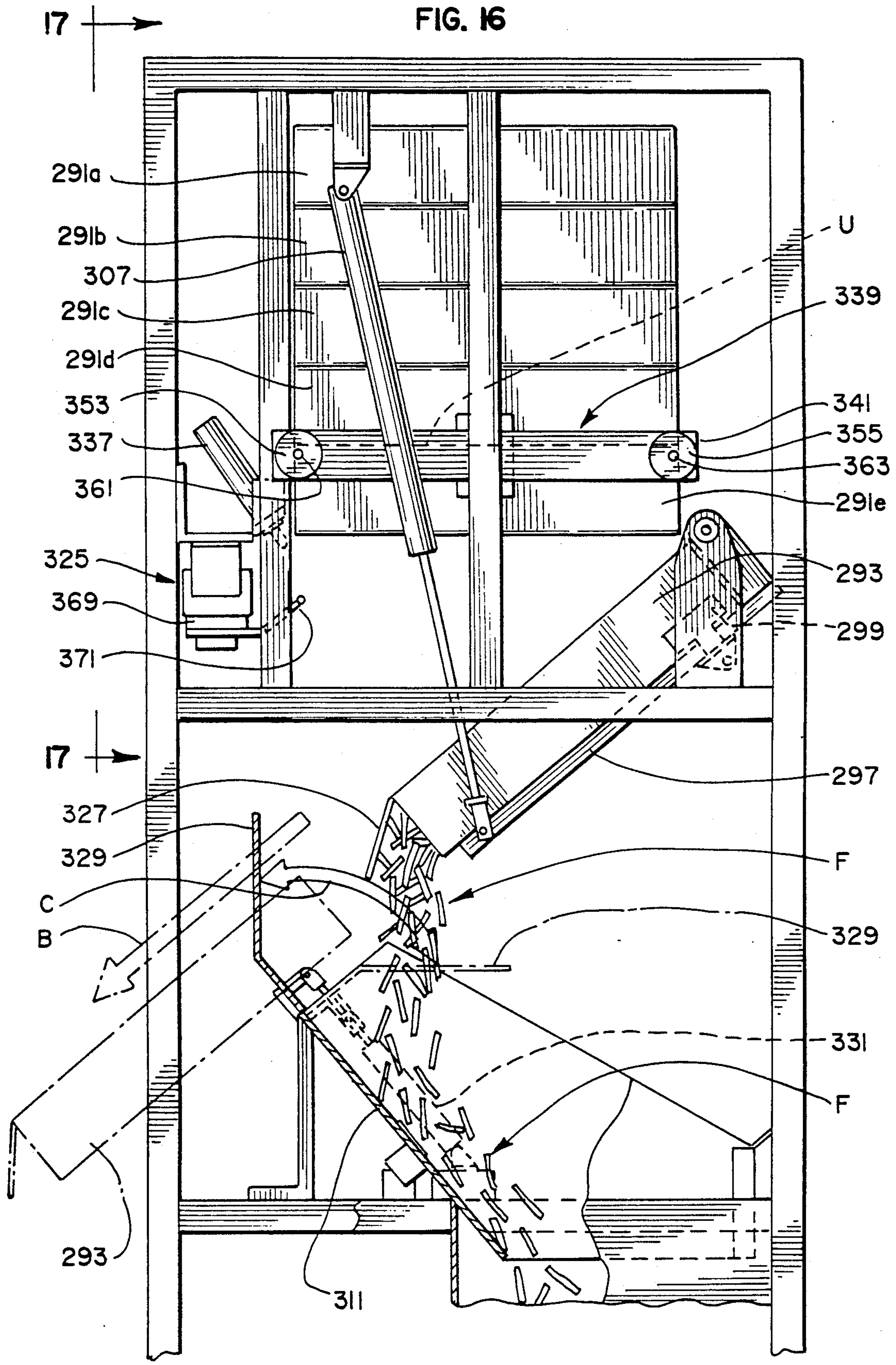
FIG. 16 is a side sectional view illustrating the dispensing of french fries from a box by the box dispenser of FIG. 13.

The automatic operation of dispenser 135 begins with automatic box opening and emptying as best discussed in conjunction with FIGS. 15 and 16. At the beginning of the box opening and emptying cycle, lowermost box 293 is aligned on platform 297 by a push-down cylinder 337. Cylinder 337 applies a downward and inward force to rear panel 327 of box 293 at a point 373 illustrated in FIG. 22 where slitter 325 first enters box 293, which forces box 293 downward and inward. In the preferred embodiment, cylinder 337 is cycled three times to push against rear panel 327, thereby ensuring that box 293 is properly oriented for the subsequent opening and emptying operations.

Once box 293 has been properly positioned, a box stack frame 339 is used to support and fix the position of all boxes (boxes 291*a–e*) stacked above box 293. Stack frame 339 includes a pair of stack frame members 341 and 343 (see FIG. 17). Members 341 and 343 are vertically moveable by actuating a pair of stack frame cylinders 345 (shown in phantom in FIG. 15) and 347 (not visible in FIG. 15). Cylinders 345 and 347 move stack frame 339 between an upper box position U (shown in FIGS. 15 and 16) and a lower box position L (shown in FIG. 17). Positions U and L are sensed by a pair of position sensors 349 and 351 (illustrated in FIG. 17). Preferably, sensors 349 and 351 are Hall effect sensors which have no moving parts which can wear out. Such sensors are commercially available from the Bimba Manufacturing Company of Monee, Ill.

Stack frame 339 also includes four box support cylinders 353, 355, 357 and 359 (obscured in FIGS. 14–18) which can be actuated to cause four box support pins 361, 363, 365 and 367 (obscured in FIGS. 14–18) to pierce a second lowermost box 291*e* near its four upper corners. Box support pins 361, 363, 365 and 367 then support second lowermost box 291*e* and the remaining plurality of boxes 291 to prevent their movement during the opening and emptying operations on lowermost box 293.

Once stack frame 339 has fixed the position of box stack 291, box 293 is secured to platform 297 by actuating box clamp cylinders 303 and 305 as was previously described in conjunction with FIG. 13. Dump door cylinders 331 are next actuated to lower dump door 329 in preparation for the box opening process.

Figure 21:
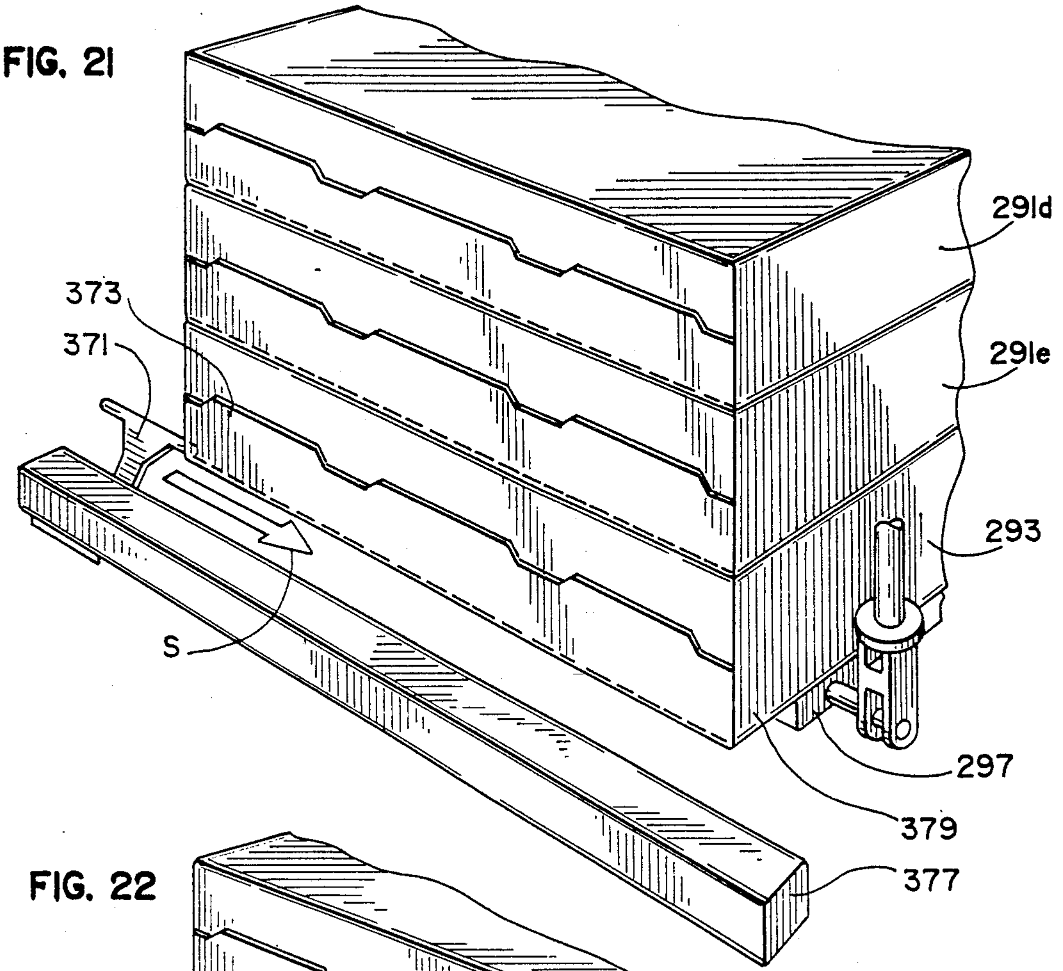
FIG. 21 is a perspective rear view of a portion of the french fry dispenser of FIG. 13 illustrating the slitting mechanism.
Figure 22:
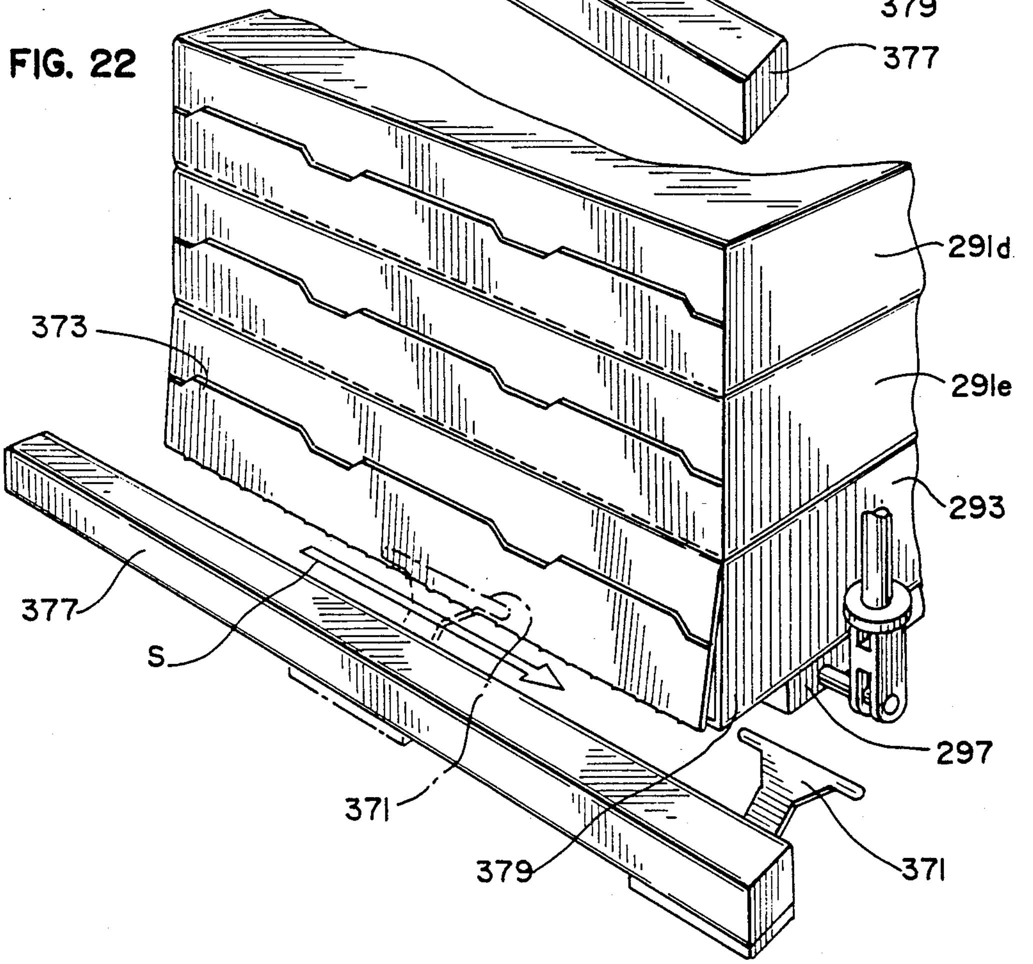
FIG. 22 is a perspective view of the slitting mechanism of FIG. 20 illustrating the slitter in operation.

After dispenser 135 is made ready for opening box 293, box 293 is cut open along rear panel 327 by box slitter 325. As shown, box slitter 325 includes a box slitter cylinder 369 and a knife 371. When slitter cylinder 369 is actuated, knife 371 extends through the bottom of rear panel 327 of box 293. Slitter 325 is then moved along the length of rear panel 327 to slit box 293 along its entire length as best seen in FIGS. 21 and 22. Any waste materials generated in the cutting process will be prevented from reaching feeder 319 because dump door 329 is in the lowered position shown in phantom in FIG. 16. This causes any paper cuttings generated by box slitter 325 to be deflected into waste container 333 as shown in FIG. 14. Once cutting operations are completed, box slitter 325 is returned to its original position.

After the box opening process has been completed, the box emptying cycle begins. Referring now to FIG. 16, dump door cylinders 331 are actuated to raise dump door 329 to the raised position as shown by arrow C. This makes chute 311 ready for receiving french fries F from box 293. The emptying of box 293 begins when box dump cylinders 307 and 309 (shown in FIG. 17) are actuated, causing platform 297 to pivot to an inclined position with the open end of box 293 pointing towards raised dump door 329. This causes french fries F to fall from inclined box 293 onto chute 311 which in turn directs french fries F toward vibratory feeder 319 for dispensing as will be discussed in detail in conjunction with FIGS. 19 and 20. In the preferred embodiment, cylinders 307 and 309 may be actuated repetitively to shake box 293 several times to help ensure that all fries have been discharged from box 293.

The portioning of french fries F emptied from box 293 is best described in conjunction with FIGS. 19 and 20. Referring first to FIG. 19, chute 311 directs french fries F generally downward in the direction of arrow D into vibratory feeder 319. Feeder 319 then vibrates, causing fries F to fall in the direction of arrow A into transfer tray 321 until a predetermined weight of fries is accumulated as determined by load cell 323. Cell 323 provides a signal to stop vibratory feeder motion when the desired amount, in this case approximately one and one-half pounds of fries F has been supplied into tray 321 by feeder 319.

The accumulated portion of fries F in tray 321 is dispensed into fry basket 295 by pivoting tray 321 towards basket 295. This is accomplished by actuating transfer tray dump cylinder 335 to push basket 295 in the direction indicated by arrow R as illustrated in FIG. 20. This causes the measured portion of french fries F to fall into basket 295, which is then removed for frying. The portioning process just described is repeated until the level of fries F in vibratory feeder 319 is sufficiently low to require the emptying of the next french fry box.

Referring again to FIG. 16, the replenishment of feeder 319 begins by disposal of empty box 293. First, dump door cylinders 331 are actuated to lower dump door 329 to the lowered position shown in phantom in FIG. 16. Next, box clamp cylinders 303 and 305 are actuated to withdraw box clamps 299 and 301 from empty box 293. Withdrawing clamps 299 and 301 allows box 293 to slide from platform 297 in the direction of arrow B, past lowered dump door 329 and into waste container 333 as shown in FIG. 14. After box 293 has been discarded, box dump cylinders 307 and 309 are actuated to raise empty platform 297 to its initial horizontal position.

Figure 17:
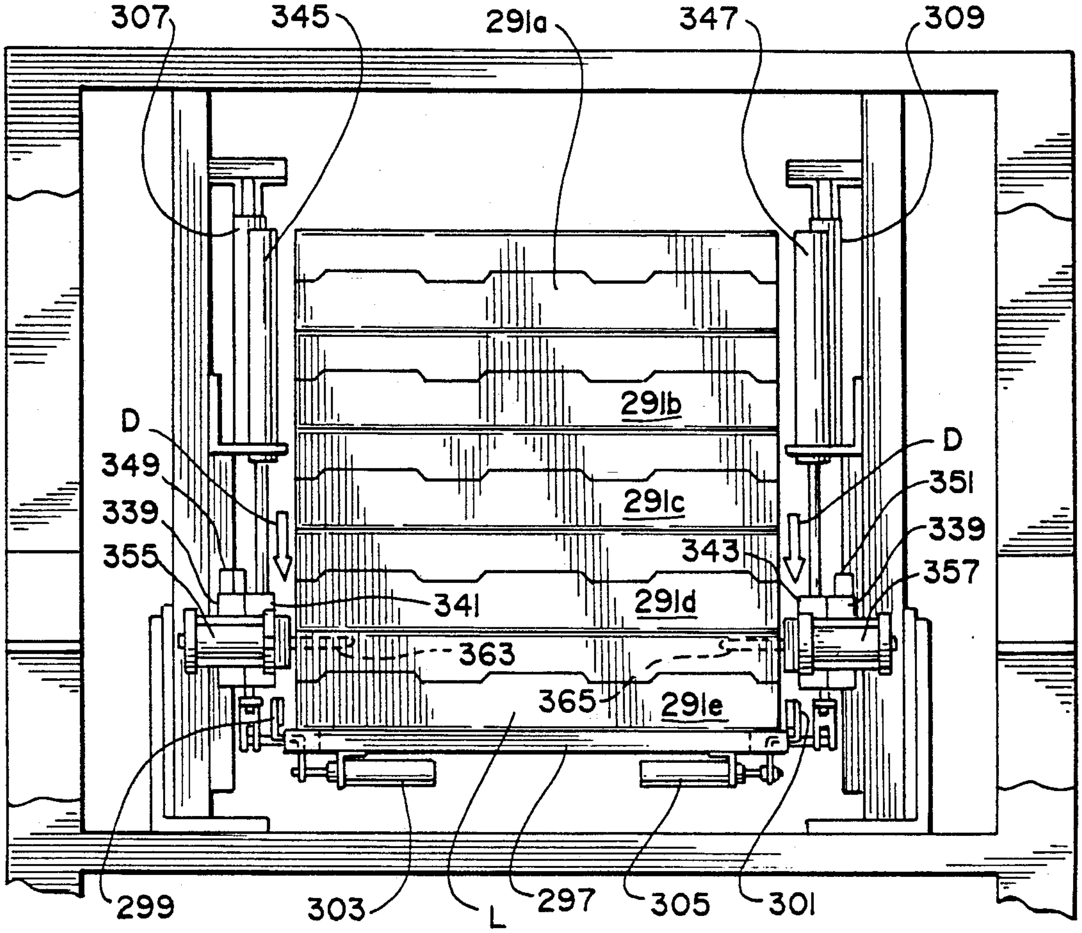
FIG. 17 is a front view of a portion of the french fry dispenser forming part of the fry cell of FIG. 1.

Turning now to FIG. 17, feeder replenishment continues by placing box 291*e* onto platform 297. To accomplish this, stack frame 339 is lowered in the direction of arrows D by actuating stack frame cylinders 345 and 347 to allow box 291*e* to rest on platform 297 in the position originally occupied by box 293 as shown in FIG. 14. Box support cylinders 353, 355, 357 and 359 are then actuated to retract box support pins 361, 363, 365 and 367. Next, stack frame 339 is raised to the level of new second lowermost box 291*d* and cylinders 353, 355, 357 and 359 are actuated to drive pins 361, 363, 365 and 367 into box 291*d*, thereby retaining box 291*d* and any boxes stacked above it.

Figure 18:
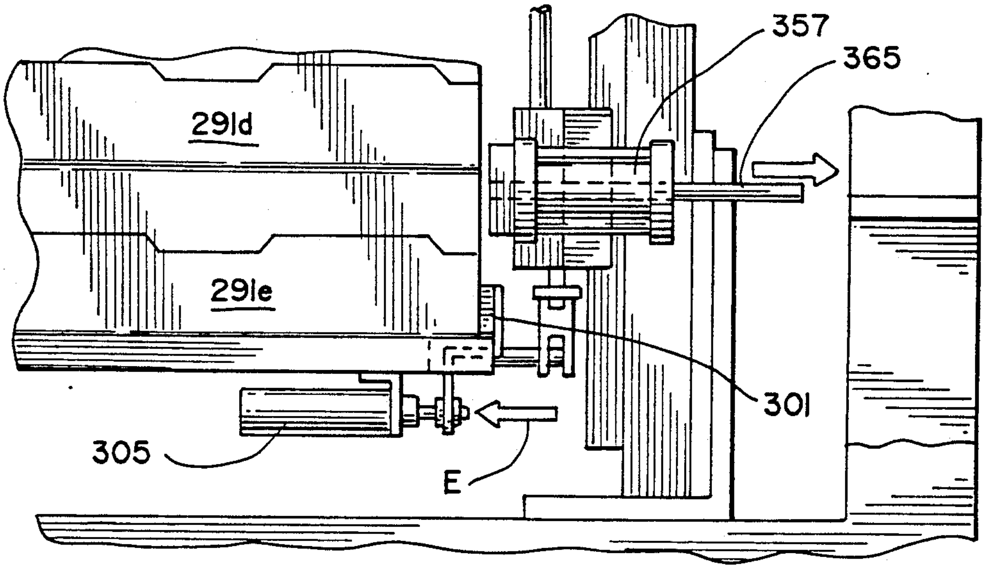
FIG. 18 is a fragmentary view of a portion of the box french fry dispenser of FIG. 13 illustrating the retraction of one of the box support pins and clamping of the lowermost french fry box.

FIG. 18 illustrates the operation of box support cylinder 357 and its cooperative box support pin 365 in greater detail. As illustrated, pin 365 extends coaxially through cylinder 357 and has been retracted just prior to the raising of stack frame 339 for engaging box 291*d*. Additionally, arrow E of FIG. 18 indicates the inward movement of box clamp cylinder 305 which causes box clamp 301 to engage box 291*e*.

FIGS. 21 and 33 illustrate the box slitting process in greater detail. As discussed in conjunction with FIG. 15, push down cylinder 337 (not shown) impacts on lowermost box 293 at a push down cylinder impact point 372 located near an outer edge of rear panel 327. Preferably, rear panel 327 is impacted at point 373 three times prior to the cutting operation to ensure that knife 371 will slit rear panel 327 along the proper track. Slitter cylinder 369 is next actuated, causing knife 371 to cut panel 327. Knife 371 is next transversed across a slitter track 377 in the direction of arrow S. This slits the entire lower rear length of box 293 and allows fries to be dumped form box 293 as described in conjunction with the previous figures. It should be noted that rear flap 327 is not physically connected to box side panels 379. This allows panel 327 to move freely after being slit only across its bottom edge as shown in FIG. 22.

An alternate embodiment of a bulk french fry dispenser for use with a fry cell 111' (see FIG. 23) is shown in FIGS. 26-30. Fry cell 111' is similar to fry cell 111 except that fry cell 111' uses bulk french fry dispenser 401 as hereinafter described. Although the illustrated embodiment of dispenser 401 is adapted to the portioning and dispensing of french fries, dispenser 401 can be used to portion other items such as meat, fish or poultry nuggets, and can dispense either fresh or frozen item in either a cooked or uncooked condition.

Figure 26:
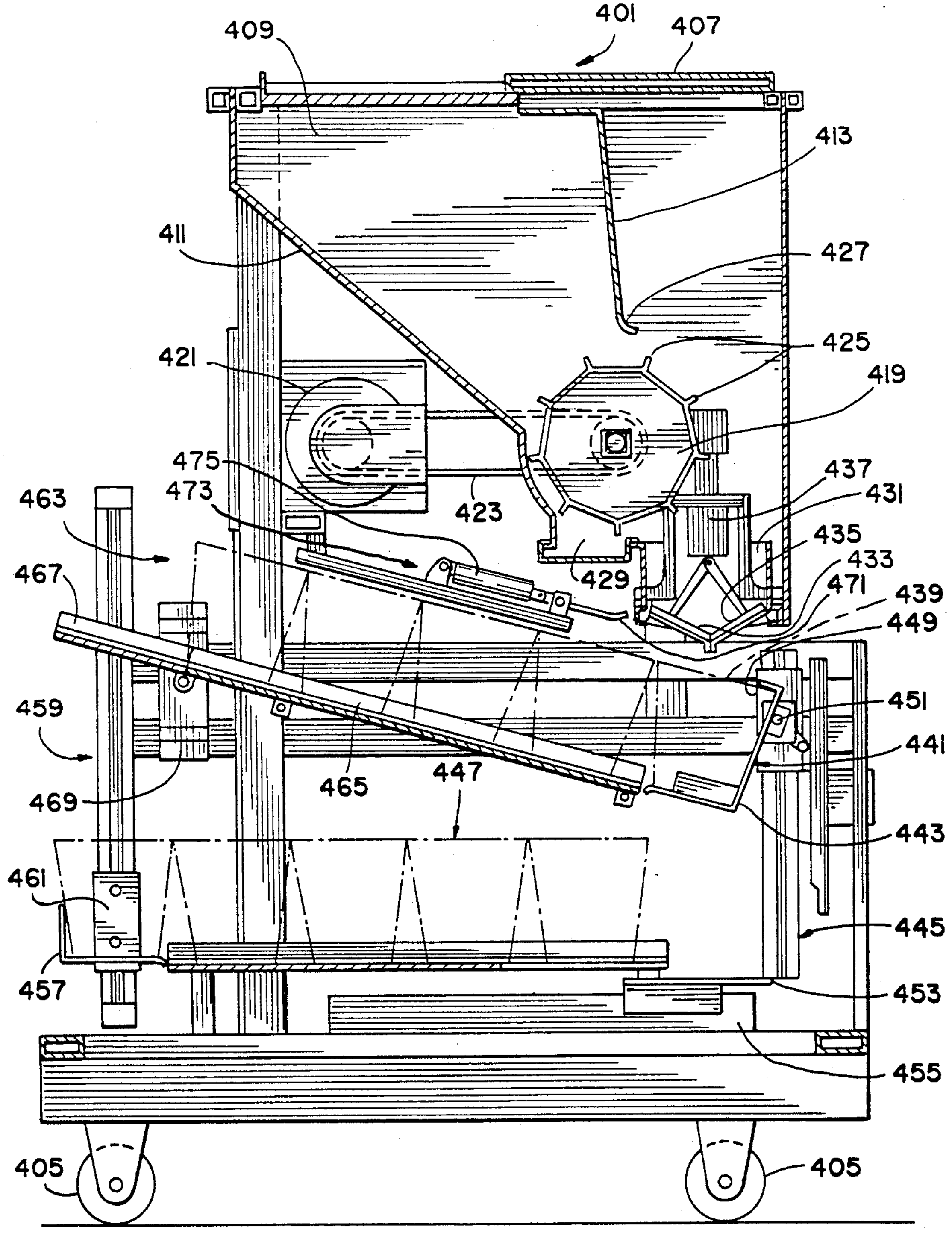
FIG. 26 is a front elevation view of the bulk french fry dispenser forming part of the fry cell of FIG. 23.

FIG. 26 illustrates the general internal arrangement of components in a portioning dispenser 401 for bulk food items. The components of dispenser 401 are generally located within a cabinet 403 mounted on four wheels 405. Cabinet 403 includes a sliding door 407 which allows french fries to be dumped into a primary storage bin 409 from a bulk french fry container when door 407 is open.

Storage bin 409 includes an inclined reservoir wall 411 and a vertical reservoir wall 413 which, in conjunction with a pair of reservoir side walls 415 and 417 (see FIG. 30), channel bulk food items toward the bottom of storage bin 409.

Figure 31:
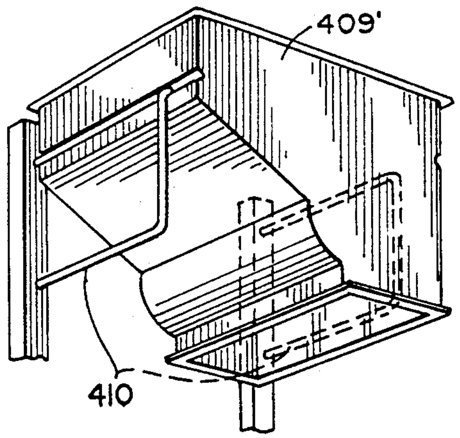
FIG. 31 is a perspective view of an alternate embodiment hopper useful in the dispenser of FIG. 26.

An alternate storage bin 409' is illustrated in perspective view in FIG. 31. Bin 409' can be molded plastic and can be supported by support rods 410 located on each side of bin 409'. Support rods 410 allow bin 409' to be removed by sliding bins 409' horizontally out from rods 410.

French fries contained in storage bin 409 are conveyed by clockwise rotation of a rotary drum 419 located n ear the bottom of storage bin 409. Drum 419 is driven by an electric motor 421 and a drive belt 423 and includes a plurality of paddles 425. Paddles 425 convey fries from storage bin 409 past a fry deflector 427 when drum 419 rotates. Deflector 427 operates in conjunction with paddles 425 and drum 419 to regulate and smooth the flow of fries from storage bin 409. Food items too small to be conveyed out of storage bin 409 by paddles 425 fall into a crumb tray 429 located at the bottom of storage bin 409. Tray 429 catches items such as crumbs and small pieces of broken french fries, thereby preventing these undesirable items from passing over drum 419 and into the dispensed french fry portions.

Fries pushed from storage bin 409 fall into a secondary bin 431 for weighing and dispensing. Secondary bin 431 includes a pair of downwardly opening doors 433 and 435 which open when a load cell 437 indicates that a desired weight of french fries has accumulated in secondary bin 431. Fries discharged from bin 431 fall into a fry basket 439 (shown in phantom) at a basket filling station 441. Secondary bin 431 and associated equipment for weighing is optional. Fries may be discharged directly into a basket at filling station 441 without secondary bin 431. At filling station 441, basket 439 sits on a basket frame 443. Frame 443 is part of a first elevator 445 used to lower filled baskets to a basket staging area 447. In the illustrated embodiment, elevator 445 employs a first elevator rodless cylinder 449 to provide vertical movement. Elevator 445 also includes a pivot mechanism 451 for pivoting frame 443 from an inclined orientation at filling station 441 to a horizontal orientation required to push basket 439 into staging area 447. Alternatively, pivot mechanism 451 could be omitted. In this case, a basket is pushed from an inclined basket frame into staging area 447, where the basket bottom comes to rest in a horizontal orientation.

Baskets lowered to staging area 447 are sequentially moved through area 447 by the action of a basket transfer arm 453. After elevator 445 has lowered basket frame 443 to staging area 447, horizontal basket transfer arm 453 pushes a filled basket from basket frame 443 into staging area 447. Transfer arm 453 is moved by actuating a horizontally moveable rodless staging cylinder 455 located below staging area 447. Any suitable motive means can be used to move transfer arm 453.

When staging area 447 is filled with full baskets, transfer arm 453 causes all baskets in staging area 447 to be pushed forward one basket position. This causes a basket E (shown in FIG. 28) to be pushed onto a basket frame lift 457 of a second elevator 459. A second elevator rodless cylinder 461 is then actuated to raise elevator 459 to a basket input-output station 463.

In addition to serving as a return point for filled baskets, basket input-output station 463 serves as a drop off point for empty fry baskets. An empty basket (not shown) placed on an inclined ramp 465 can slide towards basket filling station 441. Inclined ramp 465 includes a pivotable door 467 which can be moved by actuating a door cylinder 469 to allow filled baskets to pass by ramp 465 when raised on second elevator 459. Ramp 465 is inclined sufficiently so that baskets placed thereon will slide by gravity to basket filling station 441, unless restrained by basket stop arm 471, hereinafter described.

A basket stop mechanism 473 is mounted above ramp 465 for preventing empty baskets from sliding down ramp 465 at certain times in the filling cycle. Mechanism 473 includes a basket stop arm 471 which can be lowered into a basket (basket J in FIG. 27) to prevent movement of basket J and all baskets on ramp 465 above basket J. Stop arm 471 is lowered by actuating a basket stop air cylinder 475.

Figure 30:
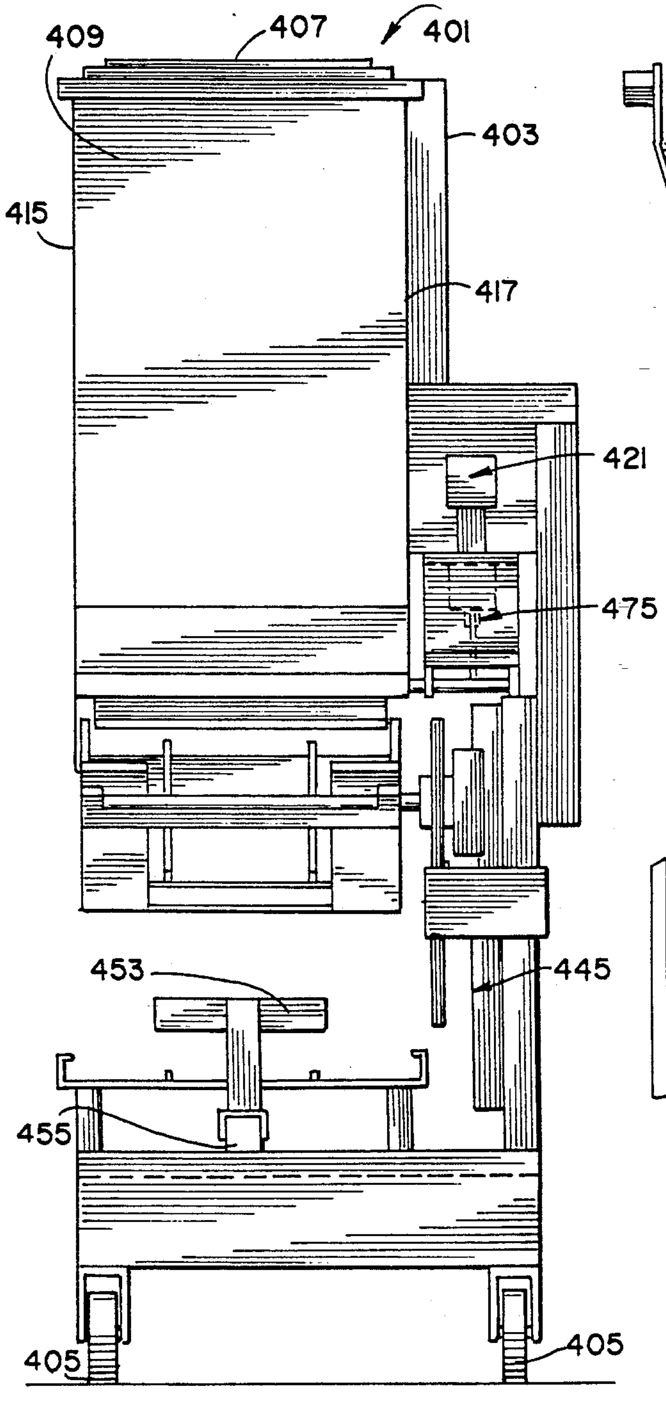
FIG. 30 is a side elevation view of the dispenser of FIG. 26.
Figure 30A:
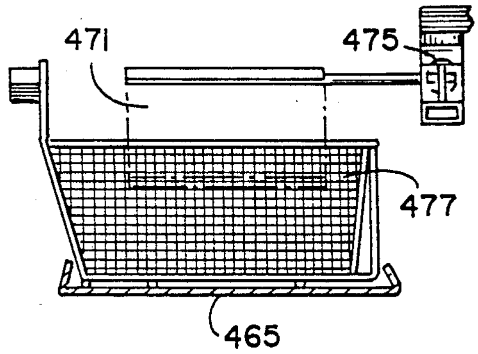
FIG. 30A is a side elevation view along lines 30A—30A of FIG. 28.

Various aspects of the location and shape of several of the above-discussed components are illustrated more clearly in FIG. 30 and 30*a*. First, it should be noted that rotary drum motor 421 and basket stop cylinder 475 are mounted off to one side of cabinet 403. These mounting positions prevent contaminants or foreign objects, which might possibly otherwise fall from either device, from falling into baskets during the dispensing process. FIG. 30 also illustrates that transfer arm 453 engages a substantial length of a lower side of a fry basket, while FIG. 30A shows that basket transfer arm 453 engages a substantial portion of the top side of fry basket 477.

The operation of dispenser 401 now will be discussed in conjunction with FIGS. 27, 28 and 29. The following sequence of operations is intended only to be representative of the illustrated embodiment, and may be controlled by any type of controller known in the art. Unless otherwise specified, cylinders are two position pneumatic cylinders and cylinder actuation refers to moving a cylinder from one cylinder position to the other position.

Figure 27:
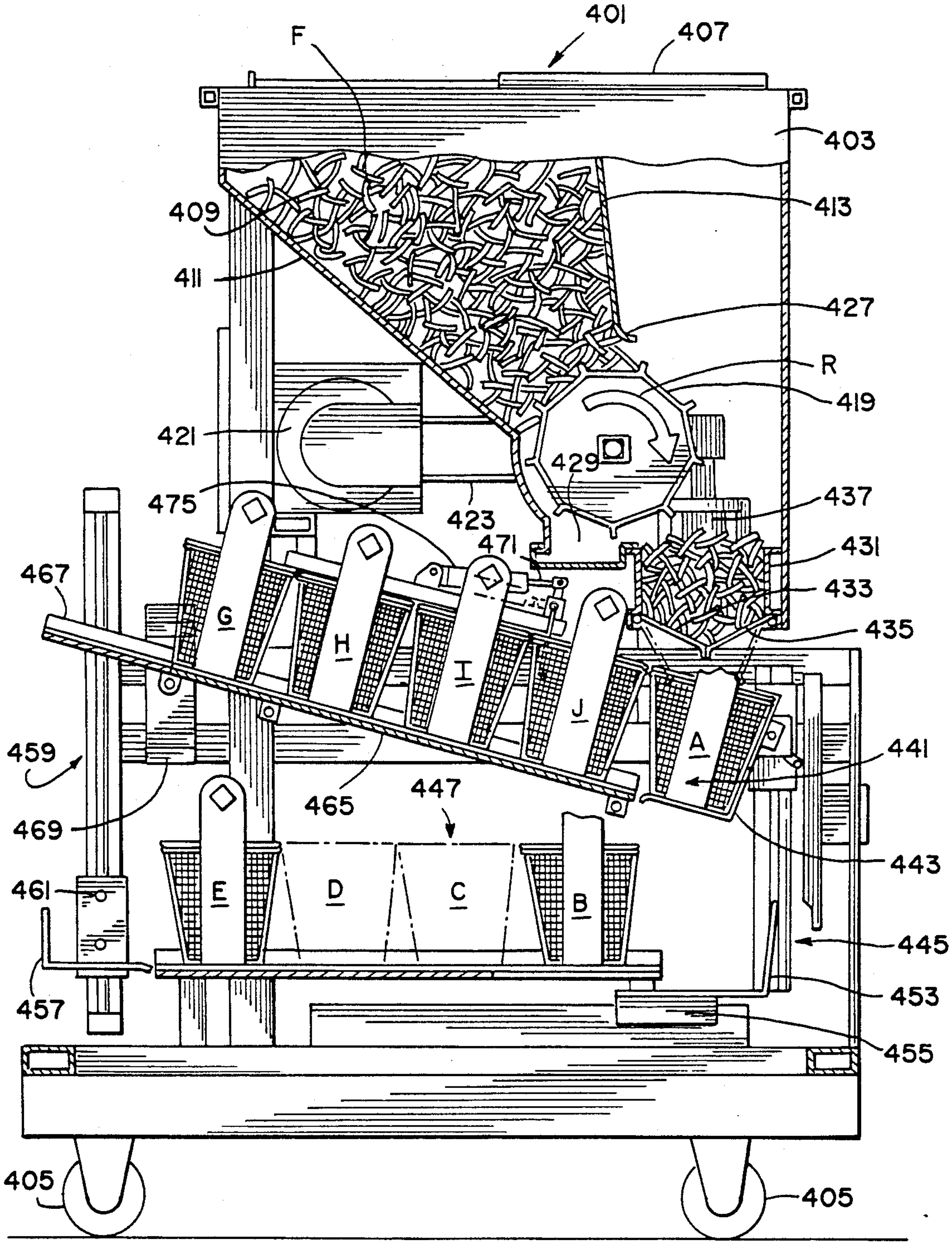
FIG. 27 is a front elevation view of the dispenser of FIG. 26 illustrating a portion of the dispensing cycle.

Referring now to FIG. 27, dispenser 401 is made ready for operation by filling storage bin 409 with french fries F such as from a bulk french fry container or other source. The basket filling cycle begins when basket stop cylinder 475 is actuated, causing stop arm 471 to be raised from the lowered position shown in FIG. 27 to the position shown in FIG. 28. A reed switch (not shown) verifies that stop arm 471 is in the raised position, and an empty fry basket A slides down inclined ramp 465 onto basket frame 443. After basket A slides onto frame 443, stop cylinder 475 is actuated, and stop arm 471 returns to its original lowered. position for retaining the empty baskets G, H, I and J on ramp 465 as shown in FIG. 27.

When basket A slides into frame 443, an elevator sensor (not shown) verifies that basket A is present, and rotary drum motor 421 is energized. Motor 421 causes rotary drum 419 to rotate in the direction of arrow R to convey french fries from storage bin 409 into secondary bin 431. After approximately 1, 1.5 or 2 pounds of french fries have fallen into secondary bin 431, load cell 437 provides a signal which causes drum 419 to stop rotating and then activates a pair of secondary bin door air cylinders (not shown) to cause bin doors 433 and 435 to open downwardly, which allows the measured portion of fries F to fall into basket A. The bin door cylinders are then actuated again to close doors 433 and 435.

After basket A has been filled, first elevator 445 lowers basket A from filling station 441 to the level of staging area 447. Referring now to FIG. 28, pivot mechanism 451 turns lowered basket frame 443 from the inclined orientation required to accept empty basket A from ramp 465 to the horizontal orientation required to dispatch filled basket A into staging area 447. A reed switch (not shown) verifies the position and orientation of frame 443, and if frame 443 is in the proper location, staging cylinder 455 is actuated, causing basket transfer arm 453 to push basket A into staging area 447.

Figure 28:
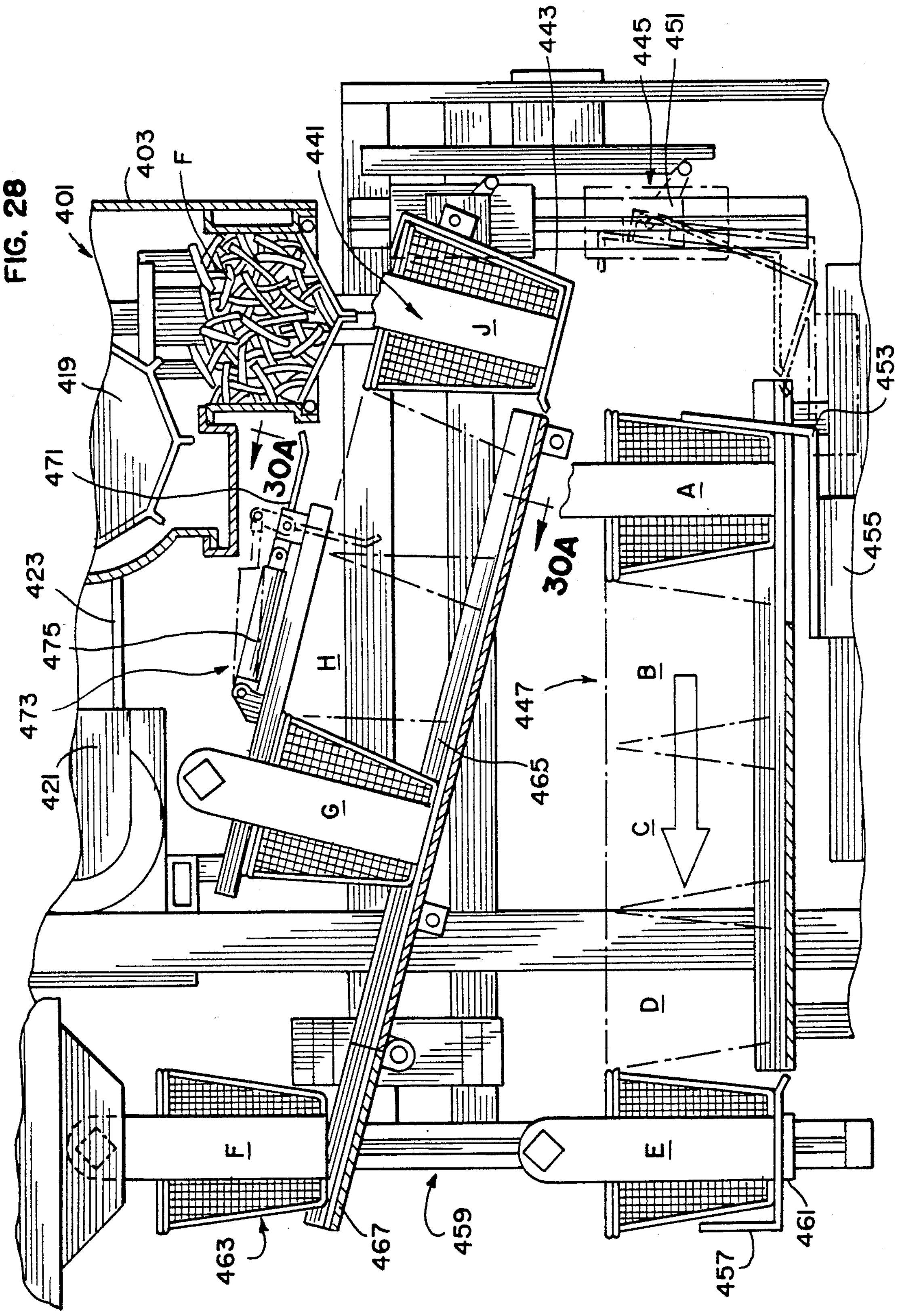
FIG. 28 is an enlarged fragmentary front elevation view of the dispenser of FIG. 26 illustrating another portion of the dispensing cycle.

As can be seen by comparing FIG. 28 to FIG. 27, moving basket A causes baskets B, C, D and E to advance to the left through staging area 447 one basket position. As a result, basket E now has been pushed onto basket frame lift 457. A first elevator sensor (not shown) verifies that basket frame 443 is empty, and frame 443 is lifted back up to filling station 441. Transfer arm 453 can be activated to advance the baskets in the staging area to the left two basket positions, if desired, such as when only four baskets (A, B, C and D, for example) are present in staging area 447.

Turning now to FIG. 28, it will be noted that an empty basket F has been placed on ramp door 467. When basket F is released, it will slide past door 467 and onto a fixed portion of ramp 465 as shown in FIG. 29.

Filled basket E is now ready to be lifted to basket input-output station 463 by second elevator 459. Referring again to FIG. 29, a second elevator sensor (not shown) verifies that basket E is correctly positioned on frame lift 457, pivotable door 467 is lowered to allow basket E to pass past ramp 465, and second elevator 459 lifts basket E in the direction of arrow M to input-output station 463. Basket E is then removed from elevator 459 by lowering fry cell robot 113 in the direction of arrow N. A second elevator pick-up sensor indicates that elevator 459 is empty, and elevator 459 is returned to the staging area, and the filling and conveying cycles can be repeated.

Figures 23, 29A:
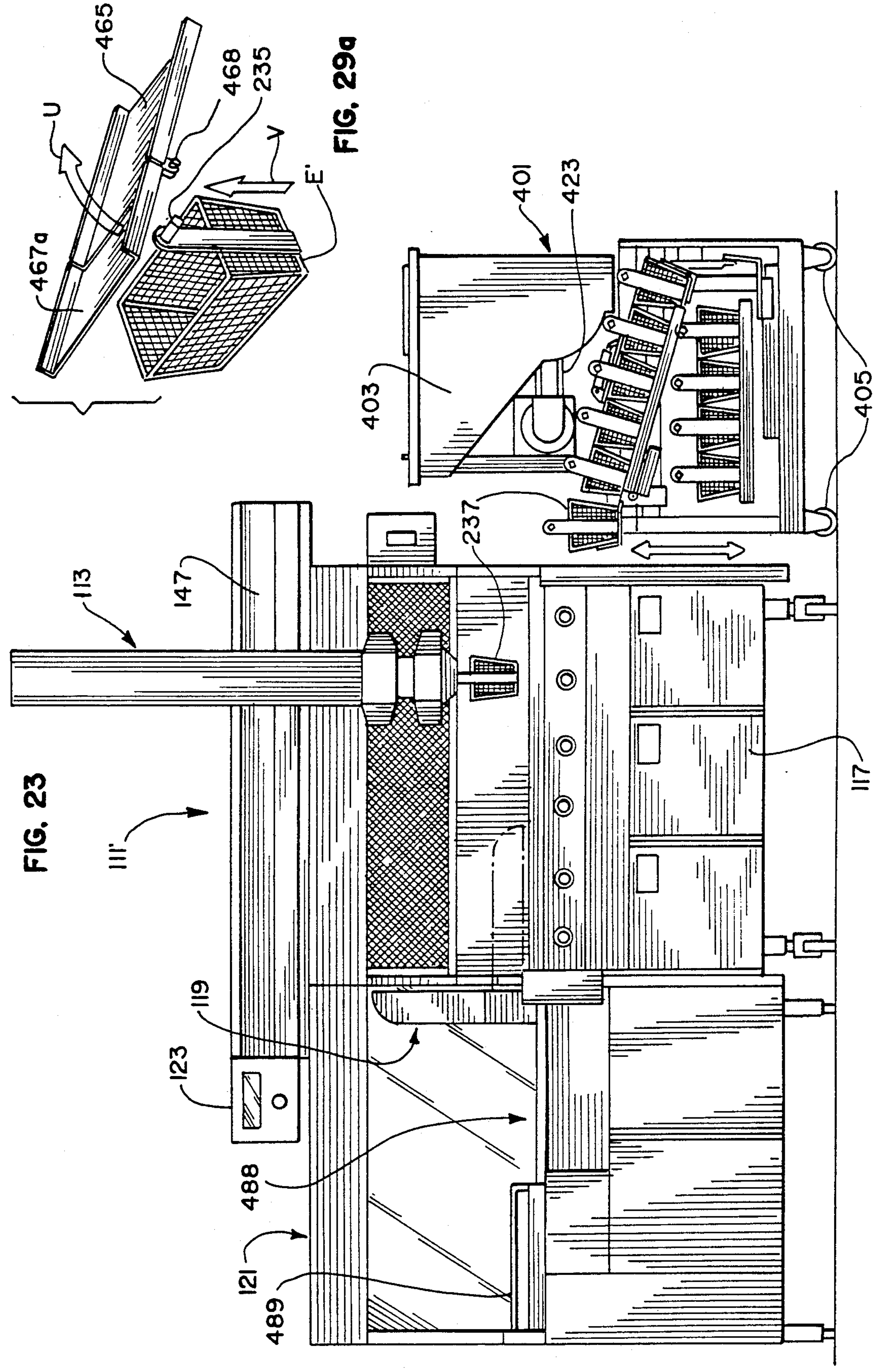
FIG. 23 is a front elevation view of an alternate embodiment fry cell in accordance with the invention having a bulk french fry dispenser.
FIG. 29A is a perspective view of another embodiment of the pivotable ramp door shown in FIG. 29.

Turning now to FIG. 29A, an alternative embodiment of pivotable door 467 is illustrated in which an upwardly pivotable door 467*a* pivots up and over ramp 465 in the direction of arrow U when a basket E′ is raised from below in the direction of arrow V. The pivotable door movement is initiated when basket handle 235 of basket 237 pushes a door lever 468 upward as basket E′ is raised. When basket 237 is removed, door 467*a* falls down to its normal ramp position.

Figure 29B:
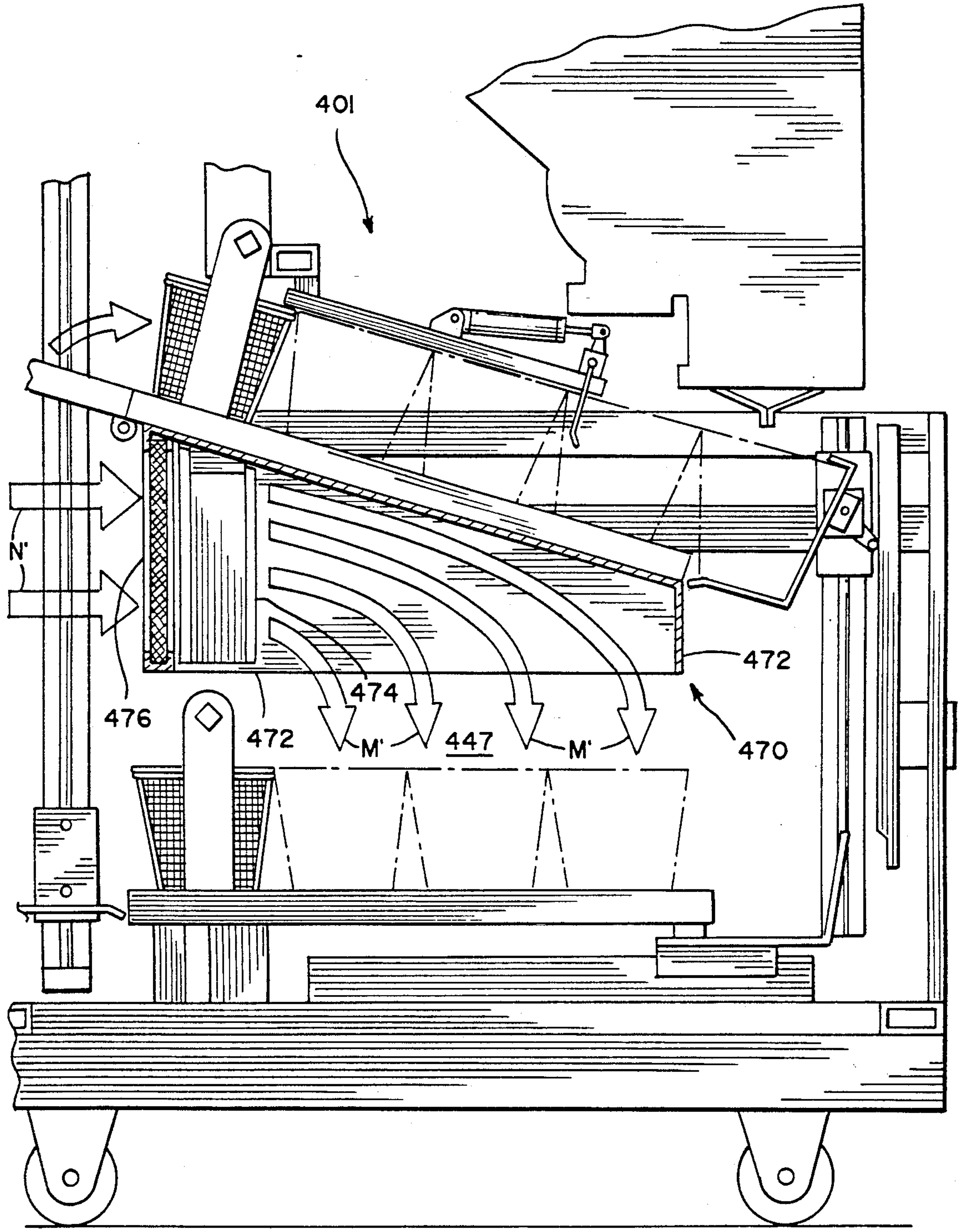
FIG. 29B is a fragmentary front elevation view of the dispenser of FIG. 26 illustrating the addition of an optional air distribution system for thawing frozen french fries.
Figure 29:
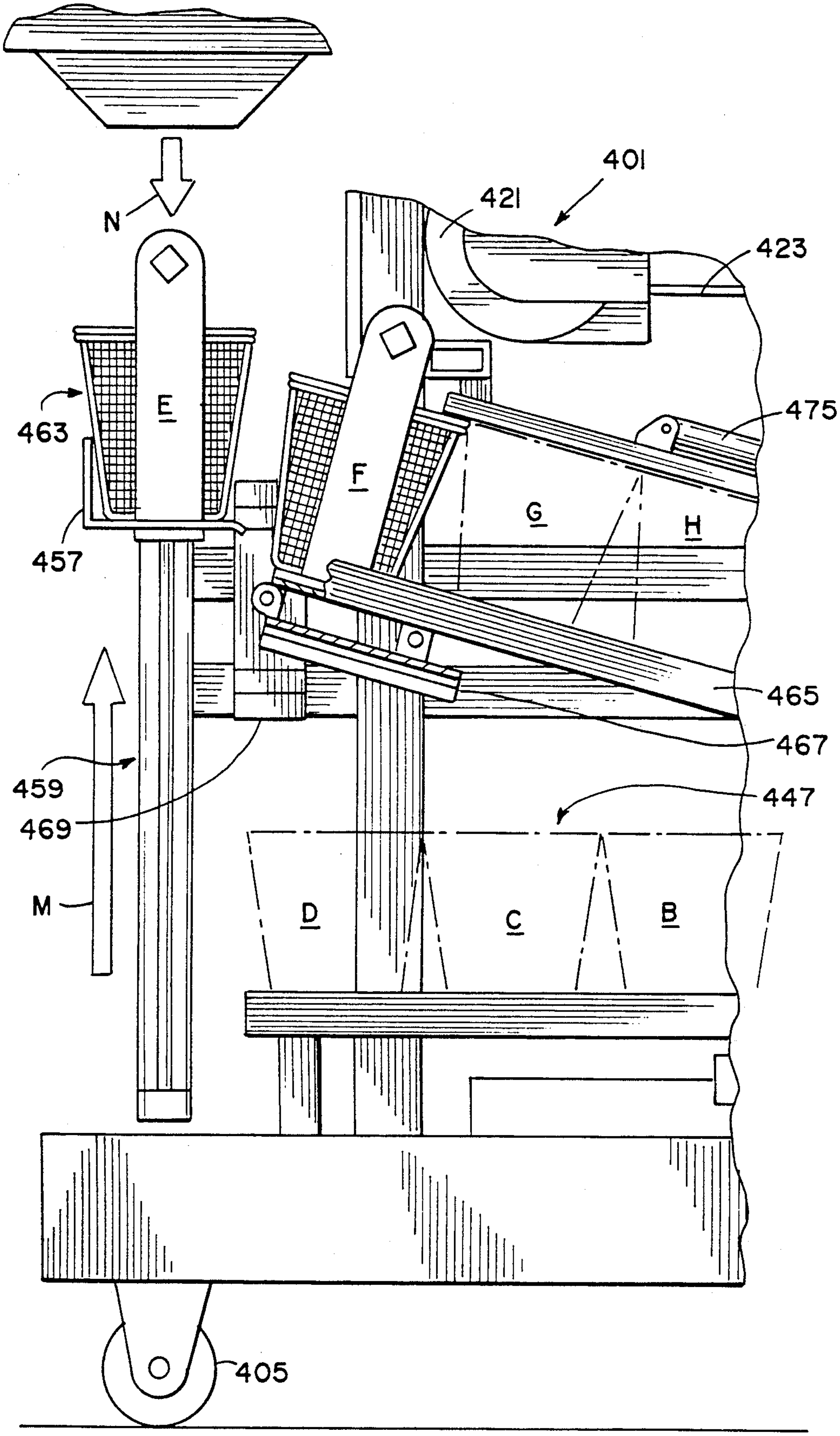
FIG. 29 is an enlarged fragmentary front elevation view of the dispenser of FIG. 26 illustrating another portion of the dispensing cycle.

FIG. 29B illustrates an optional air thaw system 470 for dispenser 402 consisting of an air plenum 472, a fan 474 and a filter 476. Fan 474 pulls air (arrows N′) through filter 476 and into plenum 472 which directs the air downwardly (arrows M′) onto fry baskets for thawing french fries located in staging area 447.

Fry Vat and Related equipment

For fry cell 111, cooking station 117 is composed of fry vats 137. Referring to FIG. 2, fry vats 137 are illustrative of a preferred type of fry vat that can be used in accordance with fry cell 111. As will be known to those skilled in the art, other types of fry vats could be used in place of fry vats 137. Each fry vat 137 includes a cooking vat or tank 481 (see FIG. 1) for containing a sufficient quantity of a cooking fluid to effect proper cooking of food placed therein, a suitable heater for heating the fluid vat, such as an electric or gas heater (not shown) and a wire platform or grate 138, shown in FIG. 33A in each fry vat 137 for supporting a fry basket at each cooking location of fry vats 137. A stop 138*a* can be provided to prevent unwanted movement or change of position of baskets 237 to ensure reliable retrieval from vat 137 by robot 113. Fry vats 137 usually also include a temperature control device (not shown) which may be manual or automatic and can be monitored and/or controlled by computer operating and control station 123. Each fry vat 137 is housed in a suitable cabinet which can include wheels 485 for facilitating movement of cabinet 483.

Fry baskets 237 are positioned in cooking position in fry vats 137 by robot 113. As shown in FIG. 3, while in fry vats 137, fry baskets 237 rest on wire grates 487 located in each fry vat 137 for maintaining each fry basket 237 in proper position, including the proper depth (vertical position) in fry vats 137 and proper horizontal location relative to robot 113 so that robot 113 reliably retrieves fry baskets 237 from fry vats 137. Any structure or arrangement for locating and maintaining the fry baskets in proper position could be utilized, such as, for example, the locator pin and aperture arrangement disclosed in U.S. patent application Ser. No. 07/176,568, filed Apr. 1, 1988.

In addition, shortening or oil level sensing, filling and skimming of fry vats 137 can be performed manually or by any of the techniques disclosed in U.S. patent application Ser. No. 07/176,568, filed Apr. 1, 1988.

Fry vats 137 can incorporate a vat stir mechanism 492, illustrated in FIGS. 32 and 33 and shown in position on fry vats 137 of FIGS. 24 and 25. Stir mechanism 492 is composed of a longitudinally extending bar 494 that is dimensioned to extend along the top of fry vats 137, a stir rod 496 for each fry vat location where a fry basket can be placed, for example, one stir rod 496 for each fry vat 137A–F of FIG. 3, and a drive mechanism 498. Bar 494 includes offset end portions 500 and 500', one at each end of bar 494. End portion 500 is connected to drive mechanism 498 and end portion 500' is journaled to bearing 502 to allow free rotation of bar 494.

Drive mechanism 498 includes a rotary air cylinder 504, a drive sprocket 506, a chain 508, a drive sprocket 510 coupled to a rigid shaft 512 which rotates bar 494 when driven. Chain 508 can incorporate a turnbuckle 514 to adjust the chain tension. As illustrated in FIG. 32, when shaft 512 is rotated by air cylinder 504 a desired amount (slightly more than 180° as shown in FIG. 32), stir rods 496 traverse an arc 516 that causes stir rods 496 to pass through any fry baskets 237 that are in position in fry vats 137, thereby stirring the contents of baskets 237. By stirring the contents of baskets 237 during cooking, more uniform cooking results. When not in use, stir rods 496 are disposed in an upright position as shown in FIG. 33 and should be used to stir vats 137 only when robot 113 is not inserting or removing a fry basket 237 into vats 137 and when dump platform 253 is in the vertical position.

As an alternative to stir mechanism 492, fry vats 13 can incorporate a fry basket rocking mechanism 518, illustrated in FIGS. 32A and 33A. Mechanism 518 is similar to mechanism 492 and includes a bar 494', rocking rods 496' for each fry vat location where a basket can be placed, except that rods 496' are shorter than rods 496 since their function is to slightly rock or lift the end of baskets 237 as shown in FIG. 33A by pivoting movement accomplished by a slight counterclockwise rotation of bar 494'. Bar 494' could be rotated the desired amount, to rock basket 237 during cooking by a mechanism similar to drive mechanism 498. In the embodiment in FIG. 32A, drive mechanism 498' consists of an air cylinder 520 connected to rod 494' to provide the desired rotation.

Cooked Food Storage, Dispensing and Display Station and Related Equipment

Referring to FIG. 2, there is illustrated an elevation view of cooked food storage, dispensing and display station 121 in accordance with one embodiment of the invention which consists of a french fry bagging station 139. Station 121 receives cooked food, in this case french fries, delivered by robot 113 via dump station 119.

As shown in FIGS. 1 and 2, french fry bagging station 139 includes a french fry holding bin 488 for holding bulk cooked french fries F deposited therein and french fry racks 489 for holding bagged french fries. French fry bagging station 139 may also include a cabinet 490 and various storage areas 490' for storing french fry containers, utensils and other items as desired. French fry bagging station 139 may also include a heating mechanism (not shown) for warming cooked french fries F.

Cooked Food Dump Mechanism

Referring to FIGS. 1-2 and 5, there is illustrated various aspects of dump station 119 in accordance with the invention. Dump station 119 includes a substantially horizontally mounted shaft 251 and dump platform 253. Robot 113 performs part of the dumping function and dumps cooked french fries F as illustrated in FIG. 5 by clockwise rotation of wrist 131 thereby causing basket 237 to be likewise rotated and the contents dumped onto dump platform 253, which includes upstanding wall portions 255 and 255'. Platform 253 is rigidly secured to shaft 251. Shaft 251 is rotated by a drive mechanism 257 that includes a power source 259, which can be a rotary air cylinder, a stepper motor or other type of power source for rotating sprocket 261. A chain 263 drives driver sprocket 265 to which shaft 251 is connected thereby rotating shaft 251 and causing platform 253 to be raised in the direction of arrow G until platform 253 is in an approximately vertical position to dump fries F. Platform 253 is lowered in the direction of arrow G' by rotation of shaft 251 in the opposite direction until platform 253 reaches approximately a horizontal or load position a shown in dotted lines in FIG. 2.

Another embodiment of a fry cell in accordance with the invention is illustrated in FIGS. 24 and 25, Fry cell 144 of FIGS. 24 and 25 is configured to process chicken nuggets, fish filets and chicken patties and includes robot 113, cooking station 117 (composed of fry vats 137), uncooked bulk food dispensing station 249, consisting of chicken patty dispenser 241, pie basket pick up platform 243, fish filet dispenser 245 and chicken nugget dispenser 247. Fry cell 144 also includes a dump mechanism 250 that consists of two dump platforms 253 and 253', one at each end of cooking station 117 as illustrated in FIGS. 24 and 25. Platform 253' is identical in design to dump platform 253 previously described and platforms 253 and 253' of fry cell 144 include all of the associated equipment previously described with respect to fry cell 111. Dump platform 253 of fry cell 144 can be used to dump cooked chicken nuggets onto storage area 252 and platform 253' can be used to dump cooked fish filets and cooked chicken patties onto storage area 254. Baskets 237*a–d* are shown in position for receiving uncooked chicken nuggets, fish filets, chicken patties and pies, respectively. Uncooked pies may be supplied manually to basket 237*d*.

General Grill Cell Description

Referring to FIGS. 34–74, the components and operation of grill cell 145 are illustrated. The major components of grill cell 145 include grill cell robot 267, which includes grill cell end of arm tool 273, uncooked bulk food dispensing station 269, transfer shuttle 271, cooking station 274, cooked food deposit station 277 and bun toaster station 279.

Robot and Grill Cell End of Arm Tool

FIGS. 34–64 illustrate on embodiment of grill cell robot 267 and end of arm tool 273 or a food transport fixture which can be used to receive, transport, discharge and retrieve a plurality of food items between various food processing stations.

Robot 267 is mounted to frame 563 and includes a linear horizontal toothed track 573 that extends over cooking station 275 for providing desired horizontal movement over cooking station 275 and to and away from cooking station 275 and cooked food deposit station 277 (axis 1 indicated by arrow B' in FIG. 36), a vertical axis arm 575 mounted on a moveable platform 577 for providing vertical movement (axis 2, indicated by arrow H in FIGS. 34 and 36). A drive mechanism including a drive gear 579 powered by motor 581 drives platform 577 and vertical axis arm 575. Vertical axis arm 575 is a rodless air cylinder and is connected to end of arm tool 273 to raise and lower tool 273 as desired.

End of arm tool 273 can accept a plurality of uncooked hamburger patties from a patty dispenser station, deliver and deposit the patties on a grill, remove the cooked patties from the grill, and deposit the cooked patties on a tray or on bun crowns, bun heels or on other desired items. Although this embodiment is designed for use in hamburger grilling, it will be obvious from the following discussion that the invention can be adapted to any of a variety of manual or automatic food transport tasks which require the movement of fresh, frozen, uncooked or cooked food items to or from food processing stations. For example, another embodiment of the invention might be used to transfer uncooked pizza pies from a storage area to a cooking oven and then subsequently used to transfer the cooked items out of the oven for cooling, packaging or serving.

Figure 37:
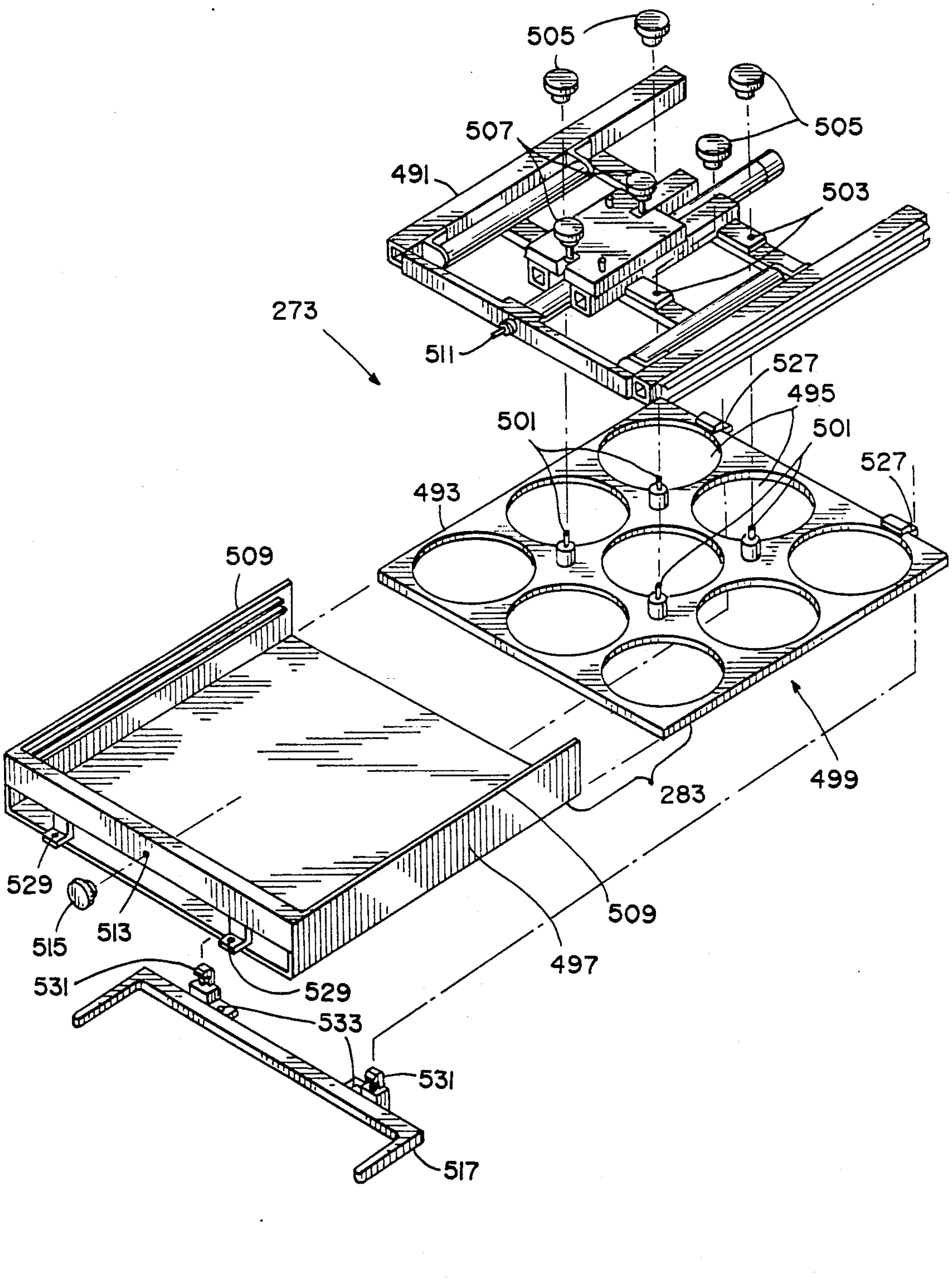
FIG. 37 is a perspective view of one embodiment of the grill cell end-of-arm tool or food transport fixture showing the extendable fixture frame and the cooked patty subassembly.
Figure 38:
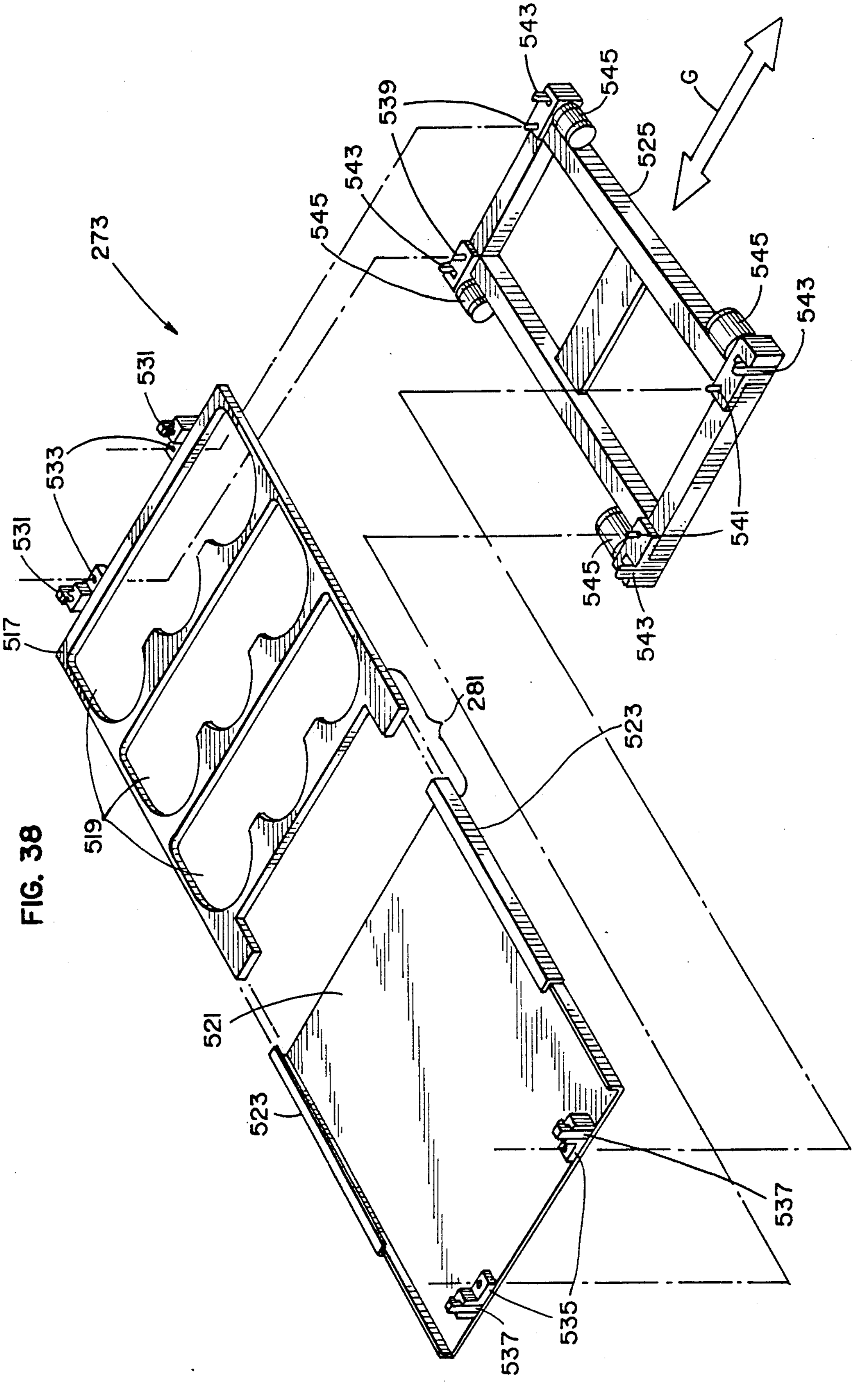
FIG. 38 is a perspective view of additional components of the embodiment of the food transport fixture of FIG. 1 showing the uncooked patty subassembly and the transfer shuttle.
Figure 39:
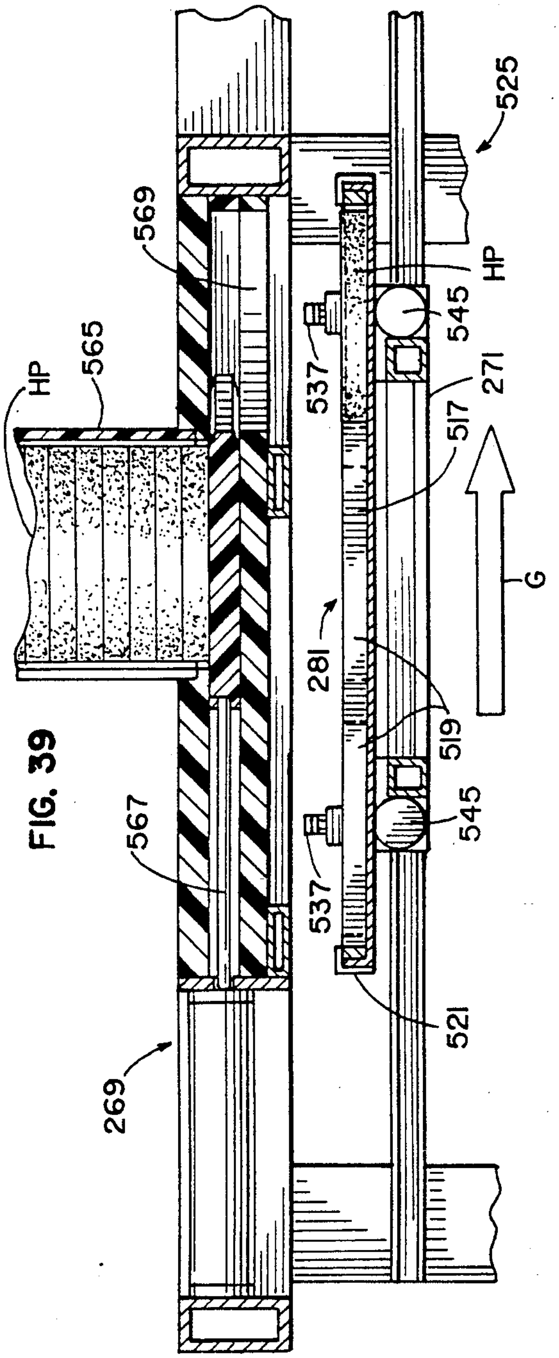
FIGS. 39 and 40 are fragmentary side elevational views of the uncooked patty dispensing station of FIG. 11 which illustrate the filling of the uncooked patty subassembly.
Figure 40:
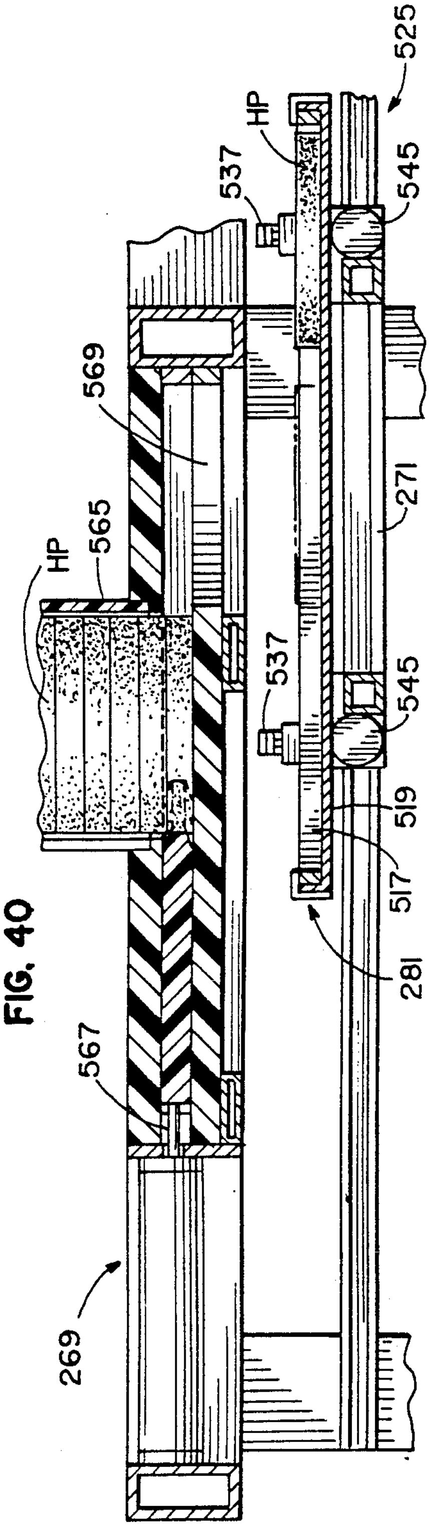

FIGS. 37 and 38 illustrate the basic components of a hamburger grilling embodiment of the food transport fixture or end of arm tool 273. In FIG. 37, grill cell end of arm tool fixture 273 includes an extendable fixture frame 491 which supports a cooked food fixture 283. Fixture 283 includes a cooked patty hoop 493 having a plurality of hoop apertures 495 and a cooked patty spatula 497. Apertures 495 fix the location of individual cooked hamburger patties when cooked patty spatula 497 is inserted under or withdrawn from under hoop 493 by the action of extendable frame 491 as will be discussed in detail in conjunction with FIG. 51. Hoop 493 and its apertures 495 represent an important aspect of the invention because they allow patties HP to be discharge from or retrieved by fixture 273 in a horizontal planar array substantially identical to the horizontal planar array 499 of apertures 495 in hoop 493. The regular pattern of array 499 permits the subsequent retrieval of the patties by any fixture or utensil having a similar planar array aperture pattern.

Cooked patty hoop 493 is attached to frame 491 by inserting four upwardly-directed cooked patty hoop threaded studs 501 through four frame stud apertures 503 located in frame 491. Four cooked patty hoop retaining nuts 505 are then affixed to studs 501. In the preferred embodiment, nuts 505 consist of knurled knobs which can be easily removed for fixture disassembly and cleaning. Frame 491 also includes a pair of attachment nuts or bolts 507 which allow the tool to be gripped for raising by a robot arm as will be discussed in conjunction with FIGS. 34, 35 and 42.

Cooked patty spatula 497 includes a pair of tracks 509 which allow spatula 497 to be slidably mounted on hoop 493. Spatula 497 is attached to frame 491 by pushing frame spatula stud 511 through a spatula stud aperture 513 and attaching a spatula securing nut 515. Preferably, nut 515 is also knurled to allow for easy disassembly.

Figure 42:
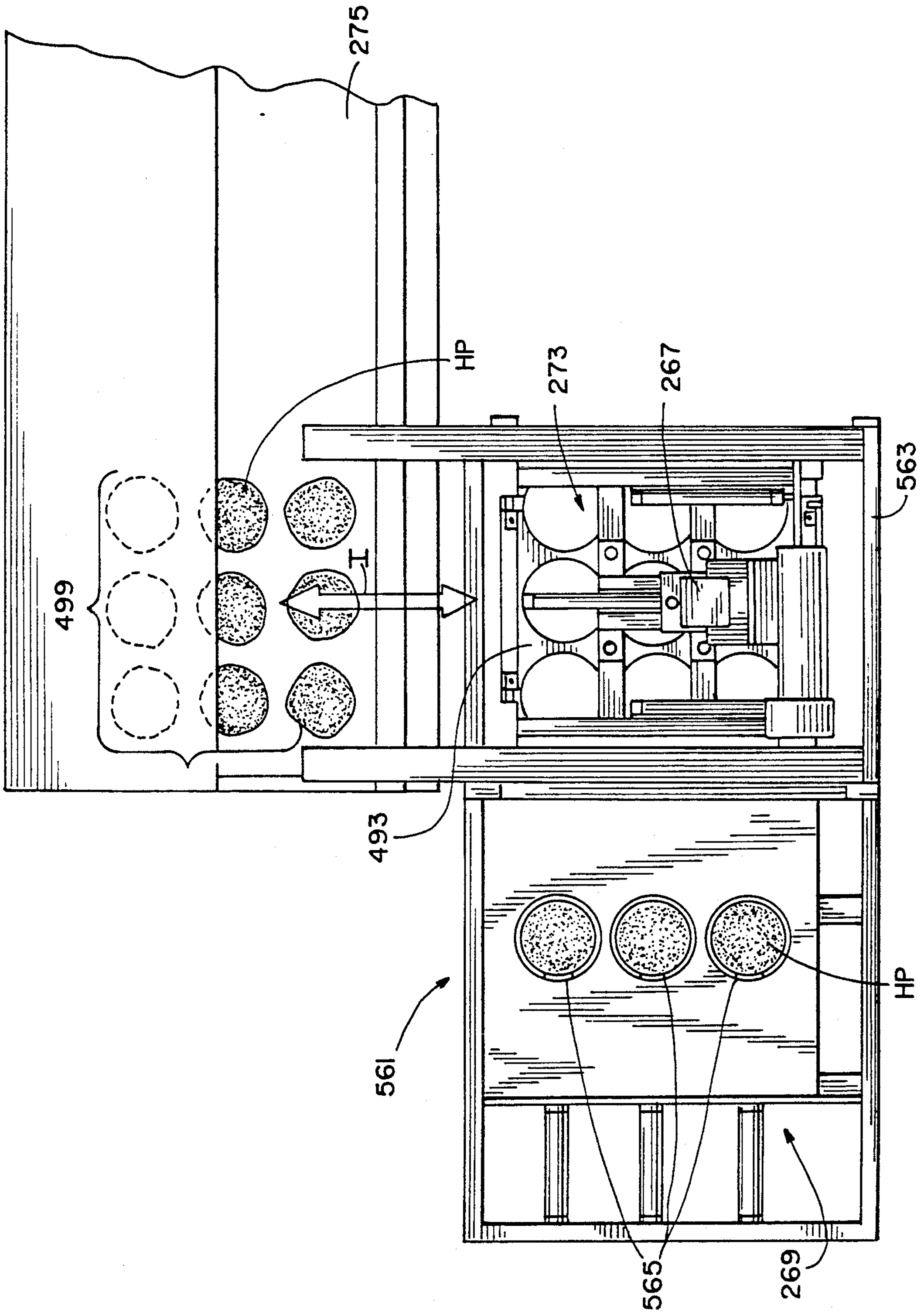
FIG. 42 is a top plan view of FIG. 7 showing the relative location of various food preparation system components including a grill, a robot arm and an uncooked patty loading station.

Other major components of grill cell end of arm tool fixture 273 are illustrated in FIG. 38. An uncooked food fixture 281 includes an uncooked patty hoop 517 having a plurality of uncooked patty hoop apertures 519. Apertures 519 have a shape useful for depositing a plurality of hamburger patties on a grill in the horizontal planar array 499 pattern of hoop 493 as shown in FIG. 42. Apertures 519 are in vertical alignment with apertures 495, thereby permitting patties deposited in planar array 499 by uncooked food fixture 281 to be successfully reacquired by cooked food fixture 283. The use of separate cooked and uncooked subassemblies prevents the possible spread of bacteria from uncooked to cooked food.

Fixture 281 also includes an uncooked patty spatula 521 which is slidably mounted to hoop 517 by a pair of uncooked patty spatula tracks 523. Tracks 523 permit spatula 521 to slide back and forth on hoop 517 to allow patties to be discharged from or reacquired by fixture 281. Hoop 517 and spatula 521 can rest on a patty shuttle 525 for movement to and from an uncooked patty dispenser (see FIG. 35) in the direction of arrow A' shown in FIG. 38, and for removing uncooked food fixture 281 from fixture 273 as described in the following paragraph.

Figure 61:
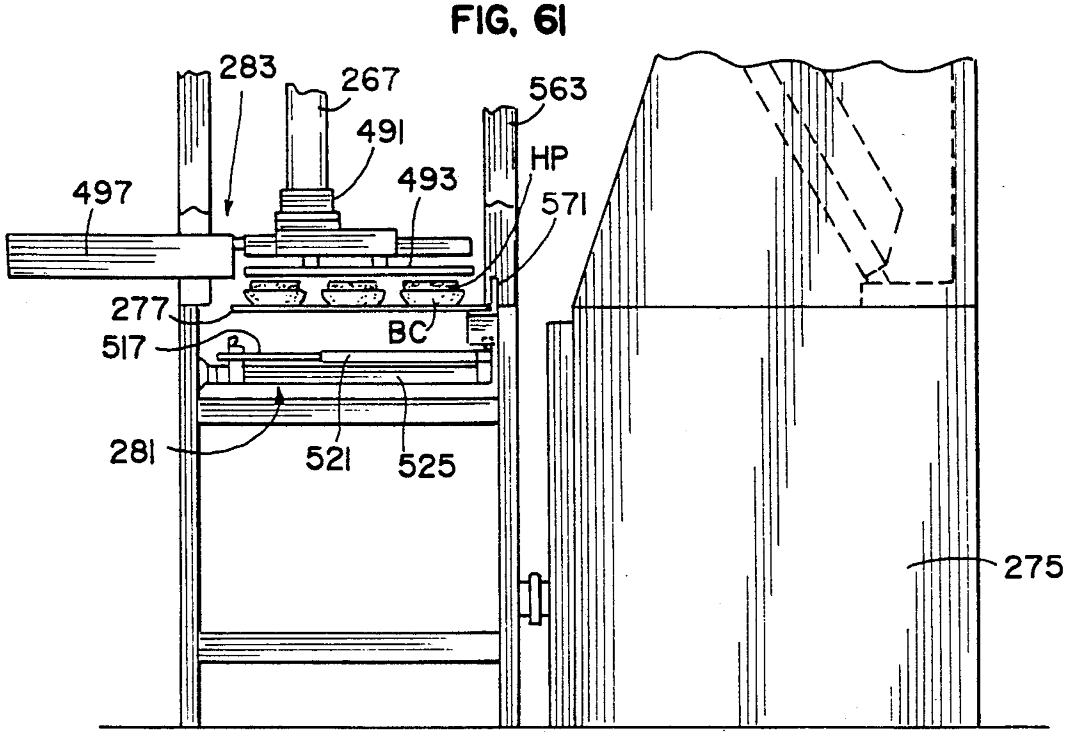

Uncooked food fixture 281 is designed to be removably attached beneath cooked food fixture 283 as can be seen in FIG. 61. Structures included for this purpose which are illustrated in FIG. 37 include cooked patty hoop guide apertures 527, cooked patty spatula guide apertures 529 and uncooked patty hoop pivotable spring fingers 531 (also illustrated in FIG. 38). Additional attaching structures illustrated in FIG. 38 include uncooked patty hoop guide apertures 533, uncooked patty spatula guide apertures 535, uncooked patty spatula spring loaded fingers 537, shuttle hoop guide pins 539, shuttle spatula guide pins 541, pivotable spring finger release levers 543 (see FIG. 4), and spring finger lever cylinders 545. The cooperative action of the uncooked patty subassembly attaching components listed above will be described later in conjunction with FIGS. 44 and 45.

When uncooked food fixture 281 is attached to cooked food fixture 283, uncooked patty spatula 521 and cooked patty spatula 497 are slidably movable from their respective hoops 517 and 493 by the horizontal movement of extendable frame 491. As shown in FIG. 37, spatula 497 is directly attached to frame 491 and therefore moves when frame 491 moves. Because spatula 521 is attached to spatula 497 by spring fingers 531 and 537, spatula 521 moves whenever frame 491 moves spatula 497.

Figure 47:
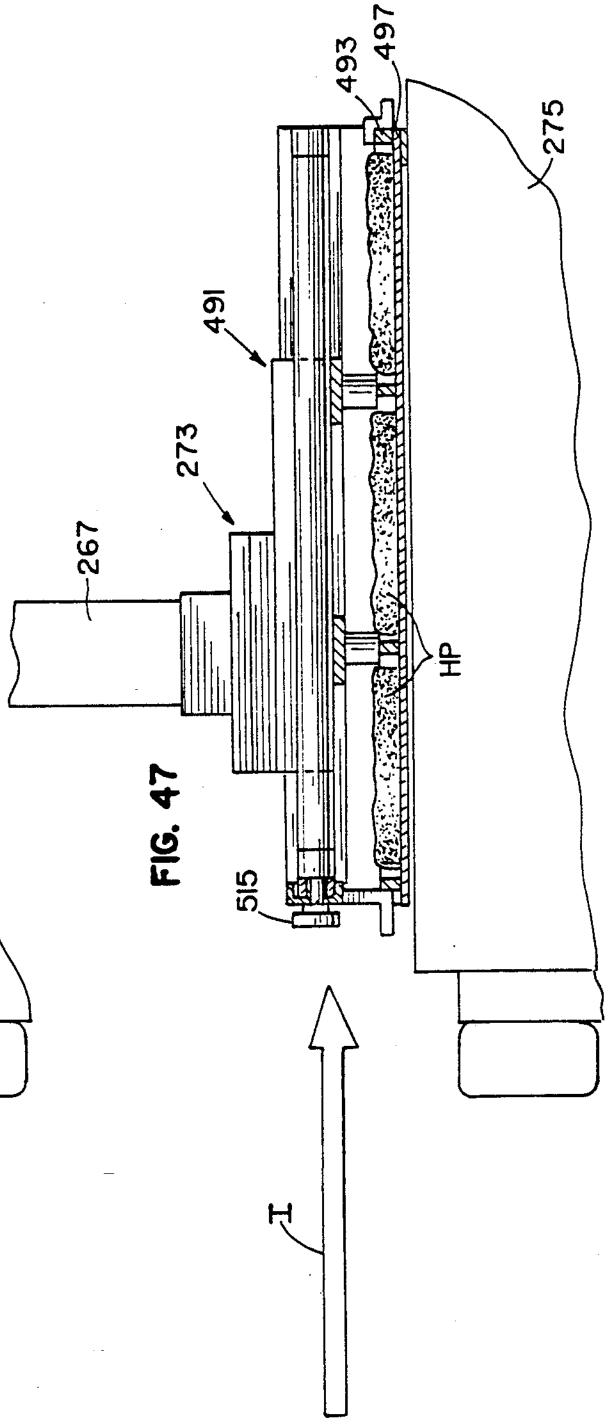
Figure 48:
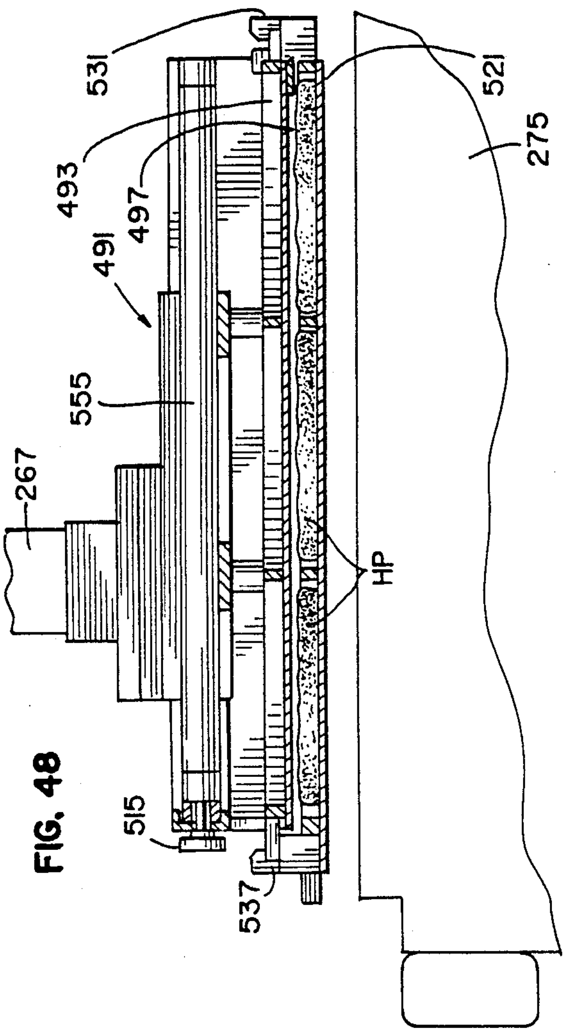
Figure 49:
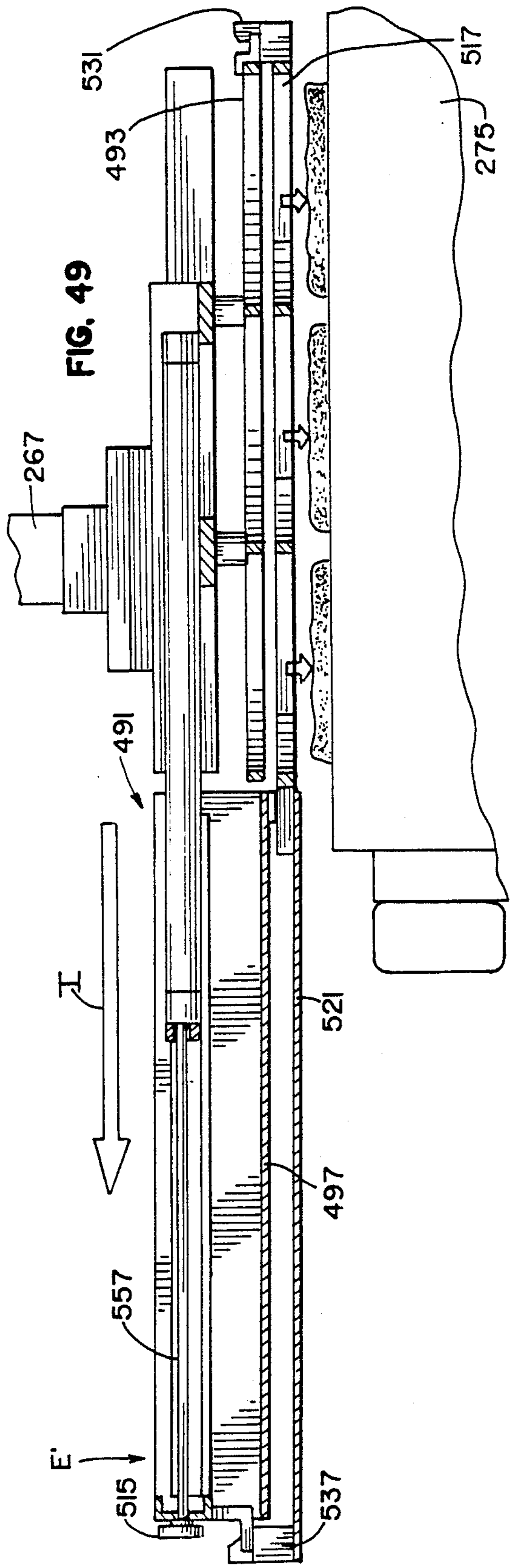
Figure 51:
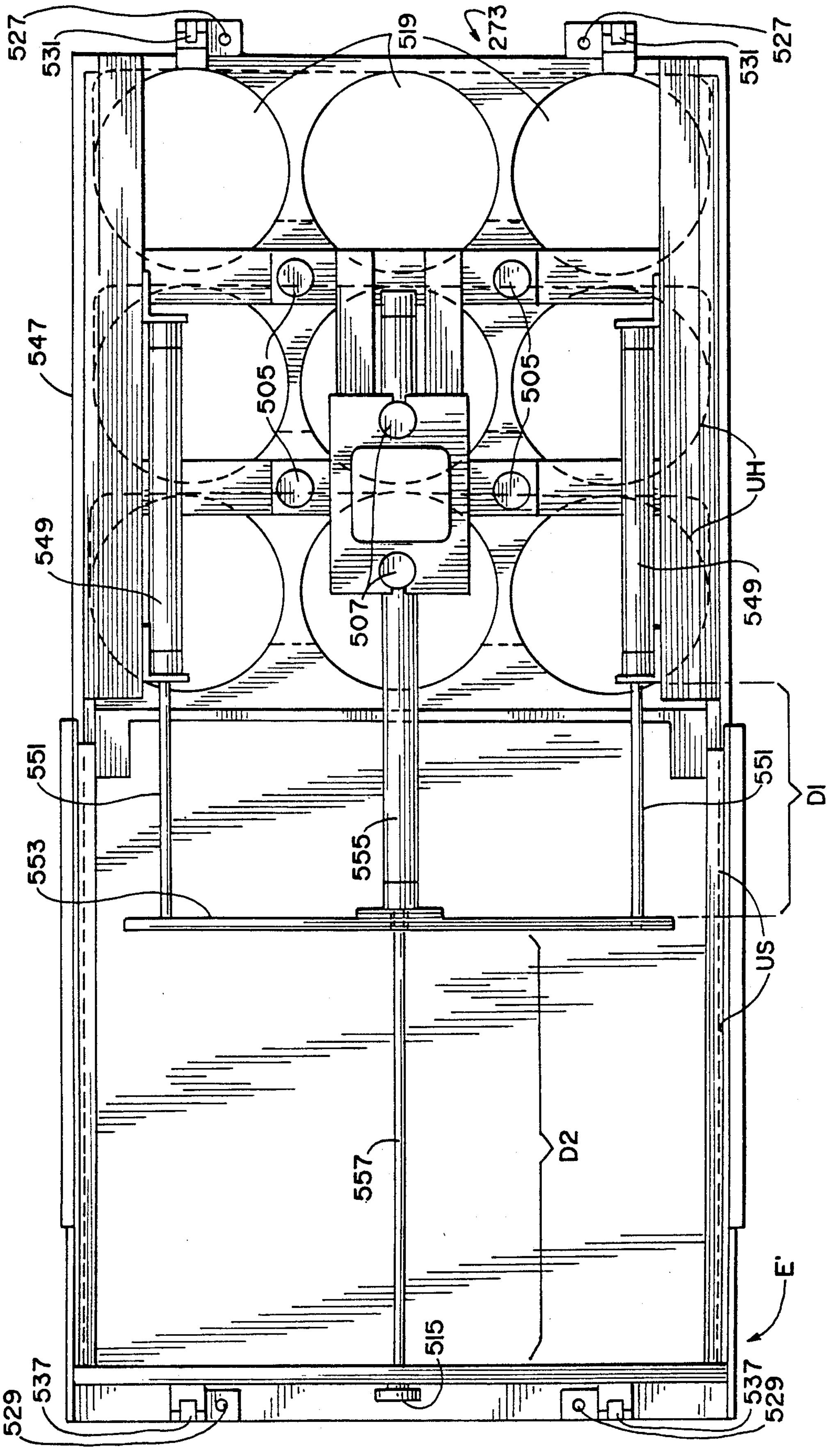
FIG. 51 is a top plan view of the extendable fixture frame in its extended position with both the cooked and uncooked patty subassemblies attached.
Figure 52:
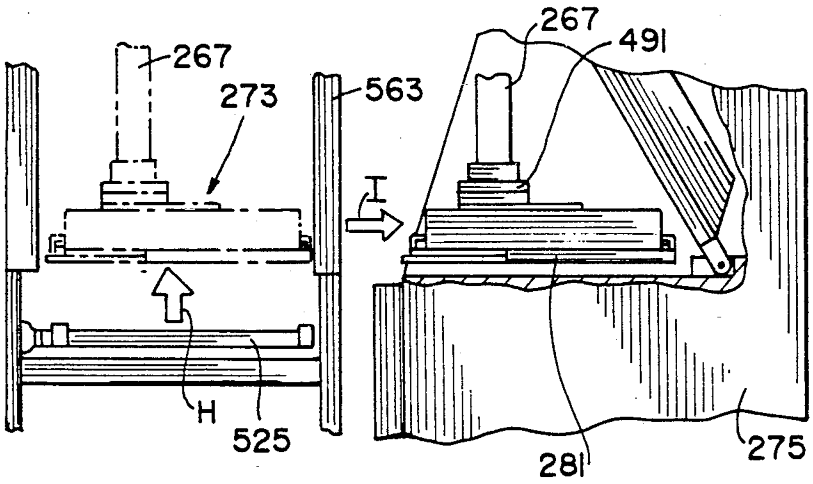
FIGS. 52 through 64 are fragmentary side elevational views showing the movement of the food transport fixture between the patty loading station, the grill and the automated food preparation system rack at various points in the automated food preparation cycle.

Frame 491 moves between a retracted position R shown in FIG. 43 and an extended position E' shown from above in FIG. 51. When frame 491 is in retracted position R, cooked patty spatula 497 and uncooked patty spatula 521 (shown by dashed line US) is directly beneath cooked patty hoop 493 and uncooked patty hoop 517 (shown by dashed line UH), respectively, as shown in FIG. 48. This allows uncooked hamburger patties to be held within hoop apertures 519 and supported from beneath by spatula 521 for transport to a grill. When frame 491 is moved to extended position E', spatulas 497 and 521 are no longer beneath hoops 493 and 517, and uncooked patties supported on spatula 521 will fall to the grill in the horizontal planar array 499 of FIG. 42 as shown in FIG. 49. As previously discussed, this permits retrieval of cooked patties by the similarly arrayed apertures of cooked patty hoop 493, shown in FIGS. 46 and 47.

It should be noted that uncooked hoop apertures 519 can be of a different form than cooked hoop apertures 495. This is because uncooked apertures 519 need only fix the location of hamburger patties when spatula 521 is withdrawn or moved to the extended position. Therefore, apertures 519 need only be semicircular shaped at the trailing edge of the hamburger, which permits a longer portion of hoop 517 to be cut away so that it is lighter. In contrast, hoop 493 must fix the position of patties during withdrawal and insertion of spatula 497, and therefore must be semicircular on both the leading and trailing edges of the hamburger patties to fix their position.

The components responsible for the horizontal movement of frame 491 are shown in FIG. 51. Extendable frame 491 includes a fixed frame member 547 to which is mounted a pair of outer cylinders 549. Cylinders 549 each have an outer cylinder rod 551 having its distal end attached to a moveable frame member 553. Frame 491 also includes an inner cylinder 555 affixed to frame member 553 which has an inner cylinder rod 557 attached to cooked patty hoop 493 by nut 515. When frame 491 is in extended position E', cylinder rods 551 and 557 are fully extended from cylinders 549 and 555 respectively. Preferably, cylinders 549 and 555 are hydraulic cylinders to provide smooth cylinder action. It is also preferred that the hydraulic fluid used to drive cylinders 549 and 555 be water or some equally food-compatible substance to prevent food contamination in the event of cylinder leakage.

The movement of frame 491 from extended position E' to retracted position R is a two-step process. First, outer cylinders 549 and inner cylinder 555 is actuated to pull frame member 553 inward a first distance D1. Spatula 497 moves inward the same distance as it is pulled inward by retracting inner cylinder rod 557 which is affixed to frame member 553. Frame 491 is then moved to its fully retracted position R by cylinders 549 and 555 to retract frame 491 a second distance D2. This pulls spatula 497 to a position directly beneath hoop 493. To extend frame 491 to its fully extended position, cylinders 549 and 555 are extended.

Outer cylinders 549 move first because of lower operating pressure requirements. Cylinders 549 and 555 move simultaneously once cylinder 555 begins moving.

The cooperation of the components involved in attaching and removing uncooked food fixture 281 from cooked food fixture 283 is best described in conjunction with FIGS. 44 and 45. FIG. 44, which is representative of the operation of spatula spring fingers 537 as well as hoop spring loaded fingers 531, shows uncooked patty hoop 517 stacked between patty shuttle 525 and cooked hoop 493. Hoop spring loaded finger 531 is shown in the attached position. Fixture 273 has been lowered onto shuttle 525 so that uncooked food fixture 281 can be removed from grill cell end of arm tool fixture 273 by releasing spring finger 531. In this attached condition, spring finger lever 543 is shown in an initial upright position and spring finger lever cylinder 545 is shown in an initial retracted position. To remove uncooked food fixture 281 from cooked food fixture 283, lever cylinder 545 is actuated. This causes cylinder rod 559 to move to an extended position (shown in dashed lines). Finger release lever 543 then pivots about lever pivot point LPP, which in turn causes spring finger 531 to pivot about finger pivot point FPP. This pushes the lower end of finger 531 inward, causing spring finger 531 to move outward at its upper end to provide sufficient clearance between finger 531 and hoop 493 for hoop 493 to be moved upward past retracted finger 531.

Fixture 281 can be attached to fixture 283 in a similar manner. Hoop 517 is first lowered over a shuttle hoop guide pin 539 passing through guide apertures 533 (as seen in FIG. 45). As the bottom edge of hoop 517 bears down on finger 531, the top of finger 531 pivots inwardly, thereby securing fixture 281 to fixture 283.

As previously noted, the illustrated embodiment of fixture 273 is adapted for use in an automated food preparation system. The operation of fixture 273 in this application will now be discussed in connection with FIGS. 34–36, 39, 40–42, 46, 48–49, and 52–64.

First referring to FIGS. 34, 35 and 42, fixture 273 is moved about an automated food preparation system 561 by a robot 267 capable of gripping grippable frame members 507 (illustrated in FIG. 51). FIG. 34 is a perspective view of preparation system 561 showing the physical arrangement of a patty dispensing station 269, a grill 275 and robot 267 with fixture 273 attached and sitting in a "home" position H'. As can be seen from FIG. 35, uncooked food fixture 281 moves back and forth in the direction of double arrow G to load patties from dispensing station 269 and moves back and forth in the direction of double arrow I in FIG. 42 to deposit uncooked patties on grill 275. Similarly, cooked patty hoop 493 and spatula 497 move back and forth in the direction of double arrow I to pick up cooked patties from grill 275.

Figure 41:
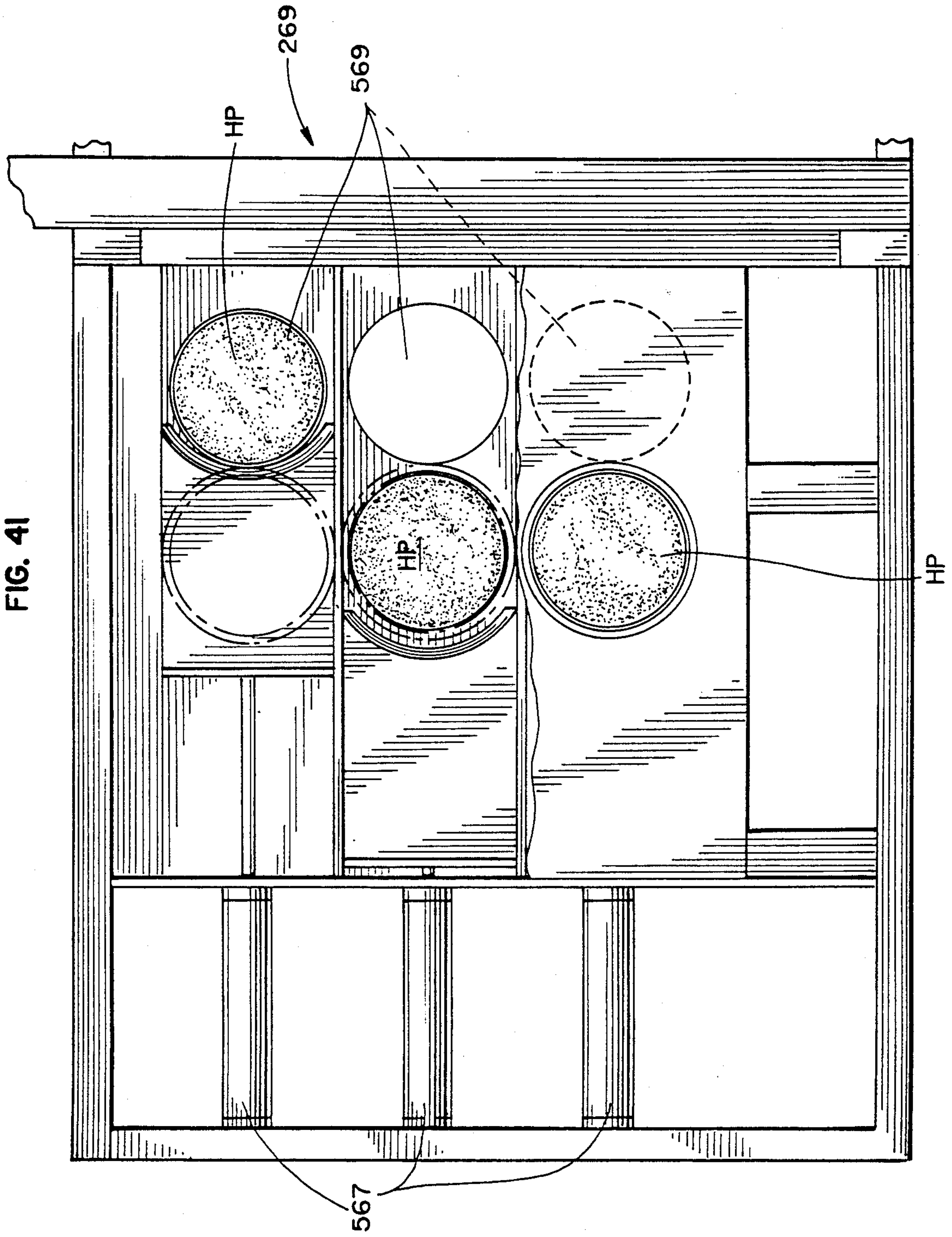
FIG. 41 is a top plan view of the uncooked patty dispensing station of FIG. 10 illustrating the operation of the patty dispensing rams.

Turning now to FIG. 35, preparation system 561 includes a frame 563 for supporting various system components and a shuttle transfer system 271 for moving shuttle 525 and uncooked food fixture 281 to and from patty dispensing station 269 in the directions of double arrow G (also shown in FIG. 38). The cooking cycle begins when transfer system 271 moves shuttle 525 into patty dispensing station 269 in response to an order to cook patties. Transfer system 271 next positions shuttle 525 beneath three patty hoppers 565 as shown in FIG. 36. Each hopper 565 employs a cylinder operated patty dispensing ram 567 to push a hamburger patty HP from the bottom of each hopper through an uncooked patty dispensing aperture 569 as shown in FIG. 41.

Patties fill uncooked food fixture 281 one row at a time. As patties HP are ejected from hoppers 565 by ram 567, they fall through uncooked patty dispensing apertures 569 (see FIGS. 39, 40, and 41). After a first row of uncooked hoop apertures 519 has been filled with a desired number of patties (see FIG. 39) transfer system 271 indexes shuttle 525 one aperture row at a time (see FIG. 40) until fixture 281 has been filled with the desired number of patties (1–9 patties in the illustrated embodiment). System 271 then moves shuttle 525 beneath robot 267 and attached cooked food fixture 283 at home position H' as shown in FIG. 35.

Figure 53:
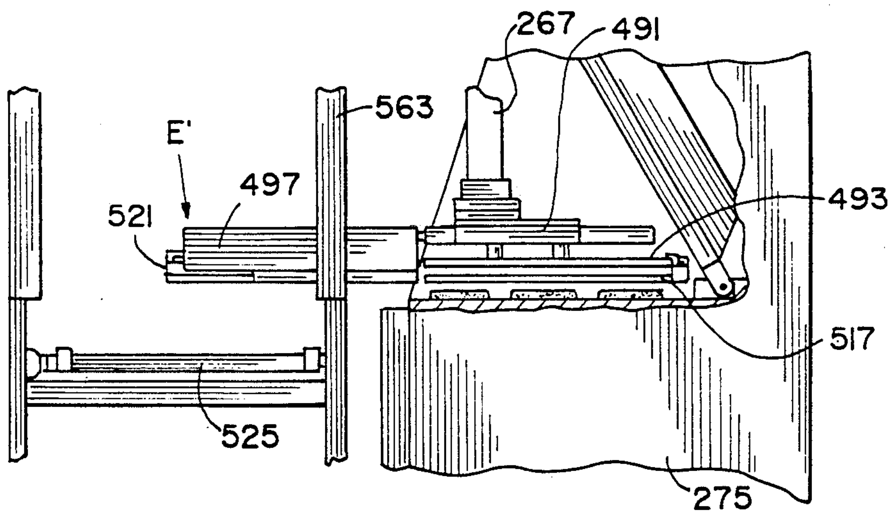
Figure 54:
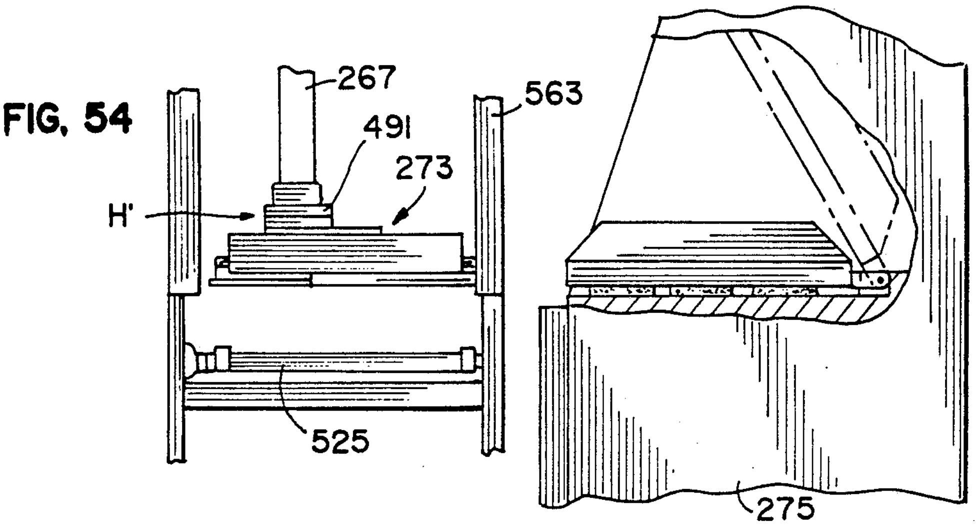

Robot 267, which can be a rodless air cylinder or an electric cylinder, for example, is next lowered in the direction of arrow H in FIG. 34 to engage and clamp uncooked food fixture 281. After clamping, robot 267 is raised and positioned over grill 275 as in FIGS. 48 and 52 and moveable frame 491 is moved to its extended position E' as shown in FIGS. 49 and 53. This moves uncooked spatula 521 from beneath uncooked hoop 517, and causes patties HP to fall to grill 275 in the horizontal planar array 499 previously described. Frame 491 is then retracted and robot 267 moves fixture 273 back to home position H' as shown in FIG. 54.

Figure 62:
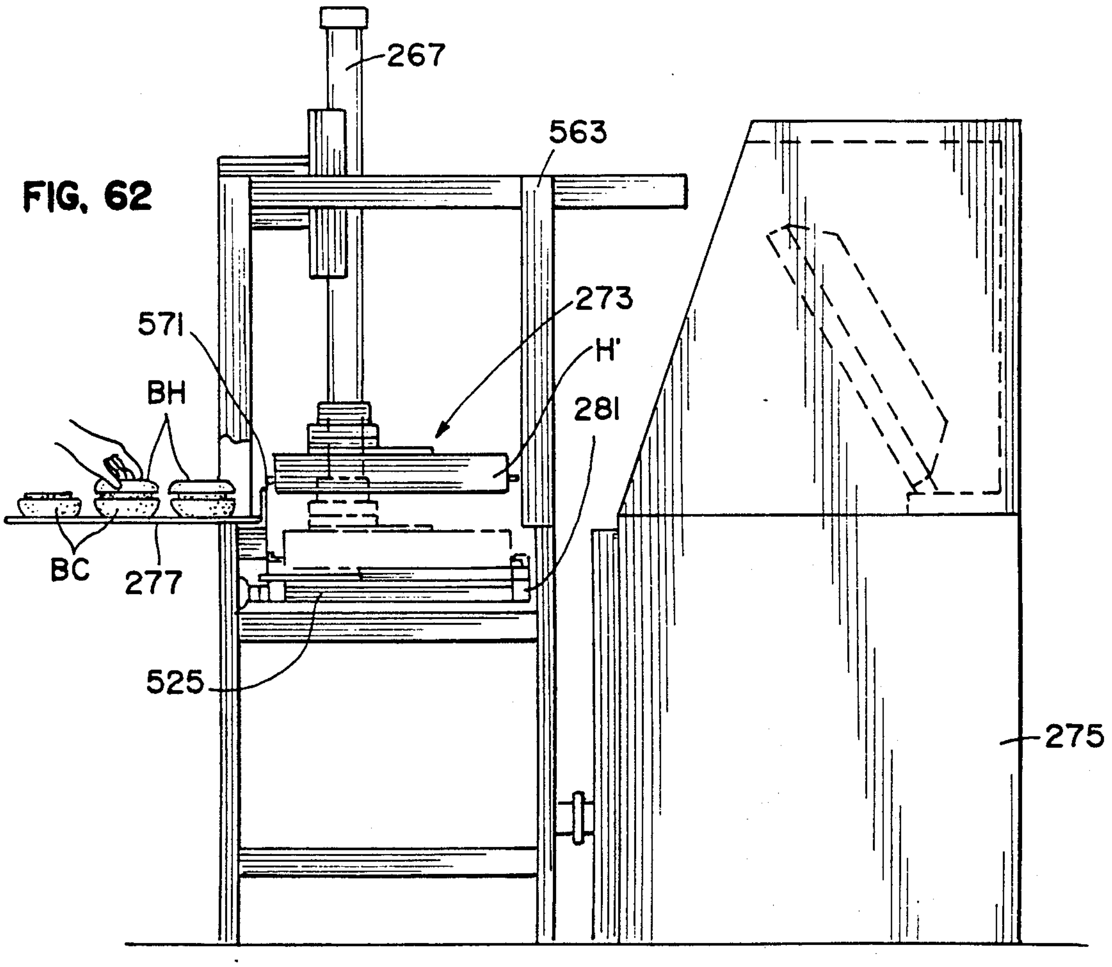
Figure 63:
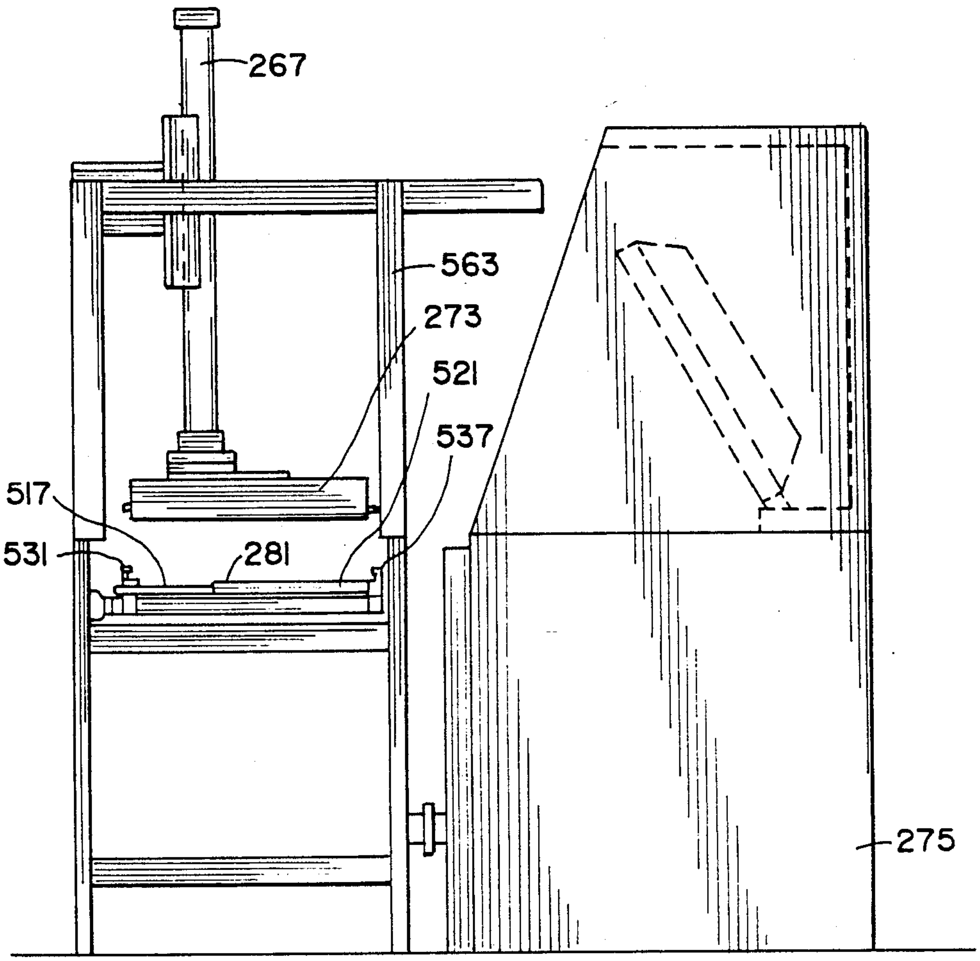
Figure 64:
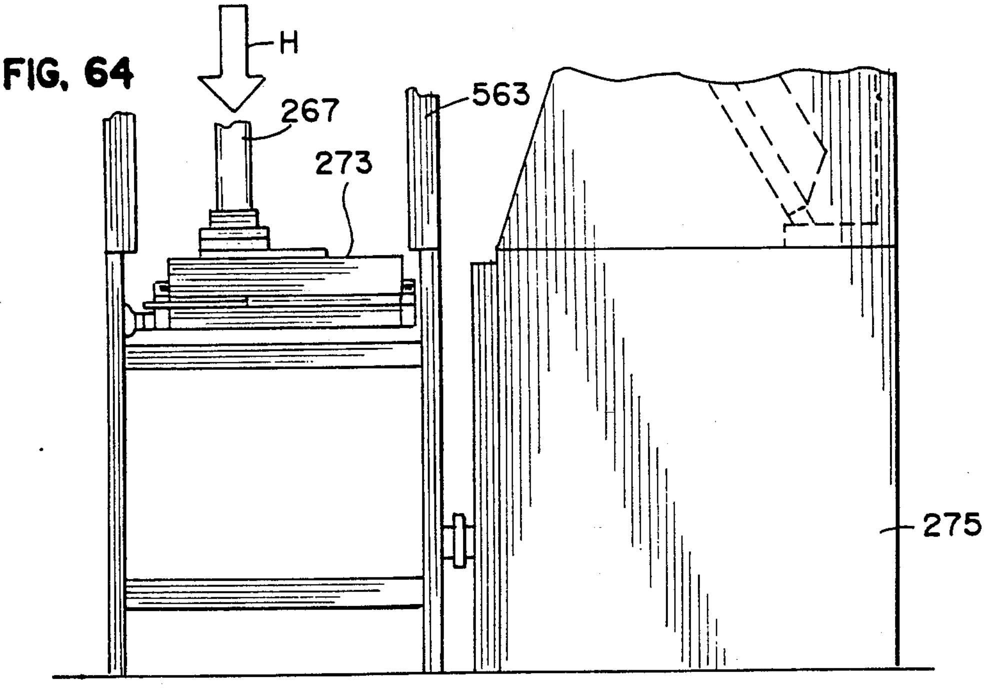

Empty uncooked food fixture 281 must now be returned to dispensing station 269 for refilling. To accomplish this, arm 267 lowers fixture 281 onto shuttle 525 from home position H' as shown in FIG. 62. Spring finger lever cylinders 545 are activated, causing fixture 281 to be released from fixture 273 as already discussed in conjunction with FIG. 44. Transfer system 271 then returns shuttle 525 to station 269 for refilling.

Figure 46:
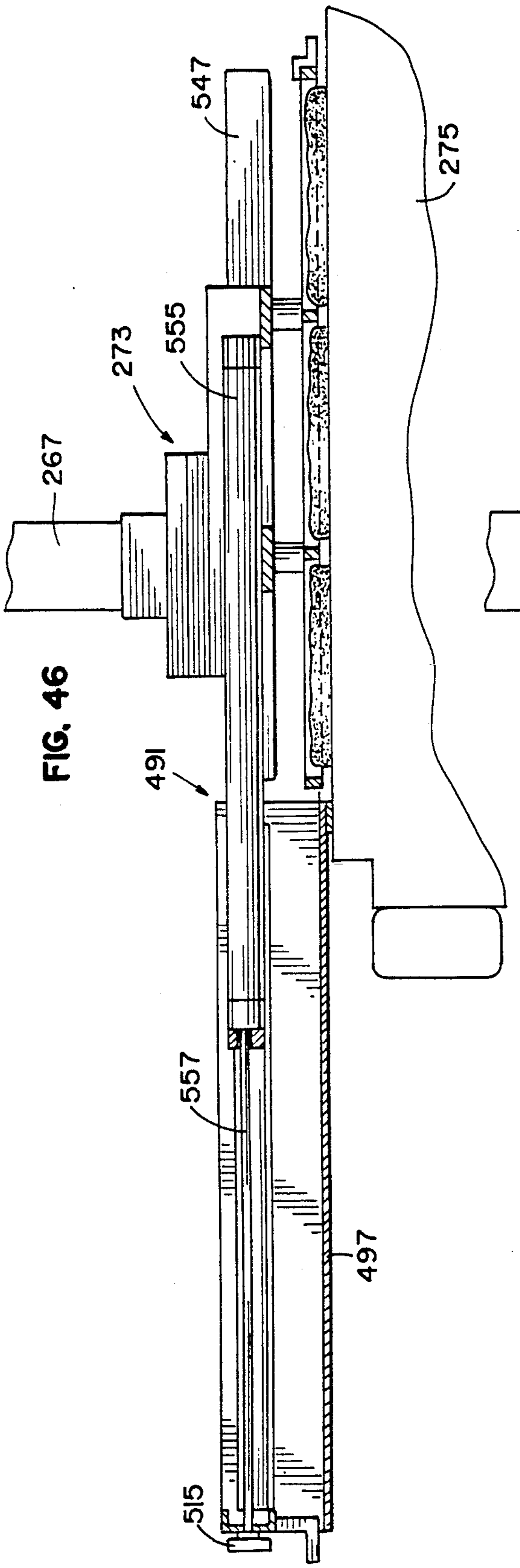
FIGS. 46 through 50 are fragmentary side elevational views showing the operation of the food transport fixture at several points in the food preparation cycle illustrated in FIGS. 52 through 64.
Figure 55:
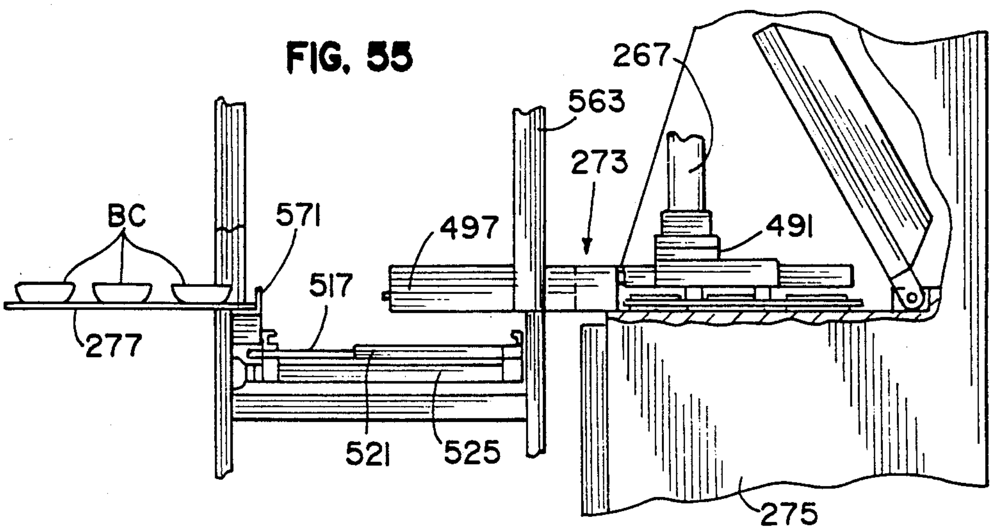
Figure 60:
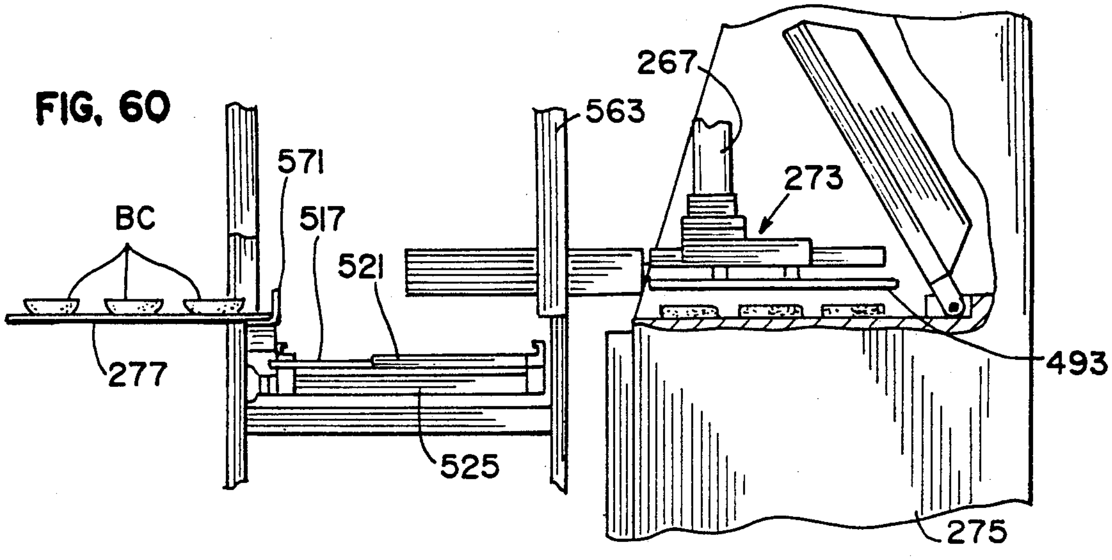

After patties HP have been cooked on grill 275, fixture 273 must be returned to grill 275 to remove patties HP. This is accomplished by moving robot 267 back over grill 275 and extending frame 491, which moves cooked patty spatula 497 from beneath cooked patty hoop 493 as shown in FIGS. 46 and 60. Robot 267 is then lowered so that spatula 497 is horizontally aligned with the portion of grill 275 on which patties HP rest. Frame 491 is then returned to its retracted position causing spatula 497 to pass between patties HP and grill 275, scooping patties HP into fixture 273 as shown in FIGS. 47 and 55. Robot 267 then returns filled fixture 273 to home position H' shown in FIG. 56.

Figure 50:
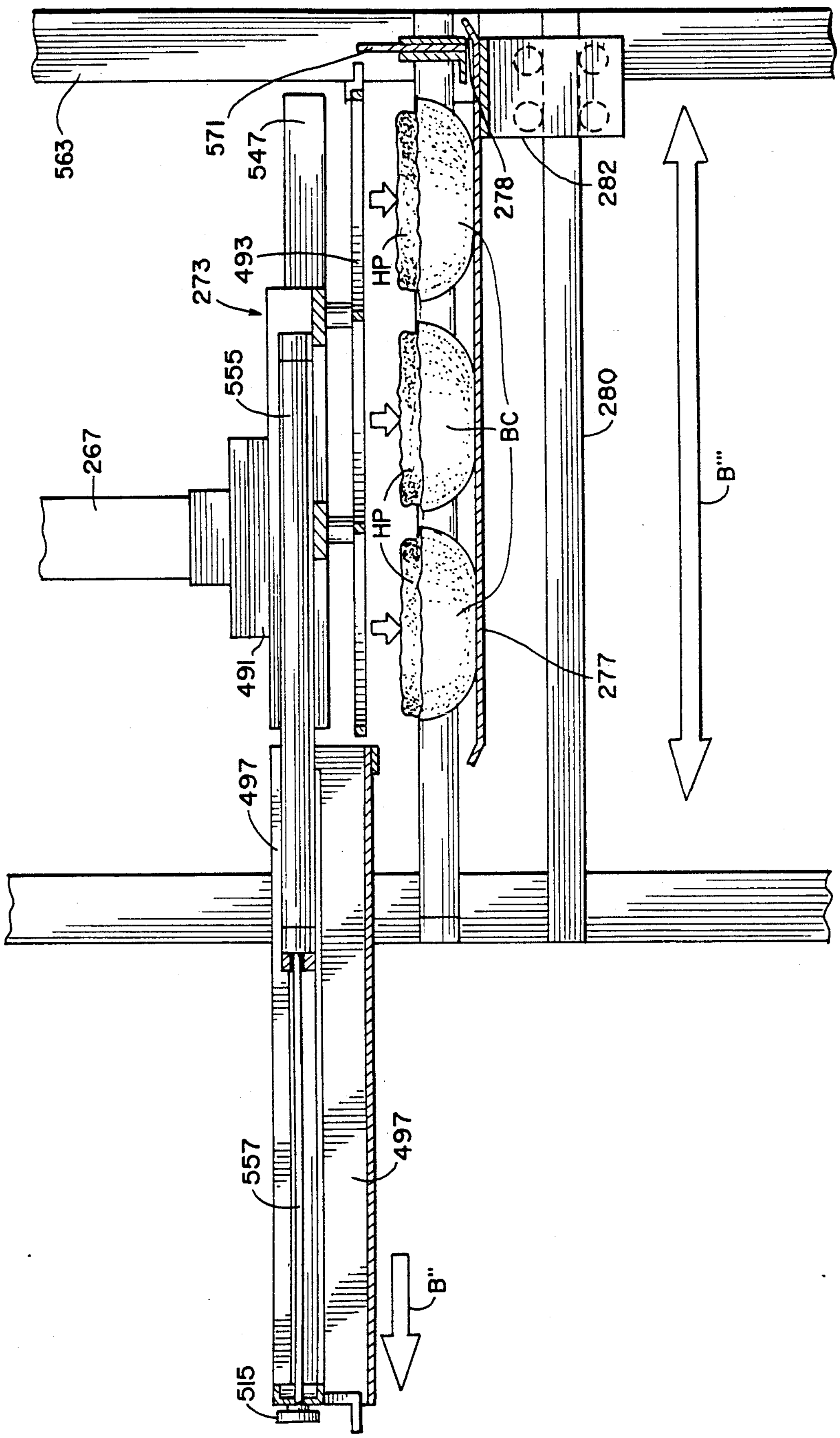
Figure 56:
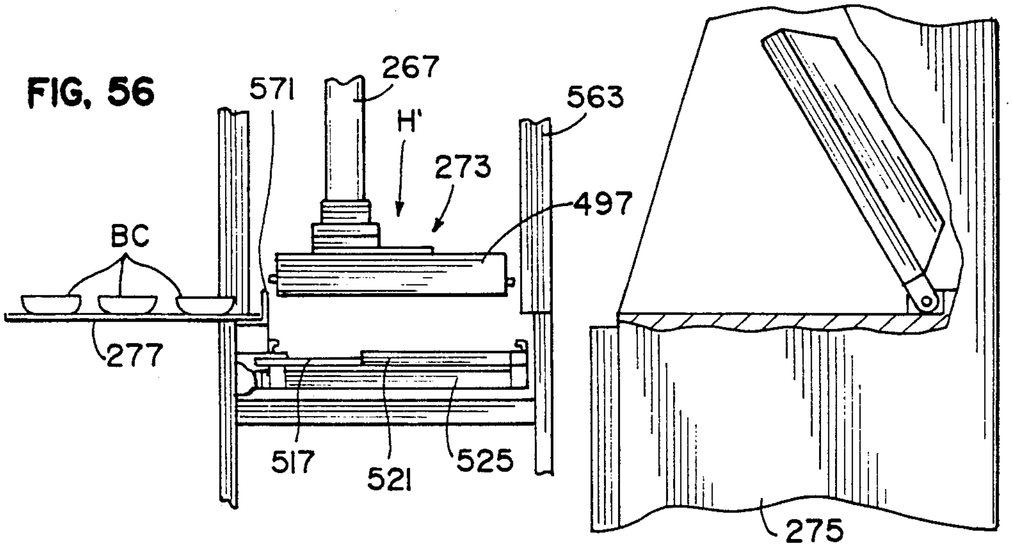
Figure 57:
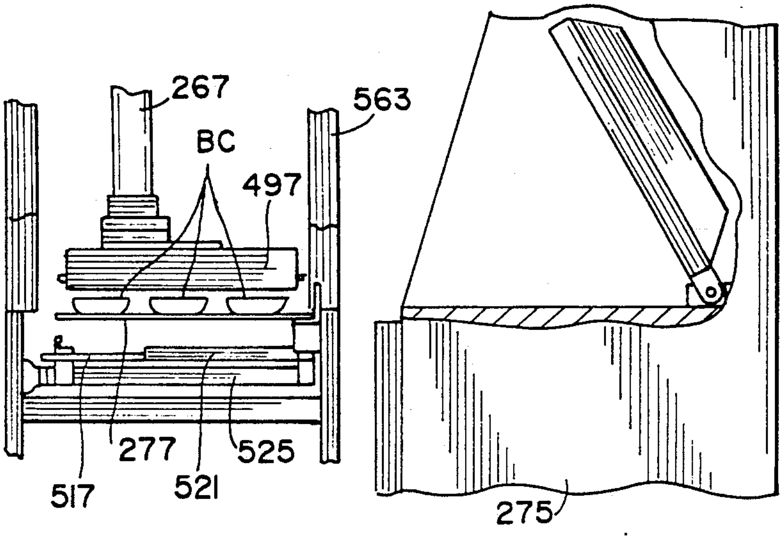
Figure 58:
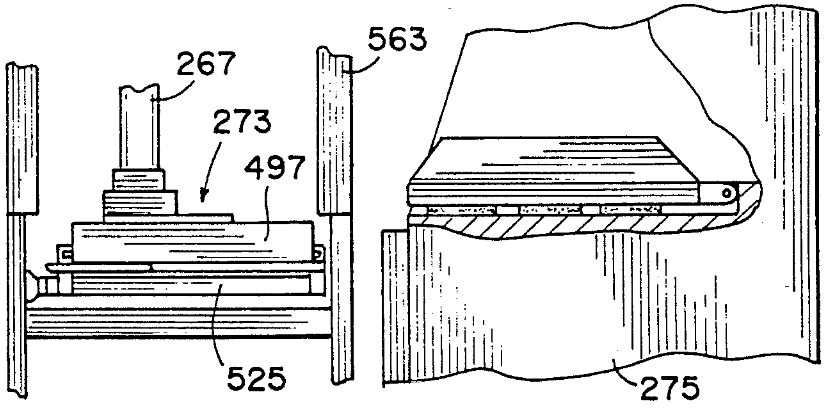
Figure 59:
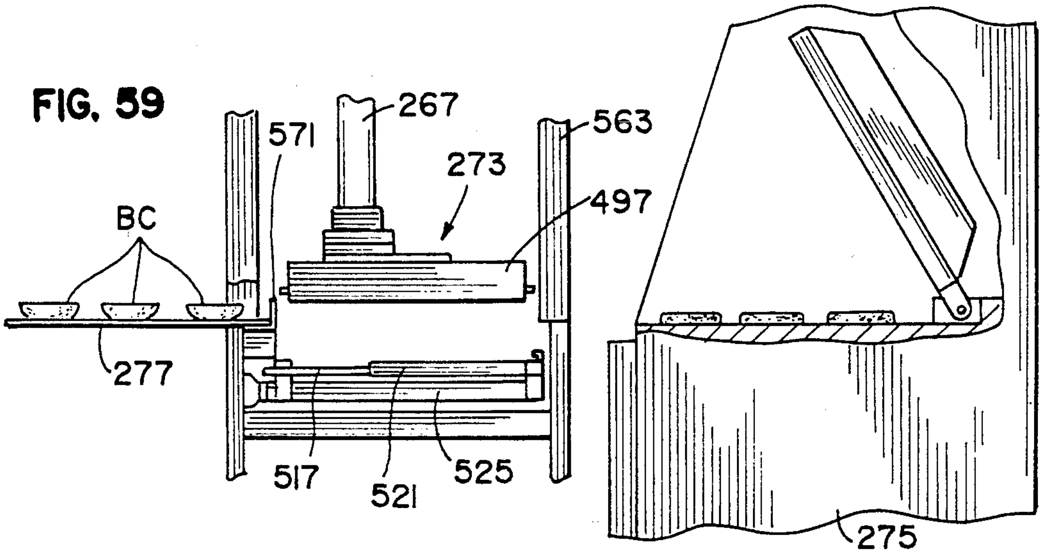

Sandwiches are prepared from cooked patties HP by the steps shown in FIGS. 50, 55-57 and 59-61. First, while patties HP are cooking on grill 275, a cooked food deposit station or moveable bun tray 277 loaded with bun crowns BC is attached to rack 563 as illustrated in FIG. 59. Bun tray 277 fits into a slot 278 on moveable bun tray frame 282 (part of rack 563) as shown in FIG. 50. Bun tray frame 282 is driven by an air cylinder, not shown, on bun tray track 280 which allows movement of bun tray 277 from an extended position as shown in FIG. 55 to a retracted position under fixture 273 to receive cooked patties HP as shown in FIG. 50. Bun tray 277 can include a cooked patty spatula wiper 571 as illustrated in FIGS. 50, 55 and 56. Fixture 273 then returns to grill 275 with cooked patty spatula 497 extended as shown in FIG. 60, and is lowered to grill 275 as shown in FIG. 55. Fixture 273 then returns cooked patties HP to home position H' (see FIG. 56) and cooked food deposit station or bun tray 277 is moved under fixture 273 on track 280. This position crowns BC beneath cooked patties HP and causes wiper 571 to clean the bottom of spatula 521 as station 277 is moved from the position shown in FIG. 56 to the position shown in FIG. 57. Frame 491 is then extended in the direction of arrow B" in FIG. 50, which moves cooked patty spatula 497 from beneath hoop 493, causing patties HP to fall on crowns BC as shown in FIGS. 50 and 61. Station 277 is then extended by movement of bun tray frame 282 along track 280 in the direction of arrow B''' of FIG. 50, and bun heels BH are added by a restaurant worker to complete the sandwiches as shown in FIG. 62.

Clamshell Grill and Cleaning Mechanism

In accordance with the illustrated embodiment of grill cell 145, cooking station or grill 275 is a clamshell grill. Clamshell grills are well known in the art and are disclosed in U.S. Pat. No. 4,763,571 and U.S. Pat. No. Re. 32,994, the disclosures of which are hereby incorporated by reference. Accordingly, a detailed description of grill 275 is not necessary. Clamshell grill 275 can be opened or closed by means of a suitable air cylinder (not shown) that can be automatically operated by grill cell 145's control system.

After cooked food items have been removed from grill 275, an automated grill cleaning mechanism scrapes the grill to remove any remaining food residue from the grill cooking surfaces. This ensures that properly prepared grill surfaces are available for the next cooking cycle. The structure and operation of the grill scraper are illustrated in FIGS. 65-69.

Figure 65:
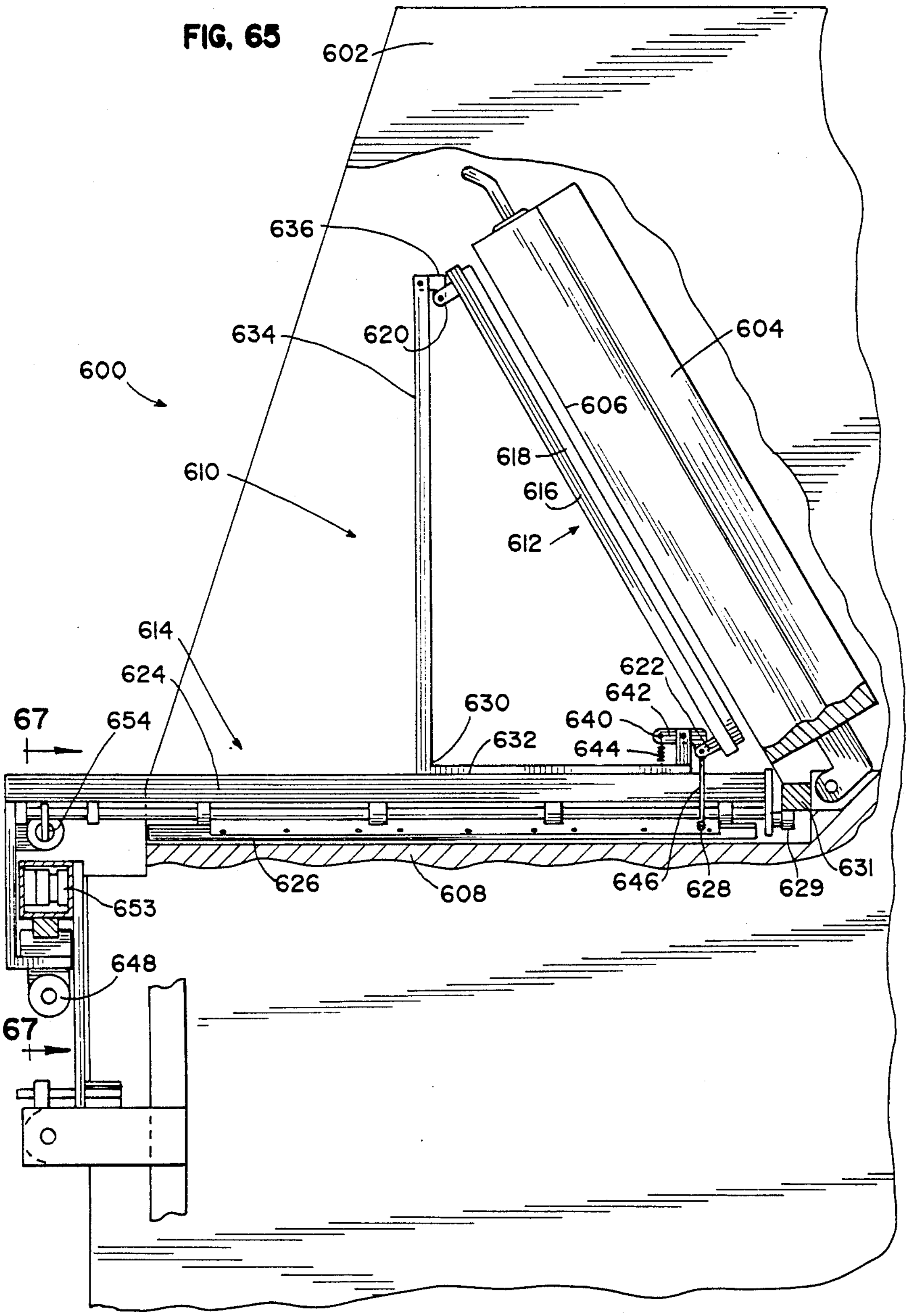
FIG. 65 is a side elevation view partly in section of a clamshell grill and grill scraper forming part of the grill cell of FIG. 34.

Referring first to the side view of FIG. 65, clamshell-type grill 275, generally contained within a grill hood 602, has been opened for cleaning. Grill 275 includes an upper platen assembly 604 having an upper cooking platen 606 and a lower cooking platen 608 for simultaneously heating opposing surfaces of a food object when grill 275 is in a closed position. Grill 275 is of the double clamshell variety having two side-by-side upper platen assemblies and one common lower platen, although only one upper platen assembly has been shown in the drawings for clarity.

Figure 69:
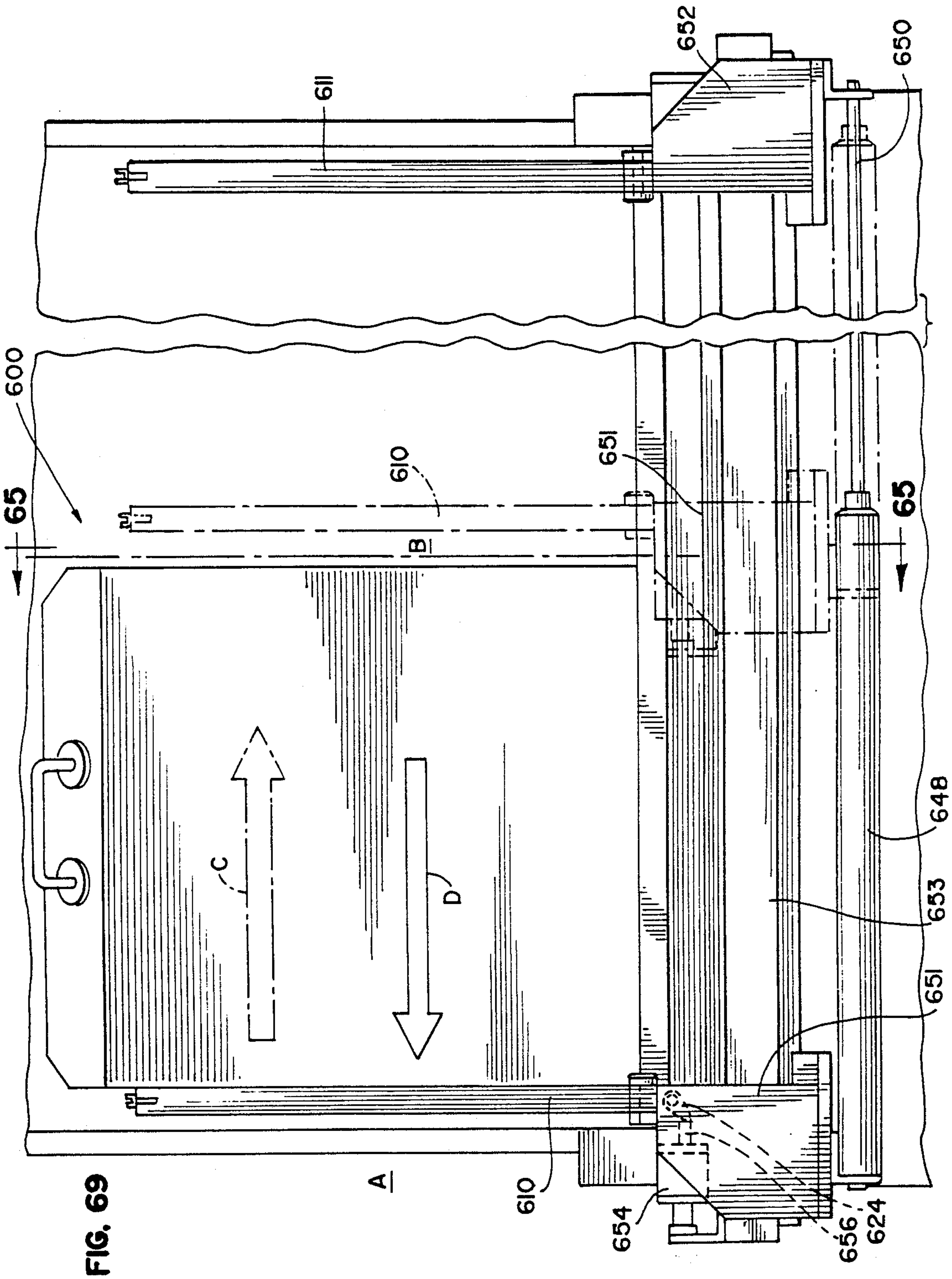
FIG. 69 is a fragmentary front elevation view of the clamshell grill of FIG. 65.

The rear edge of upper platen assembly 604 is hingably mounted to allow assembly 604 to be moved between a horizontal cooking position and the inclined cleaning position shown in FIG. 65. A clamshell grill scraper 610 is shown positioned for cleaning but not yet in contact with lower platen 608 and upper platen 606. In the case of a double clamshell grill, a second scraper 611 may be incorporated to scrape the grill area of the second clamshell unit (as shown in FIG. 69). In this case, it is preferable that scrapers 610 and 611 begin their scraping cycles from opposite sides of lower platen 608. It is also preferable that the range of each scraper overlap at the center to ensure proper cleaning coverage of the center of lower platen 608.

Grill scraper 610 utilizes an upper platen scraping assembly 612 and a lower platen scraping assembly 614 for simultaneously cleaning platens 606 and 608. Upper scraping assembly 612 includes an upper scraper mounting arm 616 for mounting an upper scraper blade 618 which is used to scrape upper platen 606. Mounting arm 616 also includes upper scraper mounting tabs 620 and 622 located at opposite ends of arm 616 for pivotably connecting arm 616 to other grill scraper 610 components.

Lower platen scraping assembly 614 includes a lower scraper mounting arm 624 for hingably mounting a lower scraper blade 626 and a cable fixture 628. Fixture 628 is used in conjunction with a cable to engage upper scraping assembly 612 as will be explained in conjunction with FIGS. 66-68. The rear end of mounting arm 624 carries a cam follower 629 which rides below a cam follower guide strip 631 to prevent the rear end of arm 624 from raising above lower platen 608. Both blades 618 and 626 can be constructed from a hard rubber capable of withstanding the range of temperatures and type of cooking residues typically encountered on grill platens 606 and 608.

Upper scraping assembly 612 is connected to lower scraping assembly 614 by an upper assembly mounting bracket 630. Mounting bracket 630 is L-shaped and has a horizontal member 632 secured to lower scraper mounting arm 624 and a vertical member 634 extending perpendicularly upward from near the middle of arm 624.

Upper scraping assembly 612 is connected between the distal ends of mounting bracket 630 by an upper linkage 636 and a lower linkage 638. Upper linkage 636 is pivotably mounted at one of its ends to the upper end of vertical member 634 and pivotably mounted at its other end to the upper end of upper scraper mounting arm 616. Lower linkage 638 includes a vertical linkage member 640 mounted to the rear portion of horizontal mounting bracket member 632 and an L-shaped linkage arm 642 pivotably mounted near the top of vertical linkage member 640. A vertically disposed spring 644 mounted to the forward end of linkage arm 642 and connected between arm 642 and bracket 630 provides tension to the forward end of arm 642 so that the opposite end of arm 642 can pivot up to engage upper platen scraping assembly 612 on upper platen 606. A cable 646 connected between the rearward end of arm 642 and cable fixture 628 provides sufficient forced to counteract the bias provided by spring 644 when scraping action is not desired.

Referring now to FIG. 69, scraper 610 is moveable between lines A and B of grill 275 as indicated by arrows C and D. Structures included for this purpose include a scraper moving cylinder 648 and a moveable cylinder rod 650. The distal end of cylinder 648 is attached to a first scraper mounting bracket 651 and the distal end of rod 650 is attached to a second scraper mounting bracket 652. Mounting brackets 651 and 562 are slidably mounted on a bracket channel 653 and carry scrapers 610 and 611, respectively. Cylinder 648 floats on brackets 651 and 652 and can move either scraper 610 or 611 by engaging one of two stop pins (not shown) located at either end of channel 653 to fix either cylinder 648 or rod 650.

Mounting bracket 651 also includes a fixably mounted scraper engaging cylinder 654 which has a moveable scraper engaging cylinder rod 656 pivotably connected to lower scraper mounting arm 624. Cylinder 654 is used to engage scraping assemblies 612 and 614 as discussed below. Bracket 652 carries similar components which are not shown.

The operation of scraper 610 will now be discussed in conjunction with FIGS. 65-69. Still referring to FIG. 69, the scraping process begins by fixing the distal end of cylinder rod 650 with a stop pin. This causes cylinder 648 to retract towards grill side B, which in turn causes scraper 610 to move across grill 275 in the direction indicated by arrow C. During this initial step, scraping assemblies 612 and 614 remain retracted from platens 606 and 608 as shown in FIG. 65 because scraper engaging cylinder rod 656 is in the retracted position shown in FIG. 67.

Once scraper 610 has been moved slightly past line B on grill 600, scraper assemblies 612 and 614 must be engaged before scraper 610 passes back across grill 275 in the direction of arrow D. Referring now to FIG. 68, scraper engaging cylinder 654 is actuated, pushing cylinder rod 656 forward. This causes lower scraper blade 626 to pivot counterclockwise in the direction of arrow E and contact lower platen 608 for scraping. The pivoting action of lower blade arm 626 also creates slack in cable 646 which allows cable 646 to move upward in the direction of arrow F. The upward cable movement allows the rearward end of linkage arm 642 to move upward and rearward in response to the bias provided by spring 644. The cooperative action of linkages 636 and 638 then causes upper scraping assembly 612 to move toward upper platen 606 in the direction of arrow F for scraping as shown in FIG. 66.

Scraper 610 is now ready for scraping upper and lower platens 606 and 608. To accomplish this, scraper moving cylinder 648 is actuated to push scraper 610 across grill 600 in the direction of arrow D. Scraper blades 618 and 626 then scrape any food residue present from platens 606 and 608, and the scraped residue is pushed across the grill surface to a waste trough (not shown) by blade 626.

Bun Toaster

Sandwich buns may be toasted prior to sandwich assembly by the automatic bun toaster shown in FIGS. 70-74. The toaster can accept bun crowns and heels, toast the bun parts, and return the bun parts on trays in the proper orientation for further automated processing.

Figure 70:
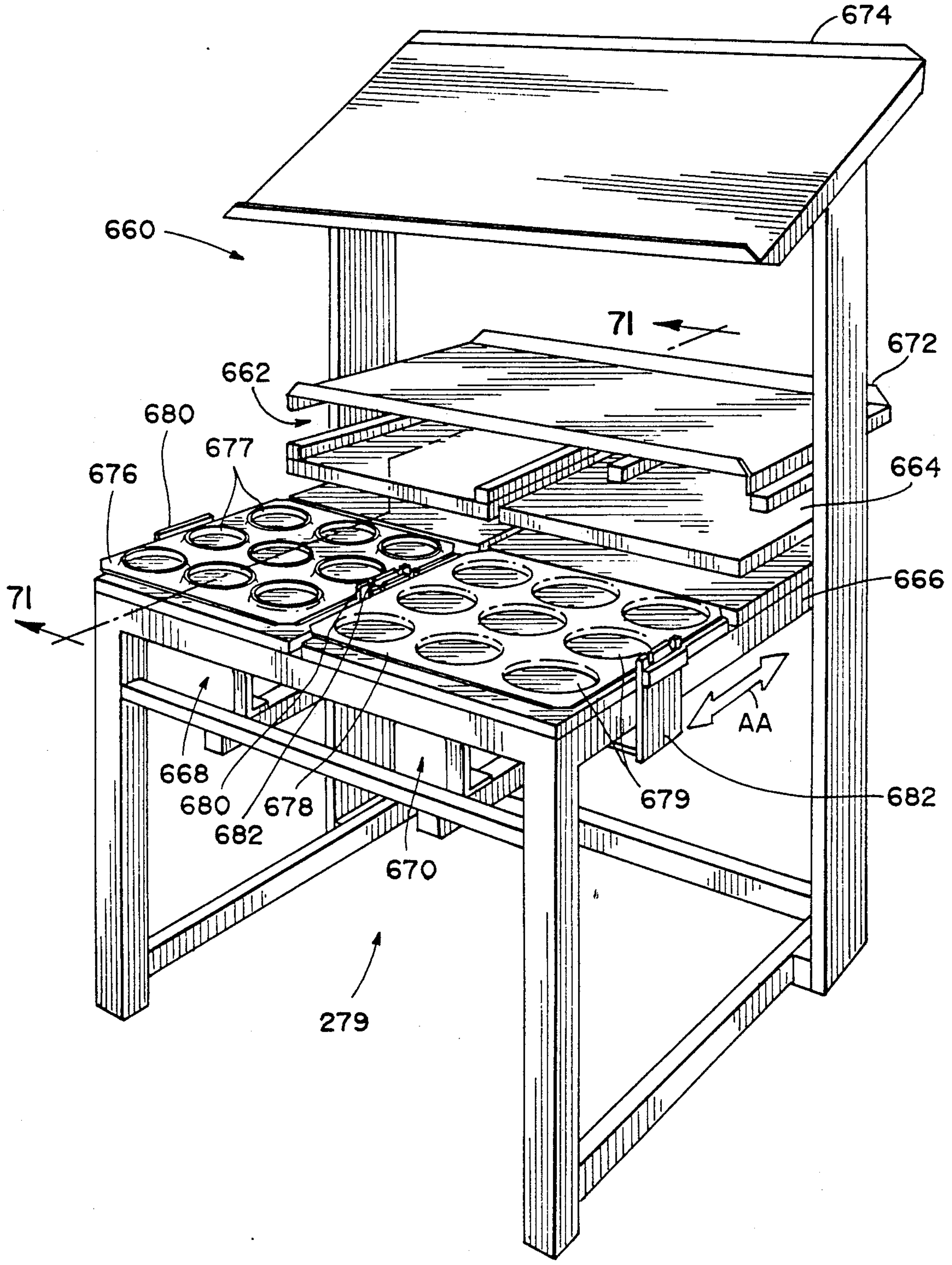
FIG. 70 is a perspective view of a bun toaster apparatus that may be utilized in conjunction with the grill cell of FIG. 34.

Referring first to FIG. 70, an automatic bun toaster 660 incorporates a crown toaster 662 and a heel toaster 664 for toasting bun crowns and heels respectively. Toasters 662 and 664 are mounted to the rear portion of a toaster table 666. Toaster table 666 includes a crown loading station 668 and a heel loading station 670. Stations 668 and 670 accept bun parts for toasting and receive toasted bun parts from toasters 662 and 664. Table 666 also includes storage racks 672 and 674 for storing bun containers.

A crown hoop 676 and a heel hoop 678 move buns forward and rearward between loading stations 668 and 670 and toasters 662 and 664. Hoops 676 and 678 include a plurality of hoop apertures 677 and 679 arranged in a horizontal planar array. Hoops 676 and 678 are attached to crown hoop transport arms 680 and heel hoop transport arms 682 respectively, which are used to move hoops 676 and 678 into and out of toasters 662 and 664 in the direction of arrow AA.

Figure 71:
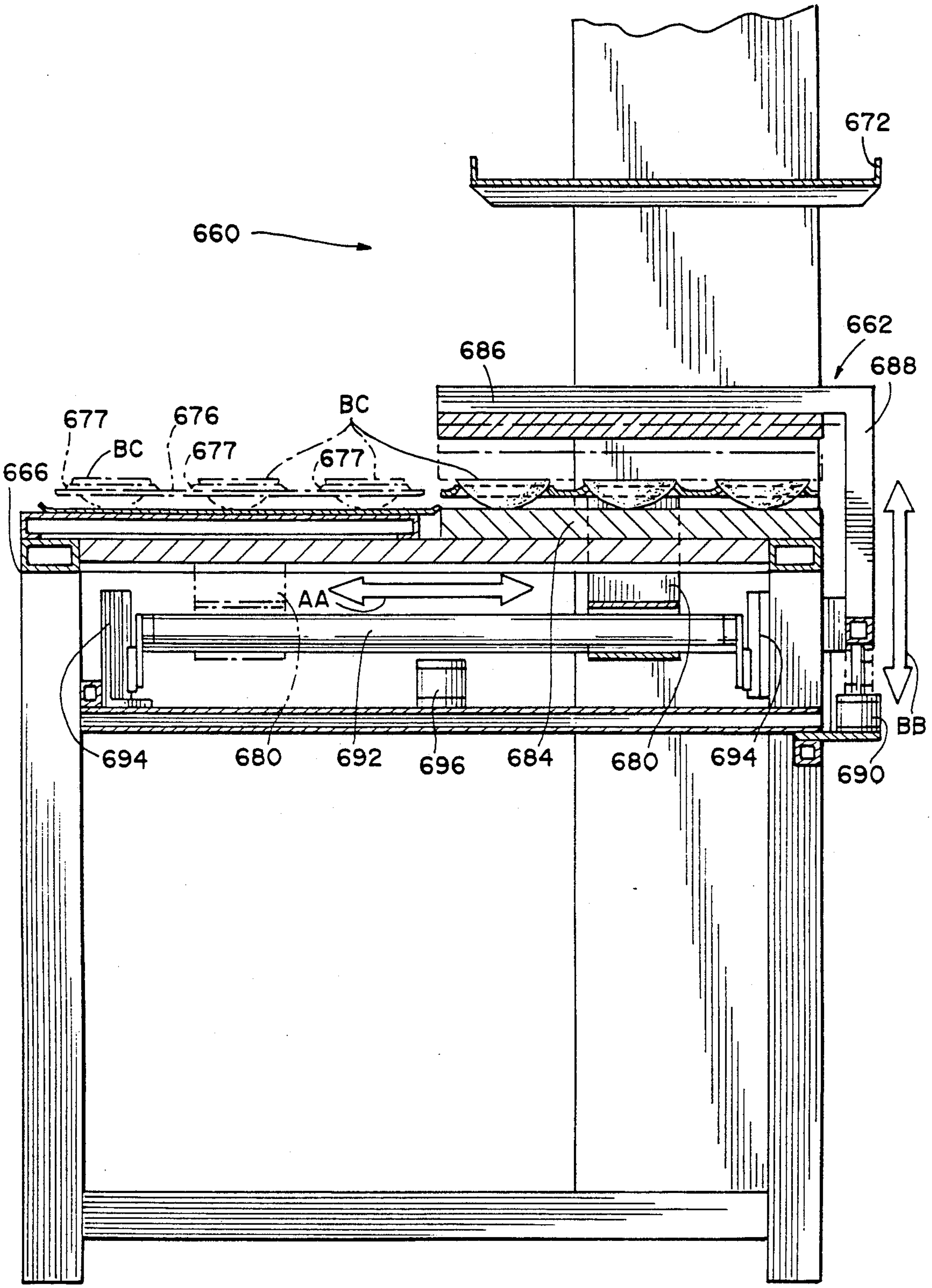
FIG. 71 is a sectional view along lines 71—71 of FIG. 70.

FIG. 71 shows additional details of toaster 660. Crown toaster 662 uses a fixed lower platen 684 and a moveable upper platen 686 to toast a plurality of bun crowns BC. Platen 684 and 686 each include heating elements (not shown) that remain energized whenever toaster 660 is in operation. Upper platen 686 is raised and lowered by moving upper platen support arm 688 in the directions indicated by arrow BB. Support arm 688 is moved by actuating an upper platen support arm cylinder 690.

Also shown in FIG. 71 is a rodless cylinder 692 which is actuated to move transport arm 680 in the directions indicated by arrow AA. Rodless cylinder 692 is movably mounted to a pair of vertically oriented cylinder tracks 694. This allows cylinder 692 and transport arm 680 to be raised for bun removal by a crown hoop lift cylinder 696 as will be discussed in conjunction with FIG. 74.

Figure 72:
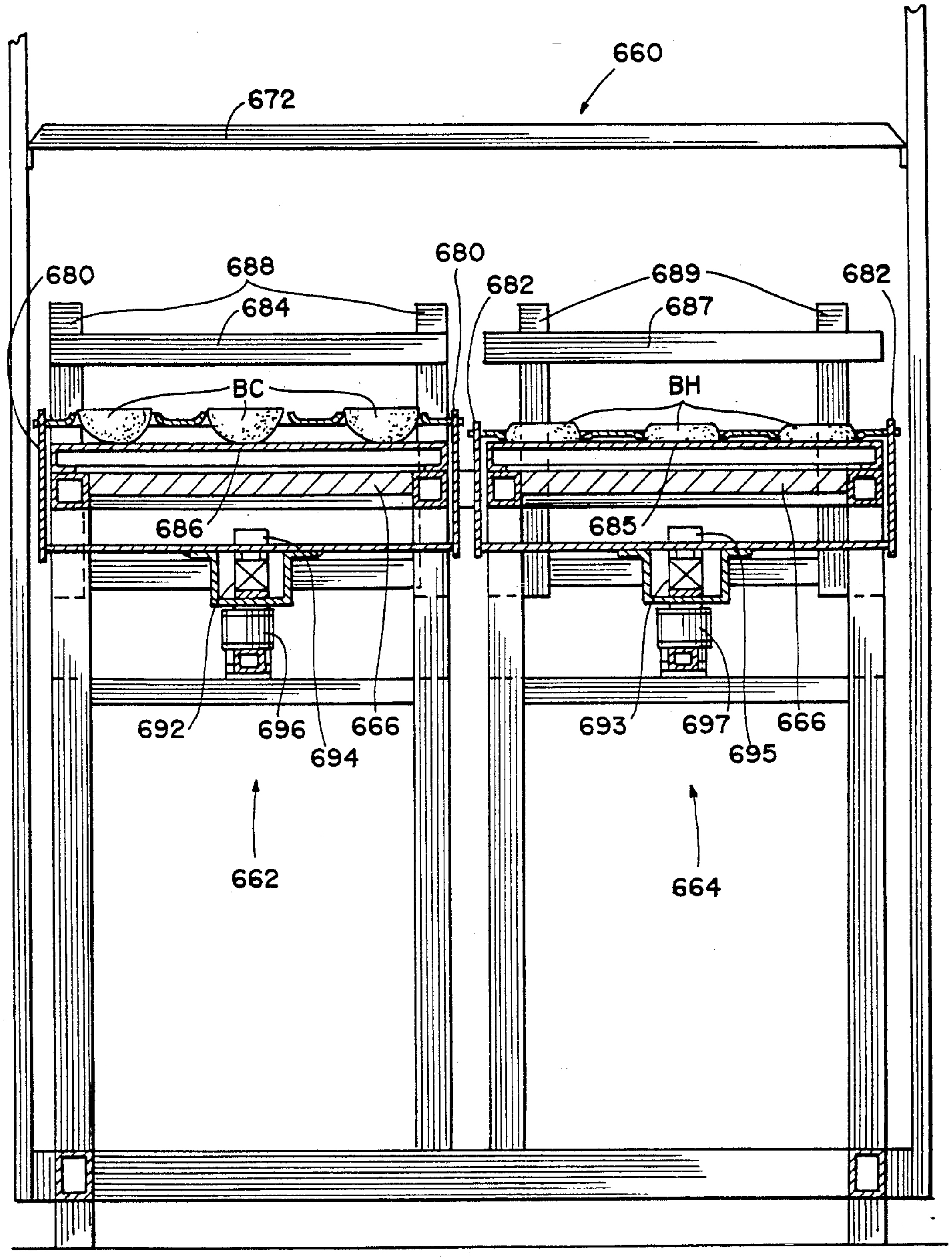
FIG. 72 is a front sectional elevation view of the toaster apparatus along lines 72—72 of FIG. 73.

Heel toaster 664 employs identical components to crown toaster 662. These parts are shown in FIG. 72 and include a heel toaster lower platen 686, a moveable upper platen 687, upper platen support arms 689, a support arm cylinder 691 (blocked from view), a rodless cylinder 693, cylinder tracks 695, and a hoop lift cylinder 697. The operation of heel toaster 664 is identical to crown toaster 662 except that the distance between closed platens 685 and 687 is changed to accommodate the lower height of bun heels BH.

Figure 73:
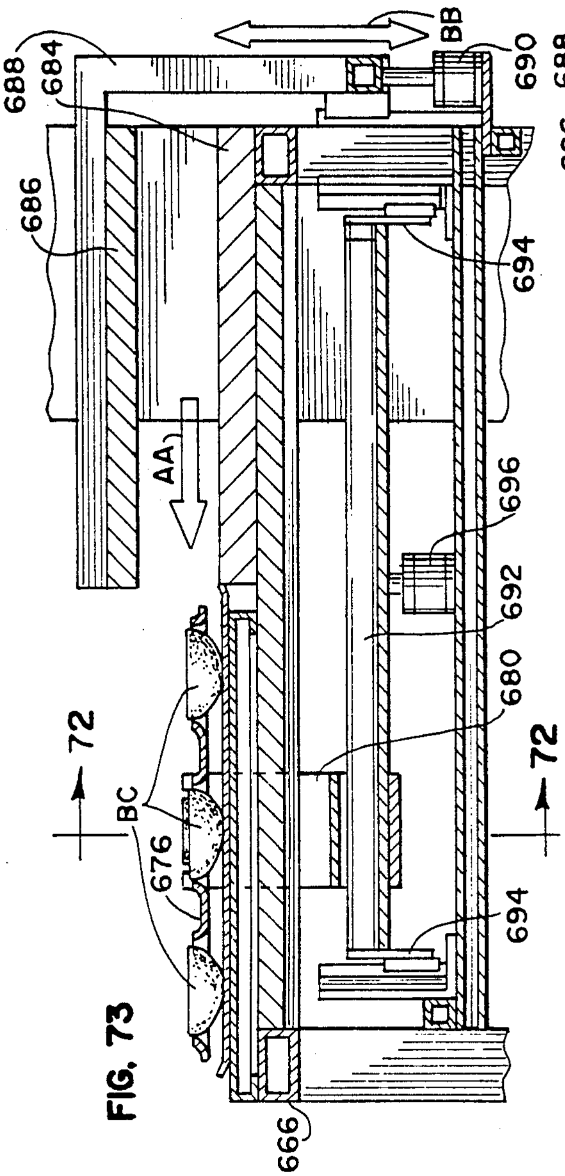
FIG. 73 is a side sectional view illustrating the removal of toasted buns from the toaster apparatus.
Figure 74:
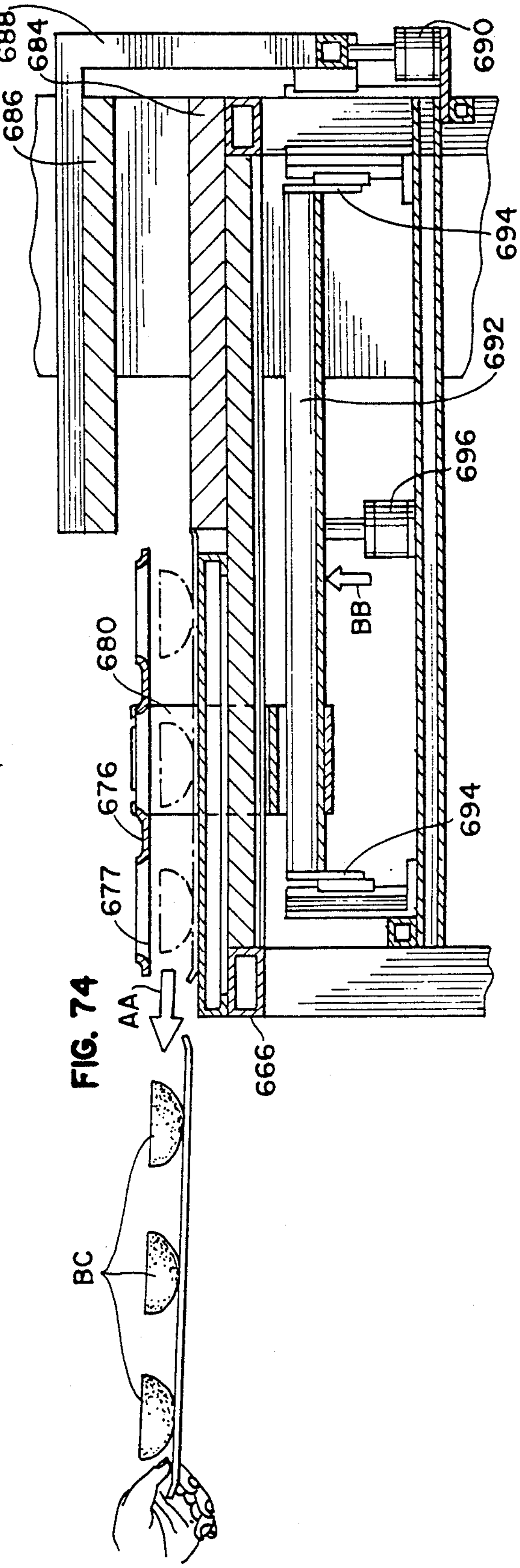
FIG. 74 is a side sectional view illustrating the removal of buns from the toaster platens.

The operation of toaster 660 is best discussed in conjunction with FIGS. 71, 73 and 74. Turning first to FIG. 71, operation begins when an operator presses a cycle start button (not shown) and inserts an empty bun tray 698 below crown hoop 676. The operator then loads bun crowns BC into the appropriate hoop apertures 677 indicated on a bun location matrix display (not shown) located near the bun toaster. The use of a matrix display is preferred because it indicates the appropriate apertures required for even heating when less than a full hoop of buns are to be toasted.

After bun loading, cylinder 692 is actuated to pull bun crowns BC rearward between platens 684 and 686. Next, upper platen support arm cylinder 690 is retracted to lower upper platen 686 for toasting. When toasting is complete, cylinder 690 is again actuated to raise upper platen 686, and cylinder 692 is actuated to push the toasted bun crowns BC back to crown loading station 668 on top of tray 698 as shown in FIG. 73. At this point, hoop lift cylinder 696 is actuated to raise hoop 676. Raising hoop 676 allows a restaurant worker to remove tray 698 with bun crowns BC in the proper horizontal planar array for further automated processing as shown in FIG. 74.

Computer Operating and Control Station

Computer operating and control station 123 can be configured to completely control the operation of fry cell 11 and/or grill cell 145. Both fry cell 11 operation and grill cell 145 can be controlled and operated in a manner similar to that described in U.S. patent application Ser. No. 07/176,568, filed Apr. 1, 1988.

The control of fry cell 111 is representative of the control methodology used in fry cell 111 and grill cell 145. Preferably, to control fry cell 111, station 123 includes a fry cell master control computer or main controller, one or more individual apparatus controllers, a number of operator input and output mechanisms and a variety of sensing systems which provide feedback as to the position or status of various fry cell components. An emergency stop button 123' is also provided (see FIG. 2).

The organization of system control hardware and software tasks and functions required to control fry cell 111 is shown hierarchically in FIG. 81. FIG. 81 includes both hardware elements and software functions, and is only intended to be representative of one embodiment of the control system. Information passes between control elements on FIG. 81 on the paths indicated by the interconnecting lines. It should be understood that the individual items identified in FIG. 81 can correspond to tasks accomplished by either hardware or software acting alone or in combination in any manner well-known in the art.

At the highest hierarchical level of FIG. 81, overall system control is facilitated by a main controller 751 which can be a computer or a dedicated system controller. Controller 751 monitors and directs the activities of other subordinate modules and controllers 753 through 764, and accepts information from or outputs information to the displays, controls and annunciators described in blocks 775–797.

At the next lower hierarchical level of FIG. 81, a task handler module 753, an operator interface 755 and a scheduler module 757 interact to determine the sequence of fry cell operations. Task handler 753 manages time-dependent fry cell processes by storing task entries corresponding to tasks to be performed in a task table. These tasks are then executed sequentially. The task table contains information such as task type, time until task activation and duration of the task. Such stored task entries are used to initiate a variety of fry cell tasks including robot movement and fry dispensing, as well as initiating various alarms and displays. Operator interface 755 controls all operator inputs and outputs to and from fry cell 111 while scheduler module 757 is used to schedule the dropping of baskets into and pulling of baskets from the fry vat, hereafter referred to as dropping or pulling. To accomplish this, scheduler 757 stores a task table similar to that of task handler 753 and schedules tasks to be performed in accordance with desired hourly sales rate of various fried products. If scheduler 757 determines that a basket must be dropped or pulled at a time which would conflict with the task already entered into the scheduler task table, scheduler 757 will adjust the new entry forward or back in time to eliminate the conflict.

The next hierarchical level shown in FIG. 81 includes a robot motion control module 759, a fry dispenser control module 761, a fry vat agitator control module 763 and a dump chute control module 765. Any or all of these control modules may employ individual micro-processor based-hardware or may share a common controller.

Robot motion controller 759 is responsible for controlling all robot movements involved in dropping or pulling fry baskets. The robot motions controlled include motion between fry vats, motion between the fry bagging station and the fry dispenser, motions raising or lowering the robot with respect to the fry vat, motions which swivel the basket to allow the basket to pass around the fry hood when travelling to the bulk dispenser, and motions for dumping product onto the fry dump chute.

In controlling robot motion, motion controller 759 accepts inputs from a variety of sensors which can provide information as to the current position of various robot components. These sensors include a pulse line encoder which senses the lateral robot position along a Z-axis parallel to the front of fry cell 111, a limit switch which is used as a zero reference point for the Z-axis pulse line-in coder, and a pair of upper and lower reed switches which are used to measure the upper and lower vertical limits of travel of the robot. Several sensors are also included for sensing the condition of the robot end of arm tool and include a pair of Hall effect sensors to sense the 135° right and left rotational position of the end of arm tool, a pair of Hall effect sensors to sense the 90° right and left rotational position of the end of arm tool and a linear Hall effect sensor module that senses when the end of arm tool is fully open, fully closed, and when a basket is gripped by the tool.

Dispenser control module 761 provides bi-directional communications to the fry dispenser. Controller 761 sends commands to the dispenser to perform continuous basket loading, to stop basket loading, to present a loaded basket, to prepare a basket for drop off, and to set the individual basket load to one of several predetermined weight limits. Additionally, dispenser controller 761 accepts signals from a variety of fry dispenser sensors which indicate the presence of fry baskets at certain locations within the dispenser, as well as the status of various fry dispenser components and functions.

Agitator controller 763 is used to control the operation of the vat agitator mechanism.

Dump chute controller 765 is used to control the operation of the fry dump chute. Controller 765 moves the fry dump chute between its normal vertical position and a horizontal position across the first fry vat for presentation of the finished product from the robot.

The next lower hierarchical level shown in FIG. 81 includes various operator inputs to and outputs from the control system. The first input device at this level is an emergency stop module 767. Emergency stop module 767 is activated by an operator pressing one of two emergency stop buttons. When module 767 is activated, main controller 751 prevents all dispenser and robot movement.

This level also includes a display control module 769, a touch control module 771 and an audible alarm module 773. Display control module 769 determines which of several displays will be made available to the operator on his display screen, while touch control 771 accepts inputs from the touch panel display grid to assure that touch panel command signals sent back to main controller 751 correspond to those currently displayed by controller 769. Finally, audible alarm module 773 provides an audible indication to the operator when quality checks need to be performed or when an emergency stop condition has been initiated.

The remaining two hierarchical levels on FIG. 81 illustrate the various displays that can be generated by display controller 769. These displays include a shut down display 775, a restart and recovery display 777, a start up display 779, a main display 781, a basket enable and disable display 783, and a product mix and price control display 785.

Shut down display 775 allows an operator to proceed through a controlled shut down of the system. This display informs the operator of any cooking in progress and the time remaining before cooking operations are finished and the system is clear to shut down. Main controller 751 discontinues all scheduling when this display is active.

Restart and recovery display 777 is active whenever main controller 751 is available for restart after an unscheduled disruption of operation. When this display is active, the operator is prompted to remove overcooked product and continue operation.

Start up display 779 communicates various diagnostic results and equipment start-up information to the operator.

Main display 781 allows the operator to control production of food items by fry cell 11. The items which can be adjusted during routine operation are made available to the operator through additional displays 787 through 797. These displays include a rate adjust display 787 which allows the operator to increase or decrease the hourly cooking rate, a basket priority display 789 which allows the operator to acquire an additional basket or product in lieu of increasing the overall production rate and a basket delete display 791 which allows the operator to cancel the next scheduled basket of product to be cooked. Also included are vat status display 793 which indicates whether each basket is cooking disable or idle, a production status display 795 which indicates the time until the next two baskets of product will be dropped into the vat and when the next two baskets will be pulled from the vat, and a quality check display 797 which indicates to the operator that food product quality should be checked if a basket of product has not been pulled within the last seven minutes.

Returning to the second lowest hierarchical level, basket enable and disable display 783 allows the operator to disable or enable the use of any basket in the system, and product mix and price control display 785 allows the operator to set current price, product mix and size levels for products produced by fry cell 111.

Hardware used to accomplish the above tasks can be any suitable equipment known in the art. In one embodiment, main controller 751, display control module 769 and touch control module 771 can be constructed as shown schematically in FIG. 76, and can include the following major components: an Intel 80C188 microprocessor, an Epson E1330 graphics display control, a touch panel LCD/FL user interface, a Zilog 8530 serial communications controller and system memory.

The Intel 80C188 is a highly integrated pseudo-IBM TM XT compatible processor especially suited for embedded control applications. The Intel 80C188 has the advantage of being able to execute software developed and debugged with industry standard PC development tools (e.g. Quick 'C,' MSC 5.0, MASM 5.0, for example).

The Epson graphics E1330 touch panel LCD/FL is a 320×200 pixel LCD display and (5×13) touch panel with built-in Fluorescent (FL) back light. The LCD display is controlled by the E1330 graphics controller which provides flexible high level functions (such as scrolling partial or full pages, automatic cursor shift and programmable cursor format). A touchpad interface is provided that consists of simple X-Y digital scanning circuit. The E1330 provides a generic LCD interface capable of controlling numerous different LCDs with a resolution of up to 320×200 dots. The touchpad scanning circuit scans up to 8 by 8 key matrix. The larger scan matrix allows for the substitution of a different LCD panel, if necessary.

The Zilog 8530 serial communication controller (SCC) provides two independent serial channels. Channel A of the SCC is used for input/output communication with the machine control modules of fry cell 111 and channel B is used for implementing a network interface as illustrated in FIG. 76.

Figure 76:
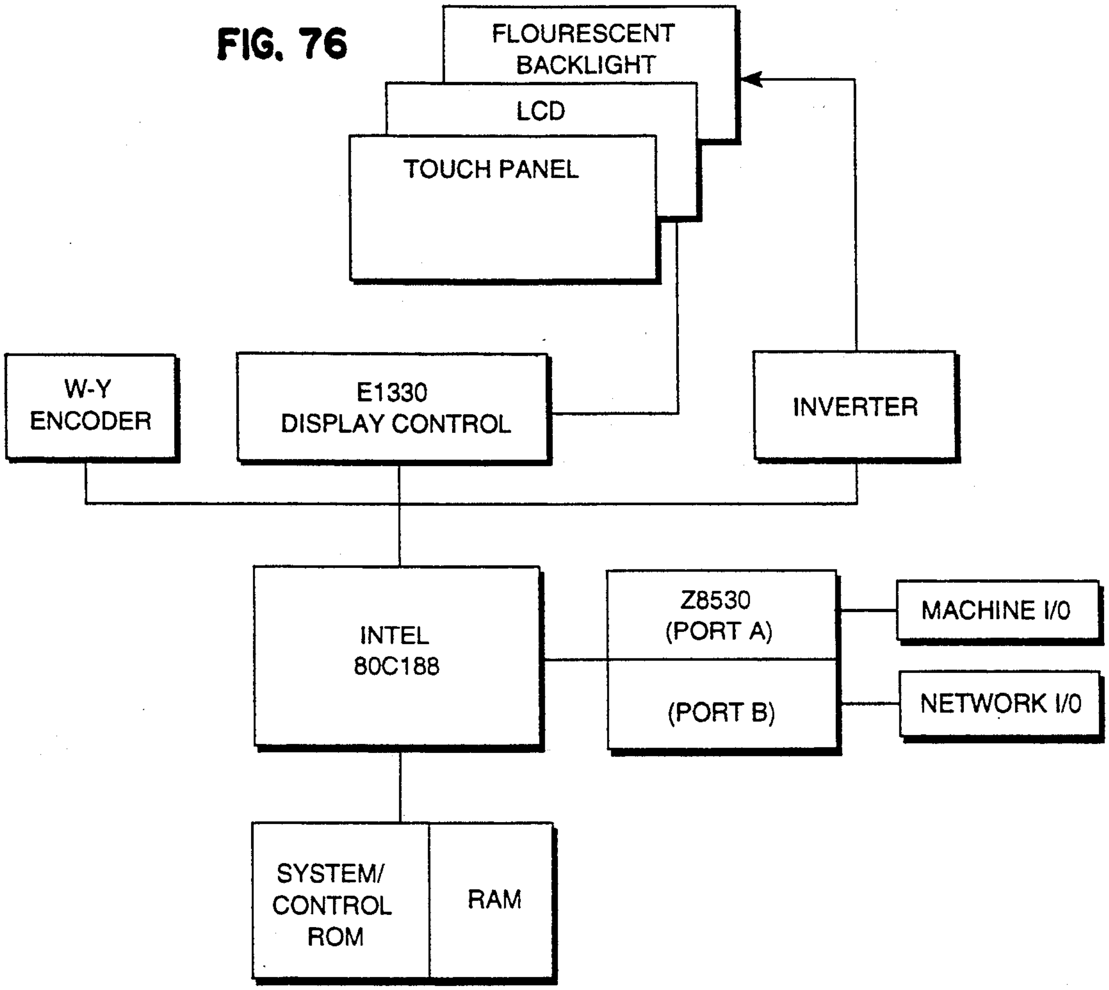
FIG. 76 is a schematic illustration of a main controller useful in accordance with the present invention.

The system memory provides up to 64K of ROM space (using 2 27100 EPROMS) and up to 32K of static RAM and communicates with the Intel 80C188 as shown in FIG. 76. The ROM is used for storing system level software (such as boot code, diagnostics, BIOS functions, DOS console I/O functions, etc.) as well as the high level algorithms that control the fry cell.

The machine specific control modules 759–765 are connected to main controller 751 using an industry standard RS-485 multidrop serial communications network. Each machine specific control module can contain an Intel 8031 microprocessor that performs the low level machine dependent functions. This isolates main controller 751 from the machine dependent hardware and facilitates future modifications and/or expansion.

Figure 77:
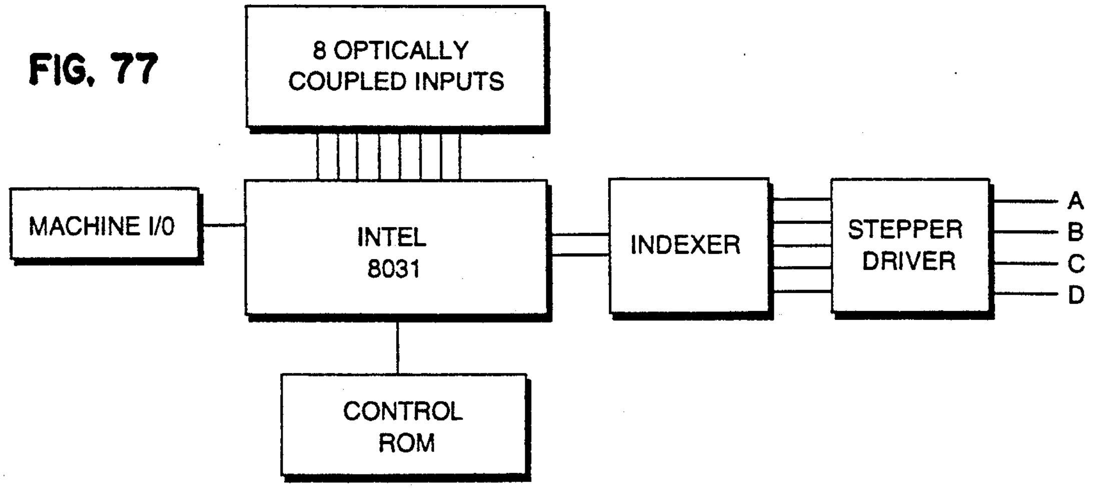
FIG. 77 is a schematic illustration of a stepper motor control for the fry cell in accordance with the present invention.

Robot motion control module 759 can include a stepper motor controller as illustrated schematically in FIG. 77. The stepper motor controller is responsible for all tasks related to robot motor 153 movement including maintaining positional information and the computing of the required trajectory for acceleration and deceleration of the motor. The major stepper motor controller components as illustrated in FIG. 77 include an Intel 8031 microprocessor, a stepper motor indexer and a stepper motor driver.

The Intel 8031 is a microcontroller specifically designed for embedded control applications. This microcontroller contains an asynchronous port that is used to communicate with main controller 751, and an 8K (2764) EPROM for storing the control software and diagnostics. The eight optically coupled inputs shown in FIG. 77 are used to receive positional feedback from a number of optical sensors located on the robot arm track. Four optical interrupters on this horizontal track provides a 2-bit binary output that indicates open area, left end of track, right end of track and center.

As shown in FIG. 77, two output ports are used to indicate step and direction to the stepper motor indexer. The stepper motor indexer is a pulse width modulating switch mode state machine capable of generating full step and half step sequences for the stepper motor driver. The stepper motor driver supplies power to drive the stepper motor in a current modulated mode.

Figure 78:
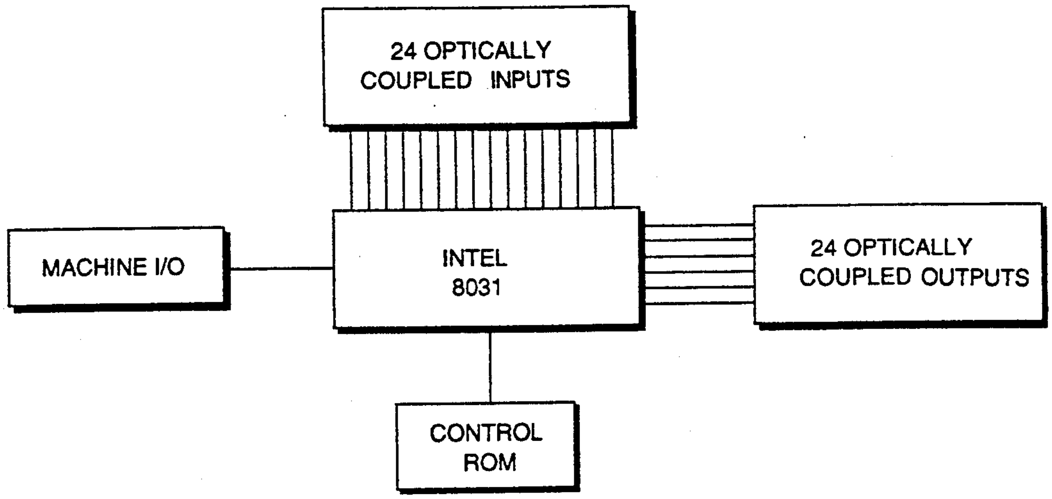
FIG. 78 is a schematic illustration of a robot arm controller for the fry cell in accordance with the present invention.
Figure 8I:
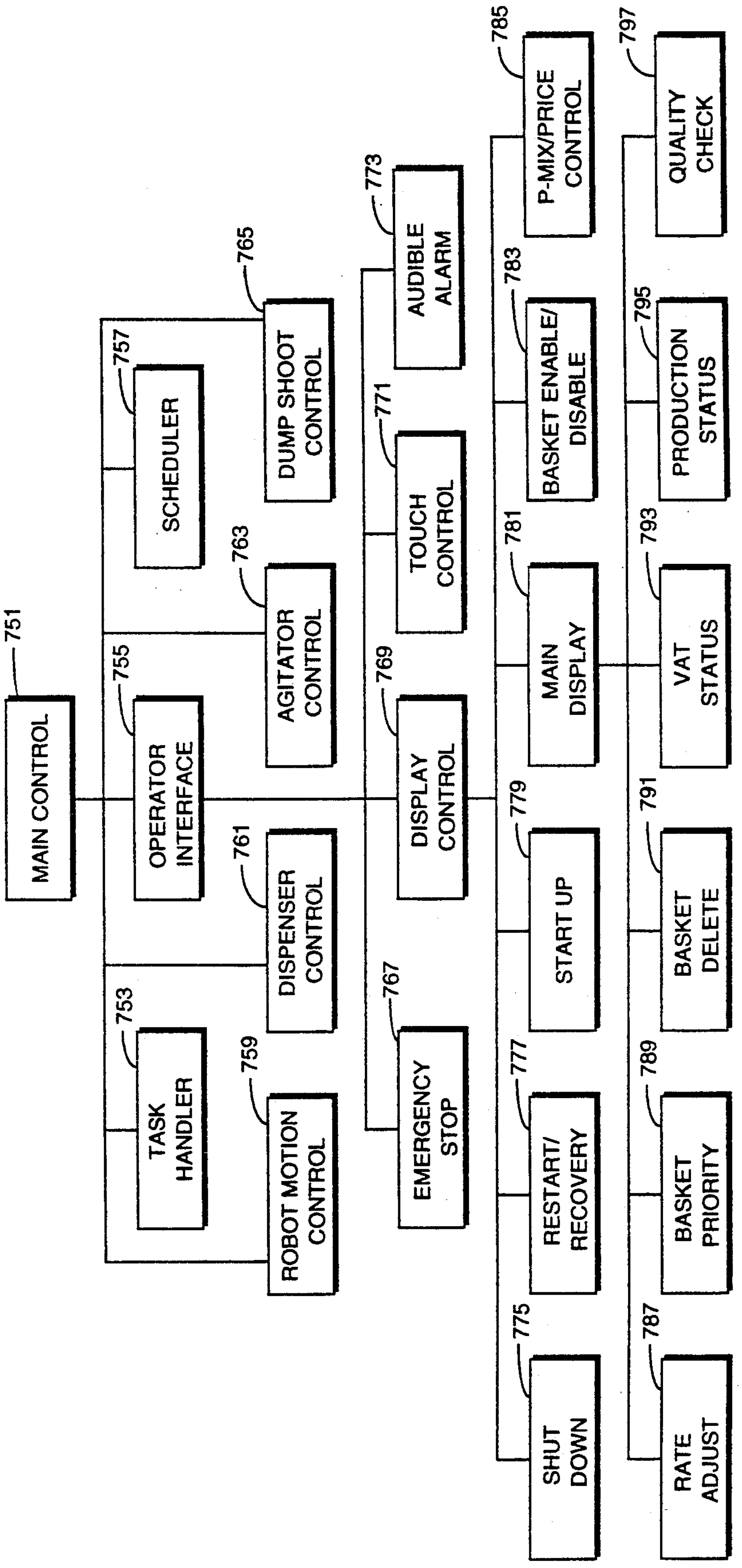

Robot motion controller 759 can also include a robot arm controller as illustrated schematically in FIG. 78. The arm controller controls vertically-disposed cylinder 181 and air cylinders 191, 205 and 215 which operate the gripper. The controller is similar to the stepper motor controller of FIG. 77, with additional (24 optically coupled inputs and 24 optically coupled outputs as shown in FIG. 78) input/output ports, and no stepper motor control hardware. This controller includes an Intel 8031 and a control ROM and handles machine and optically-coupled input/output as shown in FIG. 78.

Dispenser controller 761 is responsible for controlling the loading of a specified quantity of french fries into the frier basket. Hardware for this controller can be the same as the horizontal axis stepper motor controller discussed in conjunction with FIG. 77.

Rate adjust display 787 can accept manual rate adjustment instructions or can accept data from point of sale (POS) cash registers which transmit customer order data to the main controller. In the latter case, the data is stored and compared to the food production in progress and to the daily plan stored in the computer. In accordance with one embodiment of software for controlling and operating fry cell 111, software and data is provided for the main controller that relates product demand for all products produced by fry cell 111 on the basis of sales rate which can be in terms of dollars per our or some other convenient units. The amount of each product is determined by the percent of sales each product contributes to the total dollar per hour sales rate at which fry cell 111 is operating. This data can be historical data and can be compiled for the particular store in which fry cell 111 operates. The historical data can be broken down in several ways, such as, for example, on a day-to-day basis, on a weekday/weekend basis or on some other basis. Preferably, the data also include the sales rate on an hourly basis for the period during which the store is open.

Figure 80:
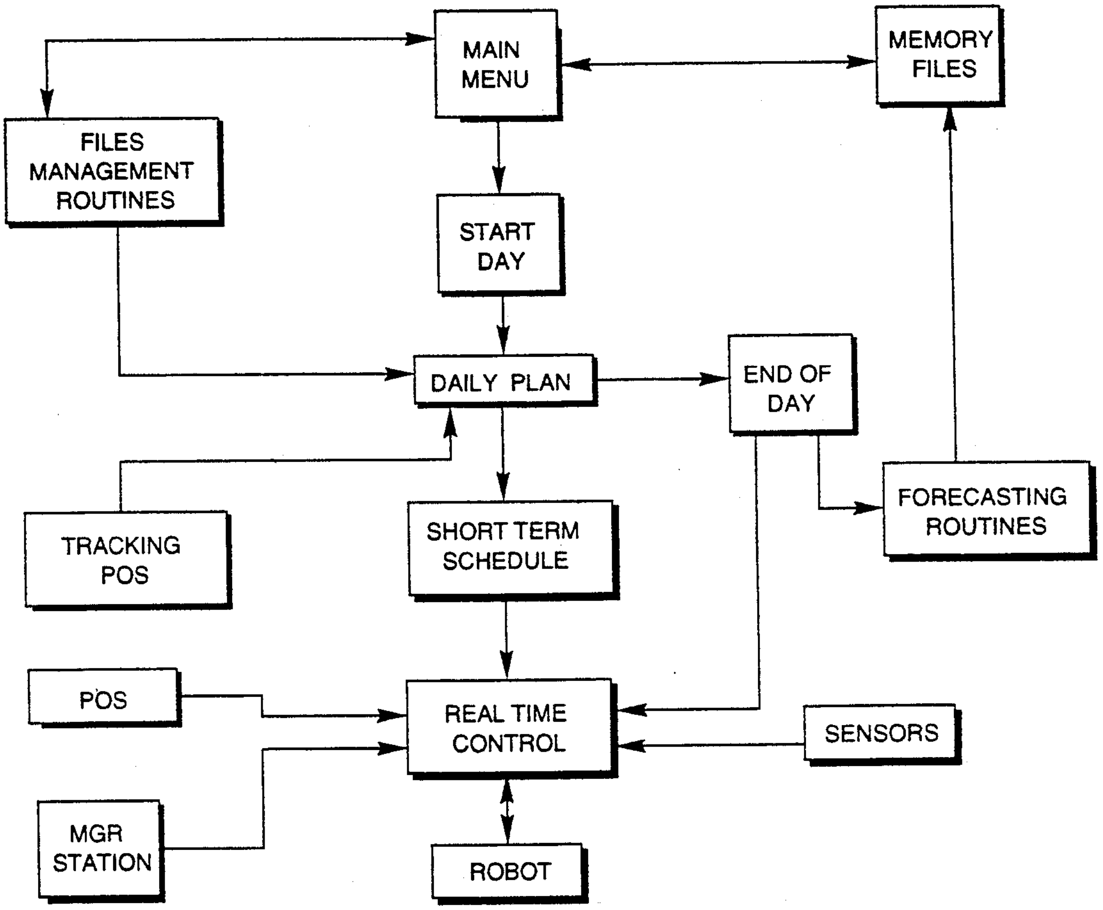
FIG. 80 is a block diagram illustrating one embodiment of the software flow for the fry cell computer control system.

One embodiment of the invention can include software flow and architecture as described in FIG. 80 for operating fry cell 111. Referring to FIG. 80, the "Main Menu" is a display of a list of choices for the store manager to run and may include: (1) start fry cell 111; (2) review, modify, or correct the parameters for fry cell 111; make changes in basic data used in projecting the daily plan such as the product prices and product mixes; (3) entry of any detail that makes today a special day, such as community events that may impact the demand placed on the store.

"Start Day" initiates the scheduling of the daily plan and any start up routines required of the robot. The short-term schedule is also developed and the collecting of data from the POS Point of Sales registers for comparing to the short-term and daily plans is initiated, and at the end of the day turns control over to the "End of Day" routine which shuts down fry cell 111.

"Memory Files" are a set of the next several or more (for example, seven) days files that are modified by the "Forecasting Routine" at the end of each day. These files are available for review and modification by the manager of the store.

The "Forecasting Routine" reviews the data of the past several or more days and what has happened this day and adjusts the future day file based on week-to-week information, for example, and any trend that is taking place due to product promotions and special advertising or changing demand of customers due to seasonal impact to their lives. At the start of a promotion the manager can initiate the start of a promotion by modifying the product mix of that product being promoted.

"POS" or "Point of Sale" is an electronic register used in taking orders and collecting information regarding sales and product mix. It also provides information on a real time basis for comparing to the daily and short-term plan. "Tracking POS" is stored POS data.

The "Short-Term Schedule" is a schedule or plan which is the detailed timing plan of commands to the robot, telling it what is to be done and when to do it. This scheduling is done automatically and prevents any double or conflicting requirements of the robot. This plan can be interrupted and modified on the fly and determines demand.

The "Sensors" monitor various parameters as previously described.

The "Real Time Control" tracks POS, gives commands to the robot cell controllers, tracks the sensors, obtains feedback from the cell controllers, responds to directions from the operator via a terminal and follows the short-terms schedule.

In operation of fry cell 111, the data contained by the computer together with the fry cell software operates to produce food at a rate that is based on he projected rate for that time of day from the historical data contained in the computer. A plan of operation for the overall day is projected from the store opening to closing based on the historical sales data. This data is utilized by the system to generate a more detailed plan covering a shorter period of time, which may be an hour or less, such as a fifteen-minute period to produce at the anticipated sales rate. The sales rate is set automatically on the basis of the daily plan for that day and can be increased or decreased by a human operator, for the entire day or for just a certain period, such as the lunch hour. A typical daily plan sales rate on an hourly basis is set forth in Table II.

TABLE II

| Typical Hourly Daily Plan Sales Rate | |
|---|---|
| Time Period | Sales Rate ($ product/hr) |
| 10:00–11:00 a.m. | 350 |
| 11:00–12:00 Noon | 650 |
| 12:00–1:00 p.m. | 1100 |
| 1:00–2:00 p.m. | 750 |
| 2:00–3:00 p.m. | 500 |
| 3:00–4:00 p.m. | 575 |
| 4:00–5:00 p.m. | 750 |
| 5:00–6:00 p.m. | 900 |
| 6:00–7:00 p.m. | 800 |
| 7:00–8:00 p.m. | 700 |
| 8:00–9:00 p.m. | 600 |
| 9:00–10:00 p.m. | 500 |

A hypothetical product mix for the products which may be cooked by fry cell 111 on a percentage basis of dollar sales is set forth in Table III.

TABLE III

| HYPOTHETICAL PRODUCT MIX | |
|---|---|
| Product | % Mix of Total Fry Cell Sales |
| French Fries | 40% |
| Chicken Nuggets | 30% |
| Fish Filets | 15% |
| Chicken Patties | 15% |
| Total | 100% |

The amount of each of the products needed per hour or other period is determined by a computer system control, if utilized, for example, multiplying the sales rate by the product percent and dividing by the cost per unit. From this information, the system can formulate a short-term plan. The short-term plan, for example, would require that a certain number of batches of product be made to meat the forecasted sale rate. The system would also schedule the various fry cell operations, including the required robot operating times to make the required batches of product.

The hourly sales rate can be and is preferably further divided into a number of periods to more accurately follow actual sales rates. For example, the period from 10:00 a.m. to 1:00 p.m. is divided into 15-minute period based on historical store data as shown in Table IV.

TABLE IV

Typical Quarter Hour Short-Term Plan

| Time Period | Sales Rate ($ product/hr) |
|---|---|
| 10:00–10:15 a.m. | 50 |
| 10:15–10:30 a.m. | 75 |
| 10:30–10:45 a.m. | 100 |
| 10:45–11:00 a.m. | 125 |
| 11:00–11:15 a.m. | 125 |
| 11:15–11:30 a.m. | 150 |
| 11:30–11:45 a.m. | 175 |
| 11:45–12:00 Noon | 200 |
| 12:00–12:15 p.m. | 250 |
| 12:15–12:30 p.m. | 300 |
| 12:30–12:45 p.m. | 300 |
| 12:45–1:00 p.m. | 250 |

On a real time basis, information from POS cash registers, when it differs sufficiently from the short-term plan, either in terms of product mix or rate, can cause an interrupt in the short-term plan in order to change the product priority of fry cell 111 to meet the demand. Typically, a sufficient difference will be a certain percentage variance from the current operating schedule, such as a 20% difference over a period of 15 minutes, for example. The interrupt may also be accomplished by a human operator via operator interface 755. The interrupt is done in such a manner that all activity started by fry cell 111 remains scheduled for completion and the schedule for the priority item is worked into the short-term plan as soon as possible. After an interrupt occurs, the system can be configured to automatically revert to production at a rate and product mix in accordance with the daily plan.

Figure 79:
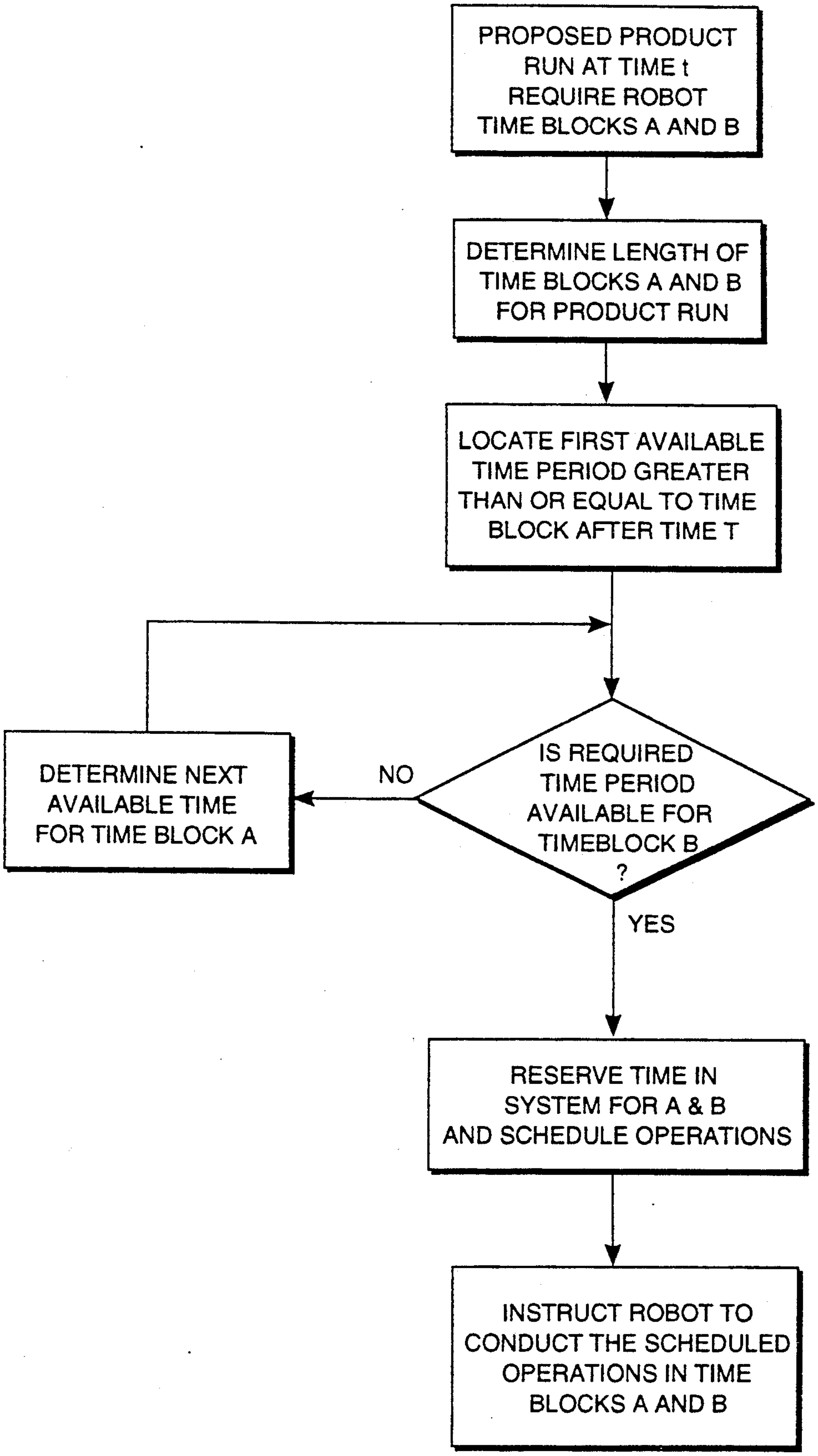
FIG. 79 is a flowchart illustrating how the control system schedules robot time.

The control system of fry cell 111 schedules robot time by determining whether the required time block or blocks are available or reserved, and thus unavailable, as illustrated in FIG. 79. If a particular time period is unavailable, the next available time is located and reserved.

The time blocks required for cooking a food batch in fry 111 consist of a time block A and a time block B. Time block A or DROP time includes the time required for robot 113 to obtain an empty fry basket (fry baskets are assigned to a particular position in fry vats 137 and empty fry vats in fry cell 111 not in use remain in that fry vat position), dispense food into that basket at dispensing station 115 and deliver and deposit the fry basket with food in cooking position at fry vet 137. Time block B is separated in time from time block A by the cooking time for the batch of food initiated in time block A. Time block B or PULL time includes the time required for robot 113 to PULL the fry basket from vat 137 to dump station 119, the time required to dump the basket and the time required to pick the empty basket and return it to its vat position.

Figure 75A:
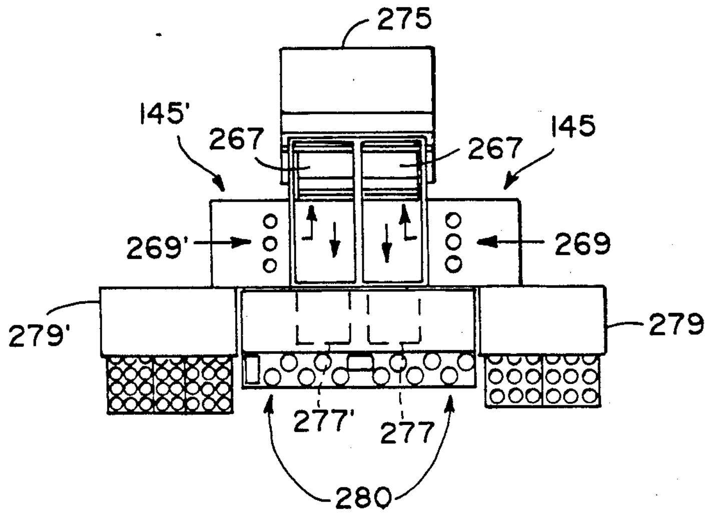
FIG. 75 is a schematic plan view illustrating a grill cell and fry cell in accordance with the invention.
Figure 75B:
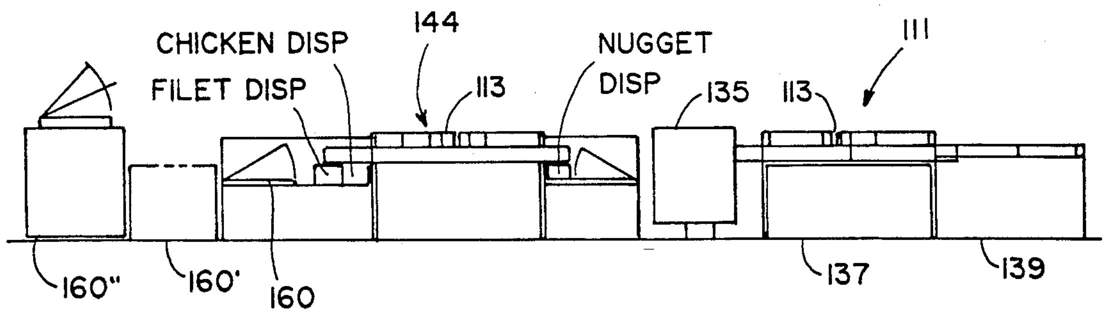

FIG. 75 is a schematic illustration of a floor plan at one location for fry cell 111, grill cell 145, fry cell 144 and a grill cell 145′, which is a slightly different embodiment from grill cell 145. Fry cell 111 handles french fries and includes robot 113, box dispenser 135, fry vats 137 and french fry bagging station 139. Fry cell 145 handles chicken nuggets, chicken patties and fish filets and includes another robot 113 nugget dispenser 247, chicken patty dispenser 241, fish filet dispenser 245, fry vats 137 and cooked food storage stations 252 and 254, as described with respect to FIGS. 24 and 25. Various cabinets 160, 160′ and 160″ for holding supplies are also shown.

Grill cell 145 of FIG. 75 includes robot 267, food dispensing station 269, cooking station 275 which is shared with grill cell 145′, cooked food deposit station 277, bun toaster station 279 and work area 280. Grill cell 145′ includes similar components designated by similar reference numerals except that food dispensing station 269′ dispenses smaller hamburger patties than station 269 and bun toaster station 279′ is configured for smaller buns than bun toaster 279.

The control of grill cell 145 can be accomplished in much the same manner as fry cell 111. A logical flow chart of a software control program suitable for controlling grill call 145 is shown in FIGS. 85 through 88. To better understand the following explanation of FIGS. 85 through 88, reference will first be made to several positions and control axes which are best explained in conjunction with FIGS. 82, 83 and 84.

Figure 82:
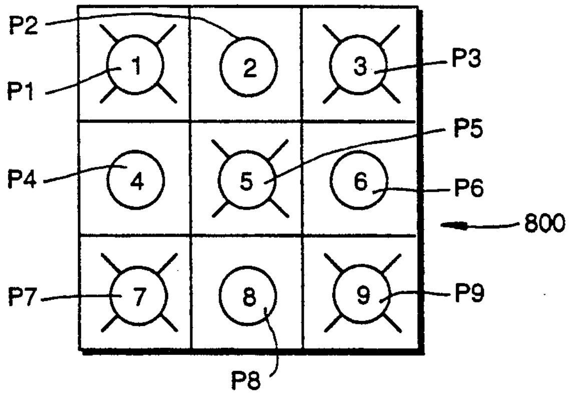
FIG. 82 is a plan view of a matrix switch useful in accordance with the grill cell of the invention.

Turning first to FIG. 82, a horizontal planar array comprising a three-by-three row and column matrix switch 800 is illustrated which includes positions P1 through P9. This matrix corresponds to the horizontal planar array 499 found in cooked patty hoop 493 and uncooked patty hoop 517. When an operator begins the grill cell cycle, he selects the desired number of patties on a display having numbered illuminatable buttons arranged in the positions illustrated in FIG. 82. This causes the optimal bun locations for that number of patties to be illuminated on the display panel in a pattern corresponding to the optimal bun placement in the bun toaster hoops. For example, if the desired number of patties is five, the operator pushes button P5. The display then illuminates the P1, P3, P5, P7, and P9 buttons which indicate the proper bun toaster hoop locations for the corresponding five bun toasting operation.

Figure 83:
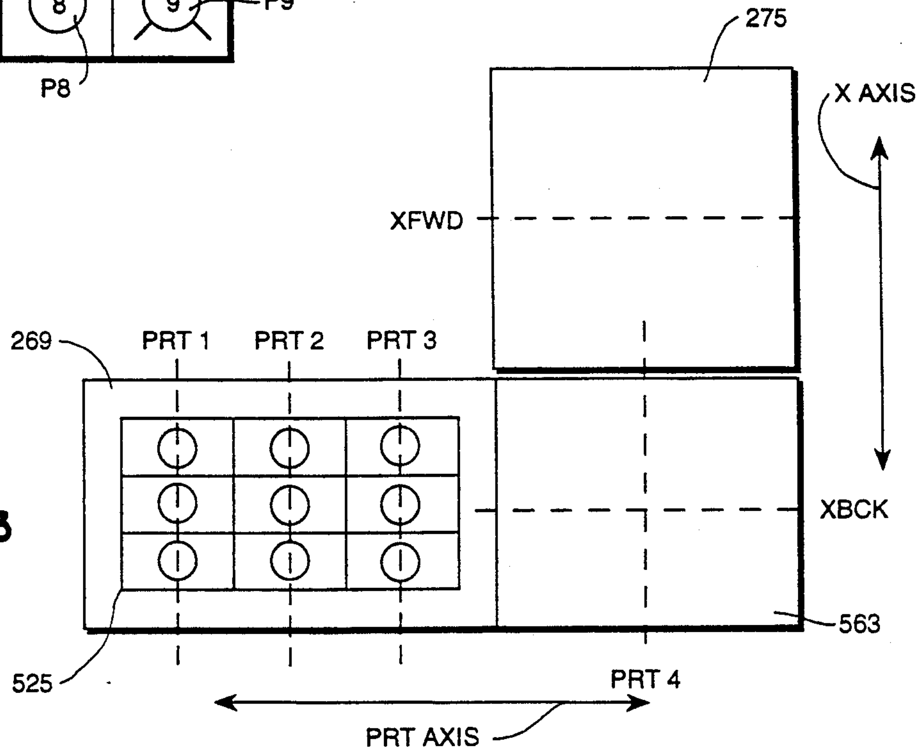
FIG. 83 is a schematic plan view illustrating various horizontal positions to which certain components of the grill cell move.
Figure 84:
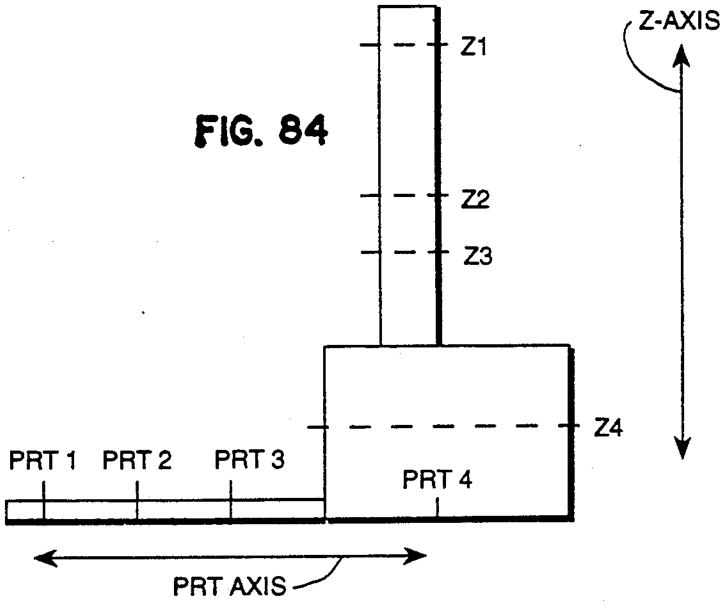
FIG. 84 is a schematic elevation view illustrating various vertical positions to which certain components of the grill cell move.
Figure 85:
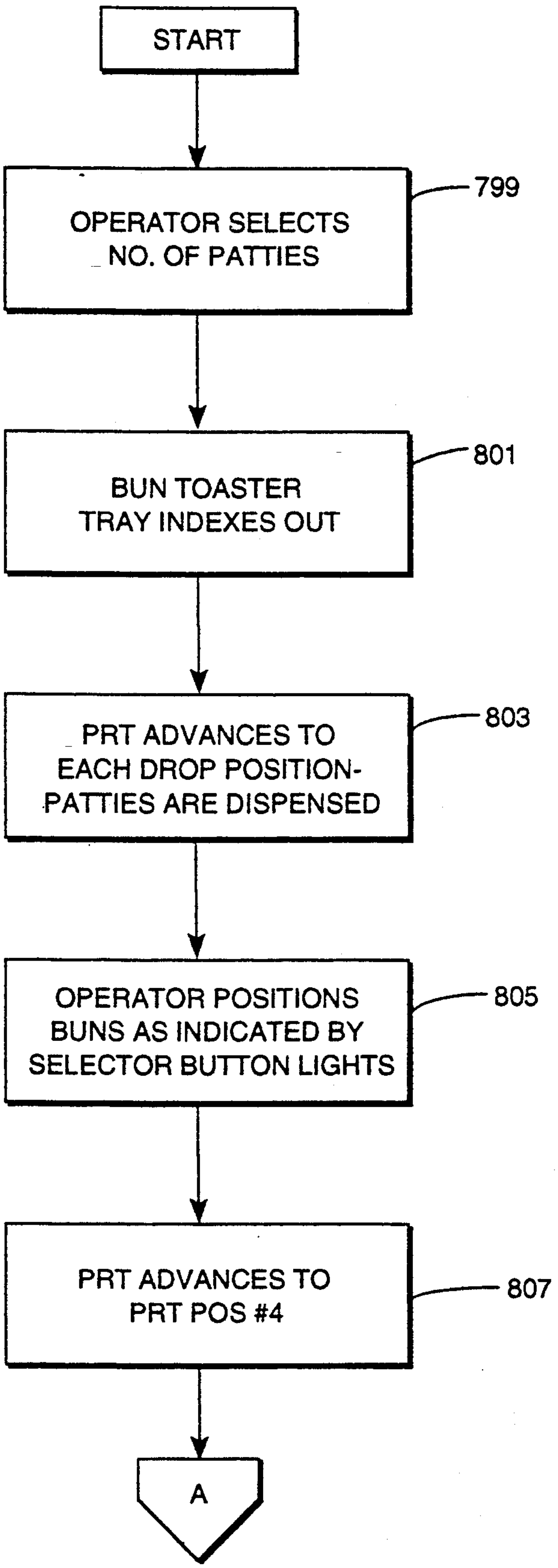
FIGS. 85-88 are flowcharts illustrating the grill cell operation cycle.
Figure 86:
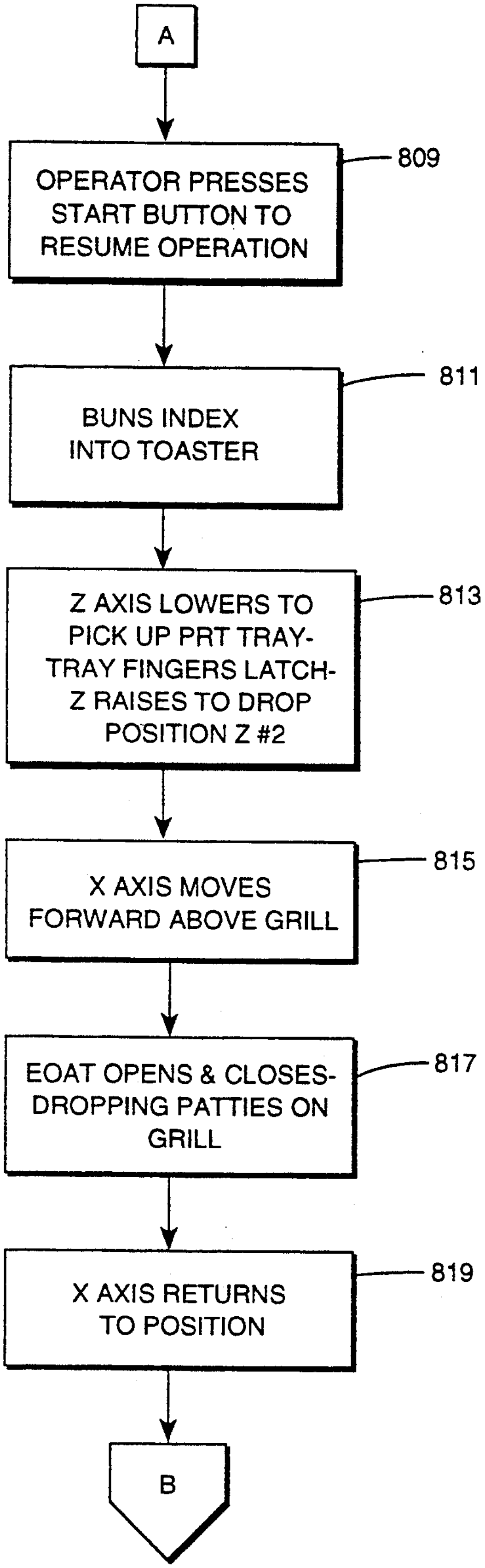
Figure 87:
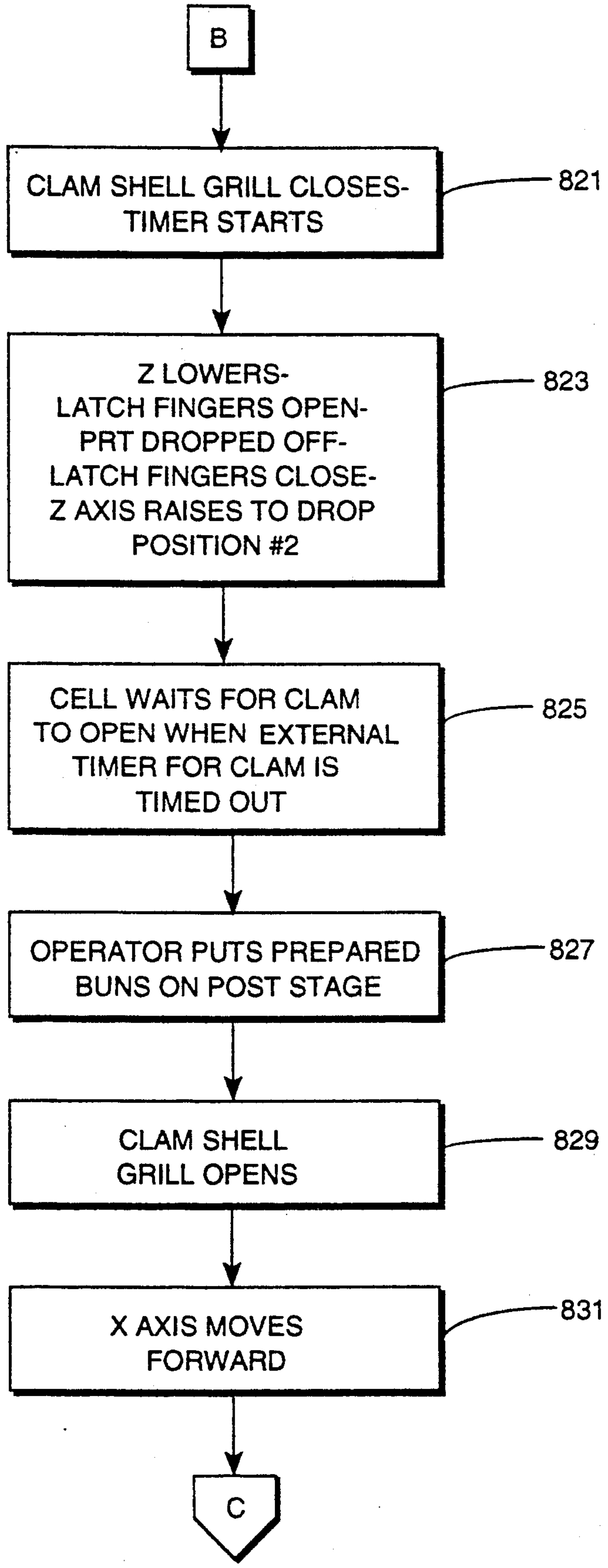
Figure 88:
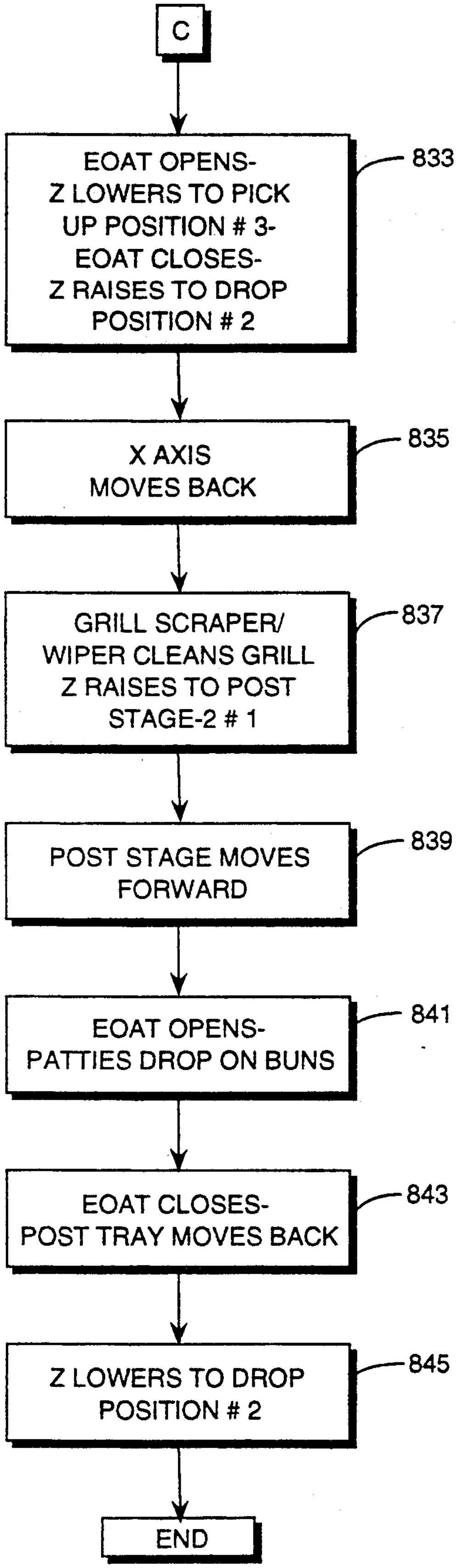

FIGS. 83 and 84 illustrate positions on X, PRT, and Z axes that define locations to which the grill cell main controller will move various grill cell components during the grill cell operating cycle. The simplified plan view of FIG. 83 shows the relative locations of patty dispensing station 269, grill 275 and grill cell rack 563. As can be seen from FIG. 83, patty shuttle 525 can be indexed between four PRT axis positions labelled PRT 1, 2, 3 and 4. These positions correspond to the positions required to load the first row of uncooked patty hoop apertures, the second row of uncooked patty hoop apertures, the third row of uncooked patty hoop apertures from patty hoppers 565, as well as the PRT4 position of uncooked patty sub-assembly 281 when sub-assembly 281 is directly beneath fixture 273 in the home position H. Also shown are two positions along an X axis labelled XFWD and XBCK which correspond to the location of fixture 273 over grill 275 and the location of fixture 273 when it is in rack 563. Finally, turning to FIG. 84, a Z axis is shown which defines the elevation fixture 273. Position Z1 corresponds to the uppermost fixture position used for dropping cooked patties HP onto prepared buns, position Z2 corresponds to the correct height for dropping patties from the fixture onto the grill, position 23 is the proper height for picking up patties from the grill, and position Z4 is the correct height for coupling and uncoupling uncooked patty subassembly 281.

Turning now to FIGS 85–88, the grill cell cycle begins when the operator selects the appropriate number of patties to be grilled by pressing the appropriate number on a display like that shown in FIG. 82. At this point, the control program verifies that fixture 273 is in the proper start-up position at location Z2 and XBCK, that shuttle 525 is properly positioned at PRT1, and that bun tray 698 is not inserted into rack 563.

The control program next executes step 801 where bun toaster hoops 676 and 678 are indexed out of toaster 660 for bun placement and transfers control to step 803 in which uncooked patties are added to uncooked subassembly 281 by advancing shuttle 525 sequentially from positions PR1 to PR3. During this process, the operator is adding buns to toaster hoops 676 and 678 at the positions indicated on the display (at step 805) and shuttle 525 advances sub-assembly 281 to position PRT4 beneath robot arm 267 (at step 807). The operator then presses a start button to resume operation at step 809 and buns are drawn into toaster 660 at step 811.

At step 813, the grill cell controller moves robot arm 267 down from position Z2 to position Z4 to engage uncooked patty subassembly 281 onto fixture 273 and then moves arm 267 back to position Z2 in preparation for dropping patties on grill 275. At step 815, the controller moves arm 267 from position XBCK to position XFWD (over grill 275) and in step 817 extends and retracts fixture frame 491 to deposit patties on grill 275. The controller then moves arm 267 to return fixture 525 to position XBCK at step 819. At step 821, the controller closes clam shell grill 275 and starts a cooking timer. While the patties are cooking, the controller returns the empty uncooked patty sub-assembly 281 to shuttle 525 at step 823 by moving arm 267 from position Z2 to Z4. At this point the controller engages spring finger lever cylinders 545 to disengage the uncooked patty subassembly and moves arm 267 to return fixture 273 to position Z2.

Next, at step 825, the controller waits for the clamshell grill timer to time out while the operator sets bun tray 698 into rack 563 and inserts prepared buns onto rack 563 at step 827. Once the grill timer times out and grill 275 opens at step 829, the control proceeds to step 831 and arm 267 is moved to the XFWD position. At sept 833, the controller extends fixture frame 491, fixture 273 is lowered from position Z3 to position Z2, and frame 491 is retracted to retain the cooked patties within cooked sub-assembly 283. The controller then raises arm 267 to move fixture 273 to position Z2 and at step 835 returns fixture 273 to position XBCK.

Grill scraping and cleaning is then initiated at step 837 at which the controller raises scraper 610, traverses scraper 610 across grill 275, and returns scraper 610 to its original position.

At step 839, prepared bun tray 698 pushed forward into rack 63 by the operator. This wipes the bottom of fixture 273, and places the buns beneath fixture 273 in preparation for patty drop at step 841. After the controller extends frame 491 to deposit the cooked patties on the buns at step 843, the controller retracts frame 491 which pushes bun tray 698 back from underneath the fixture, and a step 845, moves arm 267 to position fixture 273 at position Z2. At this point, one grill cell operation mile has been completed.

While the invention has been described herein with respect to certain preferred embodiments, it is to be understood that the invention is capable of numerous changes, modifications and rearrangements without departing from the invention as defined in the claims.

We claim:

1. A robotized fry cell for processing at least one type of bulk food comprising:

(a) a dispensing station comprising a food dispenser for each type of bulk food, each dispenser capable of dispensing an amount of food into a container;

(b) a cooking station comprising at least one fry vat for frying food contained in the container;

(c) a robot capable of working in an area that determines a work area said robot capable of horizontal linear movement in said work area;

(d) an end of arm robot tool for said robot, said robot capable of, in conjunction with said end of arm tool, selectively engaging, disengaging and moving, in said work area to said stations while engaged, said container for holding a quantity of food from said dispensing station;

(e) said dispensing station and said cooking station being located with respect to said work area so that said robot can place said container means in a food receiving position with respect to any of said plurality of food dispensers, and in a cooking position with respect to said fry vat; and (f) a cooked food receiving station.

2. The fry cell of claim 1 further comprising basket rocking means associated with said fry vat for selectively rocking the container during cooking in said fry vat.

3. The fry cell of claim 1 further comprising stir means associated with said fry vat for stirring the food in the container during cooking in said fry vat.

4. The fry cell of claim 1 wherein said dispensing station comprises a separate food dispenser for chicken nuggets, fish filets and chicken patties.

5. The fry cell of claim 4 further comprising dump means for dumping cooked food from-said container into said cooked food receiving station.

6. The fry cell of claim 5 wherein said dump means comprises at least one pivotable platform capable of pivoting from a horizontal position for loading cooked food thereon to a relatively upright position for dumping food thereon into said cooked food receiving station.

7. The fry cell of claim 6 wherein said dump means comprises two of said pivotable platforms, one locked at each end of said cooking station.

8. The fry cell of claim 7 wherein said cooked food receiving station comprises an area adjacent one end of said cooking station for receiving food from one of said pivotable platforms and another area adjacent the other end of said cooking station for receiving food from the other of said pivotable platforms.

9. An automated system for cooking food products comprising:

(a) a robot capable of working in an area that determines a work area, said robot capable of horizontal linear movement in said work area;

(b) at least one bulk uncooked food dispenser for dispensing uncooked food pieces into a moveable container located in said work area;

(c) at least one cooking station in said work area for cooking food products;

(d) storage means in or adjacent said work area for receiving and storing cooked food;

(e) discharge means for discharging into said storage means food cooked by said cooking means; and (f) said robot including an end of arm tool, said robot capable of, in conjunction with said end of arm tool, selectively engaging, disengaging and moving said container to desired locations in said work area and for placing said plurality of food pieces in cooking position with respect to said cooking means while said food pieces are contained in said container, said desired locations including an uncooked food dispensing position for receiving food into said container from said food dispenser, at least one cooking position at said cooking station for cooking said food pieces and an unloading location where cooked food is unloaded from said container.

10. The automated system of claim 9 wherein said container means comprises at least one fry basket.

11. The automated system of claim 9 wherein said bulk uncooked food dispenser is a french fry dispenser.

12. The automated system of claim 11, said system further comprising a second food dispenser that is a chicken nugget dispenser.

13. The robotized system of claim 12 wherein said storage means comprise separate storage locations for cooked french fries and chicken nuggets.

14. The automated system of claim 9 wherein said bulk uncooked food dispenser is a chicken nugget dispenser.

15. The automated system of claim 14, said bulk uncooked food dispenser further comprises a second food dispenser for dispensing chicken patties and a third food dispenser for dispensing fish filets.

16. The robotized system of claim 15 wherein said storage means comprise separate storage location for cooked chicken patties and chicken nuggets.

17. The robotized system of claim 9 wherein said food dispensing station can dispense at least one type of uncooked foods selected from the group consisting of french fries, chicken nuggets, fish filets and chicken patties.

18. The robotized system of claim 9 wherein each of said food dispensers is capable of dispensing a preselected amount of food into said container.

19. The automated system of claim 9 wherein said cooking station comprises a grill surface for grilling food.

20. The automated system of claim 19 wherein said grill is a clamshell grill.

21. The automated system of claim 19 wherein said robot is moveable horizontally along a linear substantially horizontal track.

22. The automated system of claim 9 wherein said moveable container forms part of said end of arm tool and comprises a fixture for dispensing and retrieving food on a grill surface.

23. The automated system of claim 22 wherein said bulk uncooked food dispenser is a food patty dispenser.

24. The automated system of claim 23 wherein said fixture comprises a first subfixture for receiving uncooked food patties from said food patty dispenser and delivering and depositing with said robot said uncooked food patties on said grill surface and a second subfixture for retrieving cooked food patties from said grill surface and for delivering them by said robot to said storage means.

25. The automated system of claim 24 wherein said first subfixture includes a first hoop member and a first selectively moveable spatula member locatable beneath said hoop member, for containing and depositing food patties in a spaced apart horizontal array.

26. The automated system of claim 25 wherein said second subfixture includes a second hoop member and a second selectively moveable spatula member locatable beneath said second hoop member for retrieving from said grill surface and depositing at said storage means cooked food patties in said horizontal array.

27. The automated system of claim 26 wherein said horizontal array is a linear horizontal array composed of rows and columns.

28. The automated system of claim 26 further comprising means for selectively coupling an decoupling said first and second subfixtures in vertical registry with each other.

29. The automated system of claim 28 wherein said second subfixtures is located above said first subfixture when said subfixtures are in vertical registry with each other.

30. The automated system of claim 29 wherein said robot can transport said second subfixture without said first subfixture and said robot can also transport said first and second subfixtures in vertical registry with each other.

31. The automated system of claim 30 further comprising means for selectively moving said second spatula from a first position where said second spatula is located beneath said second hoop for supporting food patties in said second hoop to a second position where said second spatula is retracted from said hoop for permitting food patties to be discharged from said second hoop.

32. The automated system of claim 31 further comprising means for selectively moving said first spatula from a first position where said first spatula is located beneath said first hoop for supporting food patties in said first hoop to a second position wherein said first spatula is retracted from said first loop for permitting food patties to be discharged from said first hoop.

33. The robotized system of claim 9 further comprising computer operating and control means for controlling and directing said robot to engage and transport said food container in sequence to and from said food dispensing station and to and from said cooking means at a frequency based on an anticipated volume of customer orders.

34. The system of claim 33 wherein said anticipated volume of customers orders is based on stored data stored in said computer operating and control means.

35. The system of claim 34 wherein at least part of said stored data is based on data collected on a real time basis from customer orders for that day.

36. The system of claim 34 wherein at least a portion of said data is based on historical data.

37. The system of claim 34 wherein said stored data contains the anticipated volume of customer orders based on food type on an hourly basis.

38. The system of claim 33 wherein said computer operating and control means includes conflict determining means for determining whether a proposed system operation would conflict with any current or future system operation already set in motion by dispensing food for said current or future operation.

39. The system of claim 38 wherein said computer operating and control means includes means for determining when a proposed system operation can be started and completed without conflict with any current or future system operation already set in motion by dispensing food for said current or future operation.

40. The automated system of claim 9 further comprising an at least substantially horizontal linear track along which track the robot is moveable horizontally.

41. The robotized system of claim 40 wherein said bulk uncooked food dispenser, said cooking station and said storage means are in a linear array with respect to each other.

42. An automated system for grilling food products comprising:

(a) a robot capable of working in an area that determines a work area;

(b) at least one bulk uncooked food dispenser for dispensing uncooked food pieces into a moveable container located in said work area;

(c) at least one cooking station in said work area having a cooking surface for cooking a plurality of pieces of food therein;

(d) said robot including an end of arm tool comprising a fixture assembly for dispensing and retrieving in a predetermined horizontal planar array a plurality of pieces of food on said cooking surface.

43. The automated system of claim 42 wherein said cooking surface is a grill surface.

44. The automated system of claim 43 wherein said grill is a clamshell grill.

45. The automated system of claim 42 wherein said uncooked food dispenser is a food patty dispenser.

46. The automated system of claim 45 wherein said fixture assembly comprises a first subfixture for receiving uncooked food patties from said food patty dispenser and delivering and depositing with said robot said uncooked food patties on said grill surface and a second subfixture for retrieving cooked food patties from said grill surface and for delivering them by said robot to a storage means.

47. The automated system of claim 46 wherein said first subfixture includes a first hoop member and a first selectively moveable spatula member locatable beneath said hoop member, for containing and depositing food patties in a spaced apart horizontal array.

48. The automated system of claim 47 wherein said second subfixture includes a second hoop member and a second selectively moveable spatula member locatable beneath said second hoop member for retrieving from said grill surface and depositing at said storage means cooked food patties in said horizontal array.

49. The automated system of claim 48 wherein said horizontal array is a linear horizontal array composed of rows and columns.

50. The automated system of claim 48 wherein said comprising means for selectively coupling an decoupling said first and second subfixtures in vertical registry with each other.

51. The automated system of claim 50 wherein said second subfixtures is located above said first subfixture when said subfixtures are in vertical registry with each other.

52. The automated system of claim 51 wherein said robot can transport said second subfixture without said first subfixture and said robot can also transport said first and second subfixtures in vertical registry with each other.

53. The automated system of claim 52 wherein said comprising means for selectively moving said second spatula from a first position where said second spatula is located beneath said second hoop for supporting food patties in said second hoop to a second position where said second spatula is retracted from said hoop for permitting food patties to be discharged from said second hoop.

54. The automated system of claim 53 further comprising means for selectively moving said first spatula from a first position where said first spatula is located beneath said first hoop for supporting food patties in said first hoop to a second position wherein said first spatula is retracted from said first hoop for permitting food patties to be discharged from said first hoop.

55. The automated system of claim 52 further comprising shuttle means for horizontally transporting said first subfixture to and from a position beneath said robot to a position adjacent said patty dispenser.

56. The automated system of claim 55 wherein said cooking station comprises a clamshell grill, the system further comprising means for closing said clamshell grill after uncooked patties have been deposited therein for cooking.

57. The automated system of claim 56 further comprising means for opening said clamshell grill after said uncooked patties have been cooked.

58. The automated system of claim 42 further comprising an at least substantially horizontal linear track along which said robot is moveable horizontally.

59. The robotized system of claim 42 further comprising computer operating and control means for controlling and directing said system to engage and transport said end of arm tool in sequence to and from said food dispensing station and to and from said cooking station at a frequency based on an anticipated volume of customer orders.

60. The system of claim 59 wherein said anticipated volume of customers orders is base on stored data stored in said computer operating and control means.

61. The system of claim 60 wherein at least a part of said stored data is based on data collected on a real time basis from customer orders for that day.

62. The system of claim 60 wherein at least a portion of said data is based on historical data.

63. The system of claim 60 wherein said stored data contains the anticipated volume of customer orders based on food type on an hourly basis.

64. The system of claim 59 wherein said computer operating and control means includes conflict determining means.

65. The system of claim 64 wherein said computer operating and control means includes means for determining when a proposed system operation can be started and completed without conflict with any current or future system operation already set in motion by dispensing food for said current or future operation.

66. A robotized fry cell for processing at least one type of bulk food comprising:

(a) a dispensing station comprising a food dispenser for each type of bulk food, each dispenser capable of dispensing an amount of food into a container;

(b) a cooking station comprising at least one fry vat;

(c) a robot capable of working in an area that determines a work area said robot capable of horizontal linear movement in said work area;

(d) an end of arm robot tool for said robot, said robot capable of, in conjunction with said end of arm tool, selectively engaging, disengaging and moving, in said work area to said stations while engaged, said container for holding a quantity of food from said dispensing station;

(e) said dispensing station and said cooking station being located with respect to said work area so that said robot can place said container means in a food receiving position with respect to any of said plurality of food dispensers, and in a cooking position with respect to said fry vat;

(f) a cooked food receiving station; and (g) dump means for dumping cooked food from said container into said cooked food receiving station.

67. The fry cell of claim 66 wherein said dump means comprises at least one pivotable platform capable of pivoting from a horizontal position for loading cooked food thereon to a relatively upright position for dumping food thereon into said cooked food receiving station.

68. The fry cell of claim 67 wherein said dump means comprises two of said pivotable platforms, one located at each end of said cooking station.

69. The fry cell of claim 68 wherein said cooked food receiving station comprises an area adjacent one end of said cooking station for receiving food from one of said pivotable platforms and another area adjacent the other end of said cooking station for receiving food from the other of said pivotable platforms.

70. An automated system for cooking food products comprising:

(a) a work area containing food dispensing, cooking and storage stations and defining a work area in which an operator can interface with said stations;

(b) fixture means in said work area for transporting, dispensing and retrieving food in a horizontal array, moveable by the operator to and from said dispensing, cooking and storage stations;

(c) said food dispensing station for dispensing food and comprising at least one food dispenser for dispensing uncooked food pieces in the horizontal array onto said food transporting, dispensing and retrieving fixture located in said work area;

(d) said cooking station comprising at least one grill surface for grilling said food pieces;

(e) said storage station for receiving and storing cooked food;

(f) said operator comprising automated means for automatically transferring said fixture means from said dispensing station to said cooking station where said food pieces can be dispensed by said fixture means in the array and subsequently retrieved by said fixture means manipulated by said operator after cooking by said cooking station in the array.

71. The system of claim 70 wherein said food dispenser is a hamburger patty dispenser.

72. The system of claim 71 wherein said operator is a mechanical device for transporting and operating said fixture comprising a vertically disposed cylinder for vertical movement of said fixture, a horizontal linear track for horizontal movement of said fixture.

73. The automated system of claim 72 wherein said fixture means comprises a first subfixture for receiving uncooked food patties from said food patty dispenser and delivering and depositing with said operator said uncooked food patties on said grill surface and a second subfixture for retrieving cooked food patties from said grill surface and for delivering them by said robot to said storage means.

74. The automated system of claim 73 wherein said first subfixture includes a first hoop member and a first selectively moveable spatula member locatable beneath said hoop member, for containing and depositing food patties in a spaced apart horizontal array.

75. The automated system of claim 74 wherein said second subfixture includes a second hoop member and a second selectively moveable spatula member locatable beneath said second hoop member for retrieving from said grill surface and depositing at said storage means cooked food patties in said horizontal array.

76. The automated system of claim 75 wherein said horizontal array is a linear horizontal array composed of rows and columns.

77. The automated system of claim 75 further comprising means for selectively coupling and decoupling said first and second subfixtures in vertical registry with each other.

78. The automated system of claim 7 wherein said second subfixtures is located above said first subfixture when said subfixtures are in vertical registry with each other.

79. The automated system of claim 78 wherein said operator can transport said second subfixture without said first subfixture and said operator can also transport said first and second subfixtures in vertical registry with each other.

80. The automated system of claim 79 further comprising means for selectively moving said second spatula from a first position where said second spatula is located beneath said second hoop for supporting food patties in said second hoop to a second position where said second spatula is retracted from said hoop for permitting food patties to be discharged from said second hoop.

81. The automated system of claim 80 further comprising means for selectively moving said first spatula from a first position where said first spatula is located beneath said first hoop for supporting food patties in said first hoop to a second position wherein said first spatula is retracted from said first loop for permitting food patties to be discharged from said first hoop.

82. The automated system of claim 79 further comprising a horizontal transfer shuttle for horizontally transporting said first subfixture to and from said operator and said food dispensing station.

83. The system of claim 70 further comprising computer operating and control means for controlling and directing the operator to engage and transport said fixture means in sequence to and from said food dispensing station and to and from said cooking station at a frequency based on an anticipated volume of customer orders.

84. The system of claim 83 wherein said anticipated volume of customers orders is base on stored data stored in said computer operating and control means.

85. The system of claim 84 wherein at least part of said store data is based on data collected on a real time basis from customer orders for the day.

86. The system of claim 83 wherein said computer operating and control means includes conflict determining means for determining whether a proposed system operation would conflict with any current or future system operation already set in motion by dispensing food for said current or future operation.

87. The system of claim 86 wherein said computer operation and control means includes means for determining when a proposed system operation can be started and completed without conflict with any current or future system operation already set in motion by dispensing food for said current or future operation.

88. The system of claim 70 wherein said cooking station comprises a clamshell grill having upper and lower grill platens.

89. The system of claim 88 further comprising scraper means for periodically scraping the upper and lower grill platens to remove cooking residue from the grill platens.

90. The system of claim 88 further comprising upper and lower platen scrapers mounted for movement across the surface of said upper and lower grill platens, each of said respective grill platen, said upper platen scraper mounted to said lower platen scraper.

91. The system of claim 90 further comprises a cylinder for moving said upper and lower platen scrapers across said grill platens.

* * * * *